United States Patent
Takahashi

(10) Patent No.: US 11,899,315 B2
(45) Date of Patent: Feb. 13, 2024

(54) PHASE DIFFERENCE PLATE, LIQUID CRYSTAL PROJECTOR, AND CONTRAST ADJUSTMENT METHOD

(71) Applicant: FUJIFILM CORPORATION, Tokyo (JP)

(72) Inventor: Hiroki Takahashi, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/145,816

(22) Filed: Dec. 22, 2022

(65) Prior Publication Data

US 2023/0185134 A1 Jun. 15, 2023

Related U.S. Application Data

(63) Continuation of application No. PCT/JP2021/024535, filed on Jun. 29, 2021.

(30) Foreign Application Priority Data

Jun. 30, 2020 (JP) .................. 2020-113612

(51) Int. Cl.
*G02F 1/13363* (2006.01)

(52) U.S. Cl.
CPC .. *G02F 1/133634* (2013.01); *G02F 1/133632* (2013.01)

(58) Field of Classification Search
CPC ......... G02F 1/133634; G02F 1/133632; G02B 5/30; G03B 21/00
See application file for complete search history.

(56) References Cited

U.S. PATENT DOCUMENTS

| 5,932,354 A | 8/1999 | Takeda et al. |
| 2006/0092358 A1* | 5/2006 | Fujii ................. G02F 1/133634 349/119 |

(Continued)

FOREIGN PATENT DOCUMENTS

| JP | H10-81955 A | 3/1998 |
| JP | 2006-119444 A | 5/2006 |

(Continued)

OTHER PUBLICATIONS

International Search Report issued in International Application No. PCT/JP2021/024535 dated Sep. 21, 2021.

(Continued)

*Primary Examiner* — Mariam Qureshi
(74) *Attorney, Agent, or Firm* — SOLARIS Intellectual Property Group, PLLC

(57) ABSTRACT

Provided is a phase difference plate including a substrate and a phase difference film which is an oblique film, in which, in a case where three principal refractive indices in a biaxial refractive index ellipsoid exhibiting the refractivity anisotropy are defined as nx, ny, and nz, Conditional Expression (1) is satisfied, and in a case where an incidence angle in a direction inclined to the X-axis side with respect to the normal line is regarded as positive, a phase difference ratio Re(30) ratio, which is a ratio of Re(+30) of a phase difference of the incidence light with an incidence angle of +30° to Re(−30) of a phase difference of the incidence light with an incidence angle of −30°, satisfies Conditional Expression (2).

$$ny > nx > nz \quad (1)$$

$$Re(30)\ ratio = Re(30)/Re(-30) = 1.1\ to\ 4.0 \quad (2)$$

22 Claims, 28 Drawing Sheets

(56) References Cited

U.S. PATENT DOCUMENTS

| 2009/0128719 | A1 | 5/2009 | Tateno |
| 2010/0026918 | A1 | 2/2010 | Nakagawa et al. |
| 2010/0231835 | A1 | 9/2010 | Nakagawa et al. |
| 2013/0141674 | A1 | 6/2013 | Kobayashi et al. |
| 2018/0066189 | A1* | 3/2018 | Ishii .................. G02B 5/30 |
| 2019/0113809 | A1* | 4/2019 | Heo .................. G02B 1/14 |
| 2021/0041734 | A1 | 2/2021 | Horikoshi et al. |
| 2022/0163853 | A1* | 5/2022 | Pires ............... G02B 5/3016 |

FOREIGN PATENT DOCUMENTS

| JP | 2009-075459 A | 4/2009 |
| JP | 2009-145861 A | 7/2009 |
| JP | 4744606 B2 | 8/2011 |
| JP | 2011-197379 A | 10/2011 |
| JP | 2013-113869 A | 6/2013 |
| WO | 2008/078764 A1 | 7/2008 |
| WO | 2019/193838 A1 | 10/2019 |

OTHER PUBLICATIONS

Written Opinion of the ISA issued in International Application No. PCT/JP2021/024535 dated Sep. 21, 2021.

* cited by examiner

- ● SINGLE-SIDE SUBSTRATE LAMINATION
- ■ DOUBLE-SIDE SUBSTRATE LAMINATION
- △ WITH PLANARIZING LAYER

PHASE DIFFERENCE PLATE, LIQUID CRYSTAL PROJECTOR, AND CONTRAST ADJUSTMENT METHOD

CROSS-REFERENCE TO RELATED APPLICATIONS

This application is a continuation of International Application No. PCT/JP2021/024535, filed on Jun. 29, 2021, which claims priority from Japanese Patent Application No. 2020-113612, filed on Jun. 30, 2020. The entire disclosure of each of the above applications is incorporated herein by reference.

BACKGROUND

Technical Field

The present disclosure relates to a phase difference plate, a liquid crystal projector, and a contrast adjustment method.

Related Art

A phase difference plate is used as a phase difference compensation plate in, for example, a vertical alignment (VA) mode liquid crystal display device (see JP4744606B). In the VA mode liquid crystal display device, a polarizer and an analyzer sandwiching a liquid crystal layer are arranged in a crossed nicol arrangement in which respective transmission axes for transmitting light are perpendicular to each other, and an alignment of the liquid crystal layer in a low voltage state is perpendicular to a substrate surface. Therefore, in the low voltage state, linearly polarized light transmitted through the polarizer is transmitted through the liquid crystal layer while maintaining a direction of the polarization axis, and is incident on the analyzer. Since the polarization axis of the linearly polarized light incident on the analyzer and the transmission axis of the analyzer are orthogonal to each other, theoretically, no light is transmitted through the analyzer and the display is displayed in black. However, since the liquid crystal layer has refractivity anisotropy (also called birefringence) which causes a difference in refractive index between polarized light with different polarization axes due to the oblique alignment component, the light passing through the liquid crystal layer produces a phase difference between polarized lights with different polarization axes. Since the light incident on the analyzer is elliptically polarized in a case where there is a phase difference between polarized lights, even in the low voltage state, some light is transmitted through the analyzer. This results in a decrease in contrast of the black display. The phase difference compensation plate compensates for the phase difference occurring in the liquid crystal layer. That is, the phase difference compensation plate reduces the amount of light transmitted through the analyzer by generating a phase difference which cancels the phase difference caused by the liquid crystal layer. The phase difference compensation plate has a function of improving the contrast of black display.

As disclosed in JP4744606B, the phase difference compensation plate is configured as, for example, a laminate of a plurality of plates having different optical anisotropies. JP4744606B discloses a C-plate and an O-plate as the plurality of plates. The C-plate is formed by laminating layers having different refractive indices in a normal direction of the plate. In the C-plate, a direction of an optical axis which does not show the refractivity anisotropy coincides with a normal line of the plate, and causes a phase difference with respect to light incident from a direction different from the normal line.

In JP1998-81955A (JP-H10-81955A), as a problem with an oblique vapor deposition film used as the phase difference plate, it is disclosed that, due to relaxation of a columnar structure formed by a forest of a plurality of columnar structure bodies, light scattering occurs in the oblique vapor deposition film, and the oblique vapor deposition film is cloudy, so that a problem arises in that quality of the phase difference plate deteriorates. The relaxation of the columnar structure refers to a phenomenon in which aggregation occurs in the forest of a plurality of columnar structure bodies. In addition, in JP1998-81955A (JP-H10-81955A), it is disclosed that, by alternately laminating the oblique vapor deposition film and a front vapor deposition film, it is possible to obtain a phase difference plate in which scattering of light within the films is suppressed.

In JP2013-113869A, it is disclosed that, in a refractive index ellipsoid exhibiting characteristics of the O-plate, an axis showing the maximum principal refractive index substantially coincides with a growth direction which is a longitudinal direction of the columnar structure body. In addition, it is disclosed that, in the O-plate, it is preferable that a ratio $Re(30)/Re(-30)$ of a phase difference $Re(30)$ from a direction inclined 30° toward the growth direction of the columnar structure body with respect to the normal direction to a phase difference $Re(-30)$ from a direction inclined 30° to the opposite side of the growth direction with respect to the normal direction is 3.5 or more and 4.5 or less.

Even in JP2009-145861A, same as JP2013-113869A, an O-plate in which an axis showing the maximum principal refractive index substantially coincides with the longitudinal direction of the columnar structure body is disclosed. In addition, even in JP2009-145861A, it is disclosed that, by setting a phase difference ratio $Re(-30)$ and a front phase difference $Re(0)$ of the O-plate to appropriate values, high-contrast display can be realized in the liquid crystal display device.

SUMMARY

An object of one aspect of the present disclosure is to provide a phase difference plate which compensates for a phase difference caused by a liquid crystal layer and can increase a contrast more than before, a liquid crystal projector, and a contrast adjustment method.

A phase difference according to an aspect of the present disclosure is a phase difference plate including a substrate and a phase difference film formed on at least one surface of the substrate, in which the phase difference film is an oblique film which has a columnar structure body inclined with respect to a normal line of a film formation surface in the substrate, on which the phase difference film is formed, and exhibits a refractivity anisotropy as an optical characteristic, in a case where three principal refractive indices in a biaxial refractive index ellipsoid exhibiting the refractivity anisotropy are defined as nx, ny, and nz, and in these principal refractive indices, in a case where nx is a principal refractive index in an X-axis direction which is a longitudinal direction of the columnar structure body, ny is a principal refractive index in a Y-axis direction which is a major-axis direction of an ellipse perpendicular to the X-axis, and nz is a principal refractive index in a Z-axis direction which is a minor-axis direction of the ellipse, Conditional Expression (1) is satisfied, and in a case where an incidence angle in a direction inclined to the X-axis side with respect to the normal line is regarded as positive, a phase difference of an incidence light with an incidence angle of +30° is defined as Re(+30), a phase difference of an incidence light with an incidence angle of −30° is defined as Re(−30), and a phase difference ratio of Re(+30) to Re(−30) is defined as a Re(30) ratio, Conditional Expression (2) is satisfied.

$$ny > nx > nz \qquad (1)$$

$$Re(30)\text{ ratio} = Re(30)/Re(-30) = 1.1 \text{ to } 4.0 \qquad (2)$$

In the phase difference plate according to the aspect of the present disclosure, it is preferable that, in a case where a YS-axis, which is obtained by projecting the Y-axis corresponding to a maximum principal refractive index ny in the three principal refractive indices onto a plane parallel to the film formation surface and in which a phase of the incidence light is most delayed corresponding to the principal refractive index ny, is defined as a slow axis, and an axis obtained by projecting the X-axis onto the film formation surface is defined as a ZS-axis, the slow axis is orthogonal to the ZS-axis.

In the phase difference plate according to the aspect of the present disclosure, it is preferable that the Re(30) ratio satisfies Conditional Expression (2-1).

$$Re(30)\text{ ratio} = Re(30)/Re(-30) = 1.2 \text{ to } 4.0 \qquad (2\text{-}1)$$

In the phase difference plate according to the aspect of the present disclosure, it is preferable that the Re(30) ratio satisfies Conditional Expression (2-2).

$$Re(30)\text{ ratio} = Re(30)/Re(-30) = 1.4 \text{ to } 3.0 \qquad (2\text{-}2)$$

In the phase difference plate according to the aspect of the present disclosure, it is preferable that the Re(30) ratio satisfies Conditional Expression (2-3).

$$Re(30)\text{ ratio} = Re(30)/Re(-30) = 1.5 \text{ to } 2.5 \qquad (2\text{-}3)$$

In the phase difference plate according to the aspect of the present disclosure, it is preferable that the oblique film consists of an oxide containing at least one of silicon (Si), niob (Nb), zirconium (Zr), titanium (Ti), lantern (La), aluminum (Al), hafnium (Hf), or tantal (Ta).

In the phase difference plate according to the aspect of the present disclosure, two or more layers of the phase difference film may be laminated.

In the phase difference plate according to the aspect of the present disclosure, it is preferable that, in a case where a YS-axis, which is obtained by projecting the Y-axis corresponding to a maximum principal refractive index ny in the three principal refractive indices onto a plane parallel to the film formation surface and in which a phase of the incidence light is most delayed corresponding to the principal refractive index ny, is defined as a slow axis, a direction of the slow axis in a case where the substrate is rotated about the normal line is defined as an azimuthal angle of the substrate, and an azimuthal angle at which a phase difference generated with respect to the incidence light at an incidence angle of +15° with respect to the normal line is maximum is defined as a reference azimuthal angle, in azimuthal angles from 0° to 360°, an absolute value of a difference between a first phase difference of the incidence light in a case where an azimuthal angle is +45° with respect to the reference azimuthal angle and a second phase difference of the incidence light in a case where an azimuthal angle is −45° with respect to the reference azimuthal angle is 6 nm or less.

In the phase difference plate according to the aspect of the present disclosure, it is preferable that a front phase difference is 0.1 nm to 5 nm.

In the phase difference plate according to the aspect of the present disclosure, it is preferable that a haze value indicating a degree of occurrence of scattered light is 0.3% or less.

In the phase difference plate according to the aspect of the present disclosure, in a case where two or more phase difference films are laminated, it is preferable that the phase difference films are formed on both surfaces of the substrate layer by layer.

In the phase difference plate according to the aspect of the present disclosure, in a case where two or more phase difference films are laminated, the phase difference films may be laminated in two or more layers on one surface of the substrate, and an interlayer may be further provided between the adjacent phase difference films.

In the phase difference plate according to the aspect of the present disclosure, in a case where two or more phase difference films are laminated, a plurality of substrates on which at least one layer of the phase difference film is formed may be provided.

In the phase difference plate according to the aspect of the present disclosure, it is preferable that the phase difference film is laminated in two layers, and slow axes of each layer are arranged with an intersecting angle of 90°±3°.

In the phase difference plate according to the aspect of the present disclosure, it is preferable that the phase difference film is laminated in two layers, and a difference in front phase differences of each layer is ±3 nm or less.

In the phase difference plate according to the aspect of the present disclosure, a negative C-plate in which a haze value indicating a degree of occurrence of scattered light is 0.4% or less may be provided.

In the phase difference plate according to the aspect of the present disclosure, it is preferable that the C-plate has an antireflection function.

In the phase difference plate according to the aspect of the present disclosure, in a case of including the C-plate, it is preferable that a haze value indicating a degree of occurrence of scattered light is 1% or less.

A phase difference plate according to an aspect of the present disclosure is a phase difference plate including a substrate and a phase difference film formed on at least one surface of the substrate, in which the phase difference film is laminated in two or more layers, and in a case where, in a plane parallel to a film formation surface of the substrate, on which the phase difference film is formed, an axis in which a phase of an incidence light is most delayed is defined as a slow axis, a direction of the slow axis in a case where the substrate is rotated about the normal line is defined as an azimuthal angle of the substrate, and an azimuthal angle at which a phase difference generated with respect to the incidence light at an incidence angle of +15° with respect to the normal line is maximum is defined as a reference azimuthal angle, in azimuthal angles from 0° to 360°, an absolute value of a difference between a first phase difference of the incidence light in a case where an azimuthal angle is +45° with respect to the reference azimuthal angle and a second phase difference of the incidence light in a case where an azimuthal angle is −45° with respect to the reference azimuthal angle is 6 nm or less.

A liquid crystal projector according to an aspect of the present disclosure is a liquid crystal projector including a liquid crystal layer and a phase difference compensation element for compensating for a phase difference in the liquid crystal layer, in which the phase difference plate according to the aspect of the present disclosure is provided as the phase difference compensation element.

A contrast adjustment method according to an aspect of the present disclosure is a contrast adjustment method of a liquid crystal display element including a liquid crystal layer and a phase difference compensation element for compensating for a phase difference in the liquid crystal layer, the method including using, as the phase difference compensation element, a phase difference plate having a plurality of substrates on which at least one layer of the phase difference film is formed, adjusting a contrast of the liquid crystal display element by rotating at least one of the plurality of the substrates on which at least one layer of the phase difference film is formed with respect to other substrates about an axis perpendicular to the film formation surface.

BRIEF DESCRIPTION OF THE DRAWINGS

FIG. 6A is a Y-axis direction view, FIG. 6B is a Z-axis direction view, and FIG. 6C is an X-axis direction view.

FIG. 7A is a diagram showing an overall image of the refractive index ellipsoid, and FIG. 7B is a diagram showing a cross section of the refractive index ellipsoid parallel to a film formation surface.

FIG. 8A is a view of an ellipse having cross section cut along the XS-ZS plane passing through the center C and viewed from the YS-axis direction. FIG. 8B is a view of an ellipse having cross section cut along the YS-ZS plane passing through the center C and viewed from the XS-axis direction. FIG. 8C is a view of an ellipse having cross section cut along the XS-YS plane passing through the center C and viewed from the ZS-axis direction.

FIG. 14A is a diagram illustrating an incidence direction of the light, FIG. 14B is a cross sectional view of a refractive index ellipsoid perpendicular to LX, and FIG. 14C is a cross-sectional view of a refractive index ellipsoid perpendicular to LZ.

FIG. 17A is a schematic diagram showing a relationship between the slow axis of the oblique film and a fast axis of the liquid crystal layer, and FIG. 17B is an explanatory diagram regarding a synthesis of the slow axis of the oblique film.

FIG. 18A is a diagram showing a slow axis and a fast axis in the oblique film, FIG. 18B is a cross-sectional view of the oblique film in a 0° to 180° orientation, and FIG. 18C is a cross-sectional view of the oblique film in a 90° to 270° orientation.

FIG. 33A is a schematic diagram showing a relationship between the slow axis of the oblique film and a fast axis of the liquid crystal layer, and FIG. 33B is an explanatory diagram regarding a synthesis of the slow axis of the oblique film.

DESCRIPTION OF EMBODIMENTS

Hereinafter, embodiments of the present disclosure will be described with reference to the drawings.

"Liquid Crystal Display Element"

First, a liquid crystal display element 10 including a phase difference plate according to one embodiment of the present disclosure as a phase difference compensation element 20 will be described with reference to FIGS. 1A to 1C. The liquid crystal display element 10 is provided in, for example, a liquid crystal projector 110 (see FIGS. 39 and 40) described later.

The liquid crystal display element 10 is a transmission type VA mode liquid crystal display element. That is, in a liquid crystal layer of the liquid crystal display element 10, liquid crystal molecules which are aligned substantially perpendicular to a surface of the element in a no-voltage state are sealed. In the liquid crystal display element 10, an alignment of the liquid crystal molecules is changed by adjusting a voltage applied to the liquid crystal layer for each pixel. As a result, a polarization state of light transmitted through each pixel is controlled to display an image.

Figure 1A:
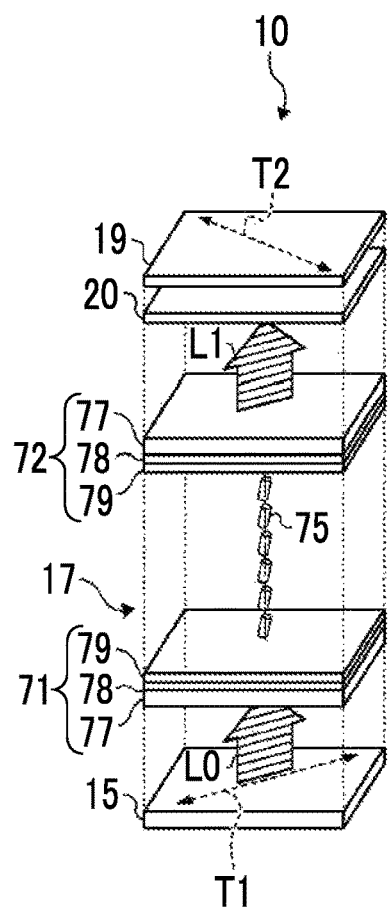
FIGS. 1A to 1C are diagrams showing a schematic configuration of a liquid crystal display element and a function of a phase difference compensation element.

As shown in FIG. 1A, the liquid crystal display element 10 includes a polarizer 15, a liquid crystal layer 17, and an analyzer 19 in this order from a light source side, and a phase difference compensation element 20 is provided between the liquid crystal layer 17 and the analyzer 19.

The polarizer 15 is a polarizing plate which transmits only a polarization component of incidence light in a direction of a transmission axis T1 indicated by an arrow to the liquid crystal layer 17 side. That is, the light incident on the liquid crystal layer 17 is only an incidence light L0 in which an electric field vibrates in a direction parallel to the transmission axis T1.

The analyzer 19 is a polarizing plate which transmits only a polarization component of light which passes through the liquid crystal layer 17 and is phase-compensated by the phase difference compensation element 20 in a direction of a transmission axis T2 indicated by an arrow. The analyzer 19 is disposed such that the transmission axis T2 is orthogonal to the direction of the transmission axis T1 of the polarizer 15. That is, the analyzer 19 and the polarizer 15 are arranged in so-called crossed nicols. Therefore, a liquid crystal panel using the liquid crystal display element 10 is a normally black transmissive liquid crystal panel which displays black in a no-voltage state.

The liquid crystal layer 17 is composed of transparent substrates 71 and 72, and rod-like liquid crystal molecules 75 enclosed between the transparent substrates 71 and 72.

In addition, the transparent substrates 71 and 72 are composed of, for example, a glass substrate 77, a transparent electrode 78, an alignment film 79, and the like. In the transparent substrate 71, the glass substrate 77, the transparent electrode 78, and the alignment film 79 are arranged in this order from the light source side. On the contrary, in the transparent substrate 72, the alignment film 79, the transparent electrode 78, and the glass substrate 77 are arranged in this order from the light source side.

The transparent electrode 78 is connected to a thin film transistor (TFT) circuit provided on the transparent substrate 71. The TFT circuit controls an alignment state of the liquid crystal molecules 75 by controlling a voltage between the transparent electrode 78 on the transparent substrate 71 and the transparent electrode 78 on the transparent electrode 72, which is a common electrode.

In this example, the alignment films 79 are arranged such that an alignment direction thereof is at an angle of 45 degrees with the direction of the transmission axis T1 of the polarizer 15. The liquid crystal molecules sandwiched between the pair of alignment films 79 are inclined and aligned according to the alignment direction of the alignment films 79.

The liquid crystal molecules 75 are rod-like liquid crystal molecules having negative dielectric anisotropy, and are aligned substantially perpendicular to the surface of the liquid crystal display element 10 in the no-voltage state. In this case, the liquid crystal molecules 75 do not substantially affect a phase of the light transmitted through the liquid crystal layer 17. That is, the light transmitted through the liquid crystal layer 17 in the no-voltage state passes through the liquid crystal layer 17 without changing the polarization direction thereof.

For example, as shown in FIG. 1A, in a case where the liquid crystal layer 17 is in a no-voltage state, an information light L1 having substantially the same polarization direction as the incidence light L0 is incident on the phase difference compensation element 20 from the liquid crystal layer 17. Since the information light L1 is light polarized in a direction perpendicular to the transmission axis T2 of the analyzer 19, the information light L1 cannot pass through the analyzer 19. Therefore, black is displayed (hereinafter, dark display) by setting the pixels of the liquid crystal display element 10 in a no-voltage state.

On the other hand, in a case where a voltage is applied between the transparent electrode 78 of the transparent substrate 71 and the transparent electrode 78 of the transparent substrate 72, the liquid crystal molecules 75 are inclined in the alignment direction of the alignment film 79. In this case, the liquid crystal molecules 75 change the phase of the light transmitted through the liquid crystal layer 17 according to an inclined angle thereof. That is, in the light transmitted through the liquid crystal layer 17, the polarization direction is changed according to the inclined angle of the liquid crystal molecules 75.

Figure 1B:
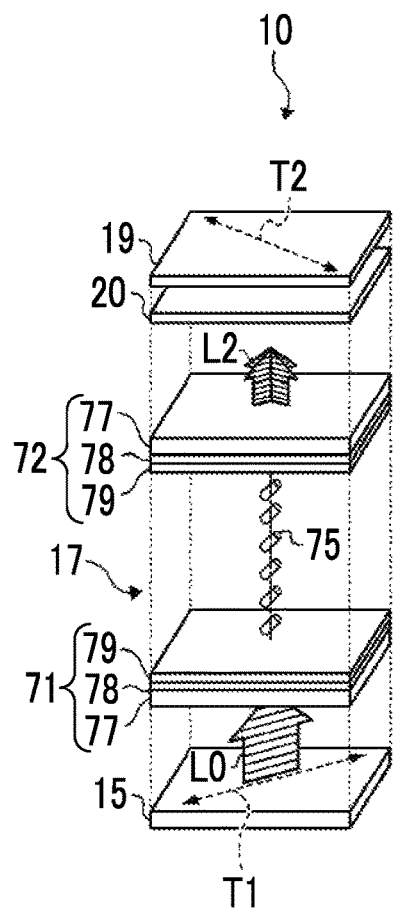

For example, as shown in FIG. 1B, in a case where a voltage is applied to the liquid crystal layer 17, many liquid crystal molecules 75 are inclined in the alignment direction of the alignment film 79. In this case, in the light transmitted through the liquid crystal layer 17, the polarization direction is changed by the liquid crystal molecules 75 inclined and aligned, and as a result, an information light L2 includes both a polarization component in the same direction as the incidence light L0 and a polarization component perpendicular to the incidence light L0. The information light L2 is so-called elliptically polarized light, and includes the polarization component parallel to the transmission axis T2 of the analyzer 19 and the polarization component perpendicular to the transmission axis T2. Among these, only the polarization component parallel to the transmission axis of the analyzer 19 transmits through the analyzer 19. Therefore, by adjusting the pixels of the liquid crystal display element 10 to an appropriate voltage, the amount of light transmitted through the analyzer 19 is controlled, and a halftone color is displayed.

Figure 1C:
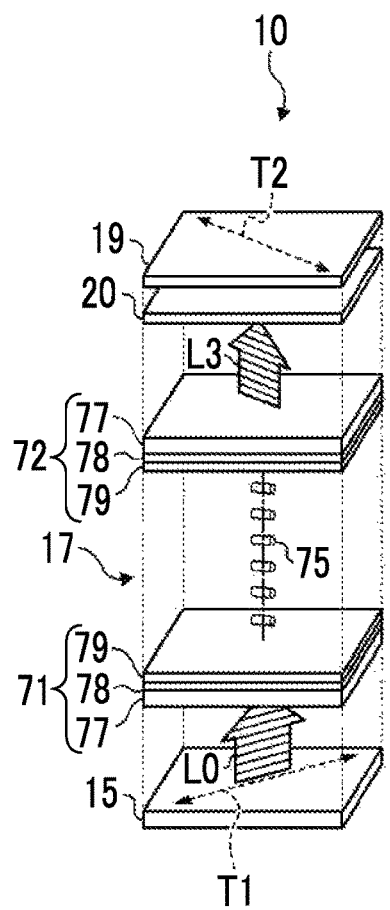

In addition, for example, as shown in FIG. 1C, in a case where a sufficient voltage is applied to the liquid crystal layer 17, many liquid crystal molecules 75 are largely inclined in the alignment direction of the alignment film 79, and are aligned substantially parallel to the surface of the liquid crystal display element 10. In this case, in the light transmitted through the liquid crystal layer 17, the polarization direction is changed by a birefringence of the liquid crystal molecules 75 aligned substantially horizontally, and an information light L3 is polarized in a direction forming an angle of 90 degrees with the incidence light L0. Since the information light L3 is light polarized in a direction parallel to the transmission axis T2 of the analyzer 19, the information light L3 passes through the analyzer 19. Therefore, by applying a sufficient voltage to the pixels of the liquid crystal display element 10, the brightest display (hereinafter, bright display) is performed.

In order to compensate for the phase difference of the information light transmitted through the liquid crystal layer 17, the phase difference compensation element 20 is provided between the liquid crystal layer 17 and the analyzer 19 as described above. Details of the phase difference compensation element 20 will be described later.

Figure 2:
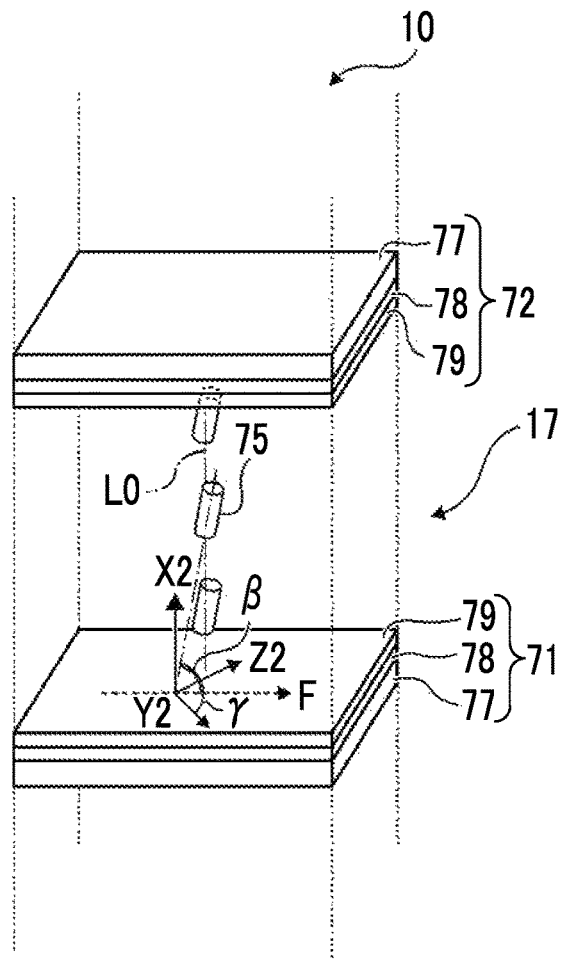
FIG. 2 is an explanatory diagram of a pre-tilt of liquid crystal molecules in the liquid crystal display element.

As described above, in a case where the pixels of the liquid crystal display element 10 are in the no-voltage state, the liquid crystal molecules 75 are aligned substantially perpendicular to the surface of the liquid crystal display element 10. However, in reality, as shown in FIG. 2, the liquid crystal molecules 75 are intentionally inclined in advance by approximately 5° from a vertical direction even in the no-voltage state. The inclined arrangement is performed in order to suppress occurrence of an alignment defect of the liquid crystal molecules 75, which is called a reverse tilt domain. The reverse tilt domain is a disturbance of the alignment state of the liquid crystal molecules 75 generated by an electric field exerted between adjacent pixels.

Here, as shown in FIG. 2, a Y2-axis and a Z2-axis are defined in a plane parallel to the surface of the liquid crystal display element 10, and an X2-axis is defined in a direction perpendicular to the surface of the liquid crystal display element 10, that is, parallel to an optical axis (transmission optical axis) L0 of the light transmitted through the liquid crystal layer 17, with a traveling direction of light being positive. In addition, the X2-axis and the Y2-axis are defined to be parallel to the transmission axes of the analyzer 19 and the polarizer 15, respectively. Therefore, as shown in FIG. 2, an angle (azimuthal angle) γ formed by a tilt direction of the liquid crystal molecules 75 with the Y2-axis is 45°.

In this case, an angle formed by the liquid crystal molecules 75 with respect to a Y2-Z2 plane is a tilt angle β of the liquid crystal molecules 75. The tilt angle β changes in a range of approximately 0° or more and 85° or less depending on a magnitude of the voltage applied to each pixel. In a case where the tilt angle β is approximately 0 degree, a sufficient voltage is applied to the liquid crystal layer 17, and the liquid crystal molecules 75 are aligned in parallel with the Y2-Z2 plane. On the other hand, in a case where the tilt angle β is 85 degree, this is a no-voltage state in which the liquid crystal molecules 75 are aligned substantially perpendicular to the Y2-Z2 plane. The tilt angle β in this no-voltage state is the pretilt angle, and along the alignment direction of the alignment film 79, the liquid crystal molecules 75 are inclined by approximately 5° with respect to the X2-axis, that is, the transmission optical axis L0.

In addition, in a case where the liquid crystal molecules 75 are pre-tilted as described above, for example, even in a pixel displaying black, a birefringence occurs due to the pre-tilt of the liquid crystal molecules 75, and a part of light passes through the analyzer 19. Therefore, it is not possible to display a completely black state, and a contrast of the projected image is lowered. A fast axis F caused by the pre-tilt component of the liquid crystal molecules 75 in the liquid crystal layer 17 corresponds to a pre-tilt orientation. The fast axis F refers to an axis along an orientation in which a refractive index is relatively low and a phase of light is relatively advanced in a medium which transmits light. Hereinafter, the fast axis F of the liquid crystal layer 17 due to the pre-tilt component of the liquid crystal molecules 75 is simply referred to as a fast axis F of the liquid crystal layer 17.

The phase difference compensation element 20 compensates for a phase difference of the information light transmitted through the liquid crystal layer 17 by generating a phase difference opposite to the phase difference generated in the liquid crystal display element 10. Therefore, the phase difference compensation element 20 is disposed such that a slow axis S of the phase difference compensation element 20 coincides with the fast axis F due to the pre-tilt component of the liquid crystal layer 17. The slow axis S refers to an axis along an orientation in which a refractive index is relatively high and a phase of light is relatively delayed in a medium which transmits light, which is opposite to the fast axis F. Therefore, in a case where the slow axis S of the phase difference compensation element 20 is disposed to match the fast axis F of the liquid crystal layer 17, the phase difference caused by the pre-tilt of the liquid crystal molecules 75 and the phase difference caused by the phase difference plate 21 have opposite polarities, so that the phase difference caused by the pre-tilt of the liquid crystal molecules 75 can be compensated.

As the phase difference compensation element 20, the phase difference plate 21 according to the embodiment of the present disclosure can be applied.

Phase Difference Plate According to First Embodiment

Figure 3:
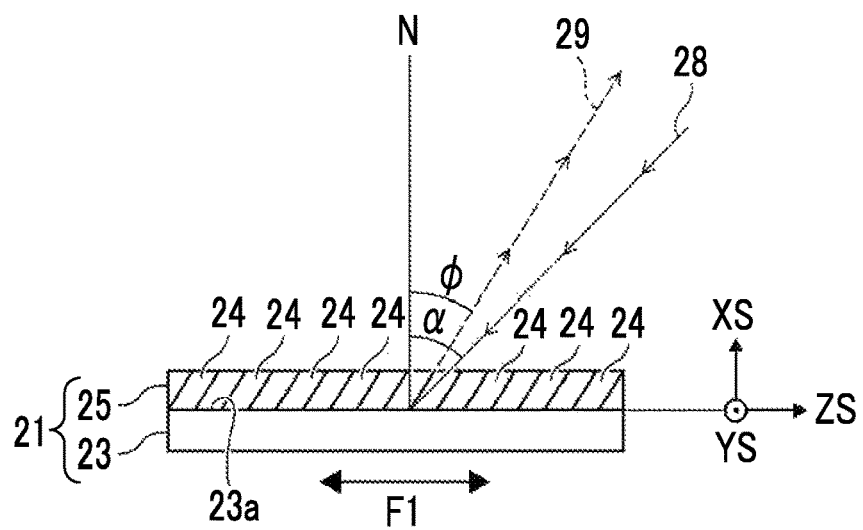
FIG. 3 is a cross-sectional view of a phase difference plate according to a first embodiment.

As shown in FIG. 3, the phase difference plate 21 according to a first embodiment includes a glass substrate as an example of a substrate 23, and a phase difference film 25 formed on one surface of the substrate 23. The phase difference film 25 is an oblique film having a columnar structure body 24 inclined with respect to a normal line N of a film formation surface 23a, which is one surface on which the phase difference film 25 is formed on the substrate 23. Hereinafter, the phase difference film 25 of this example is referred to as an oblique film 25.

Figure 4:
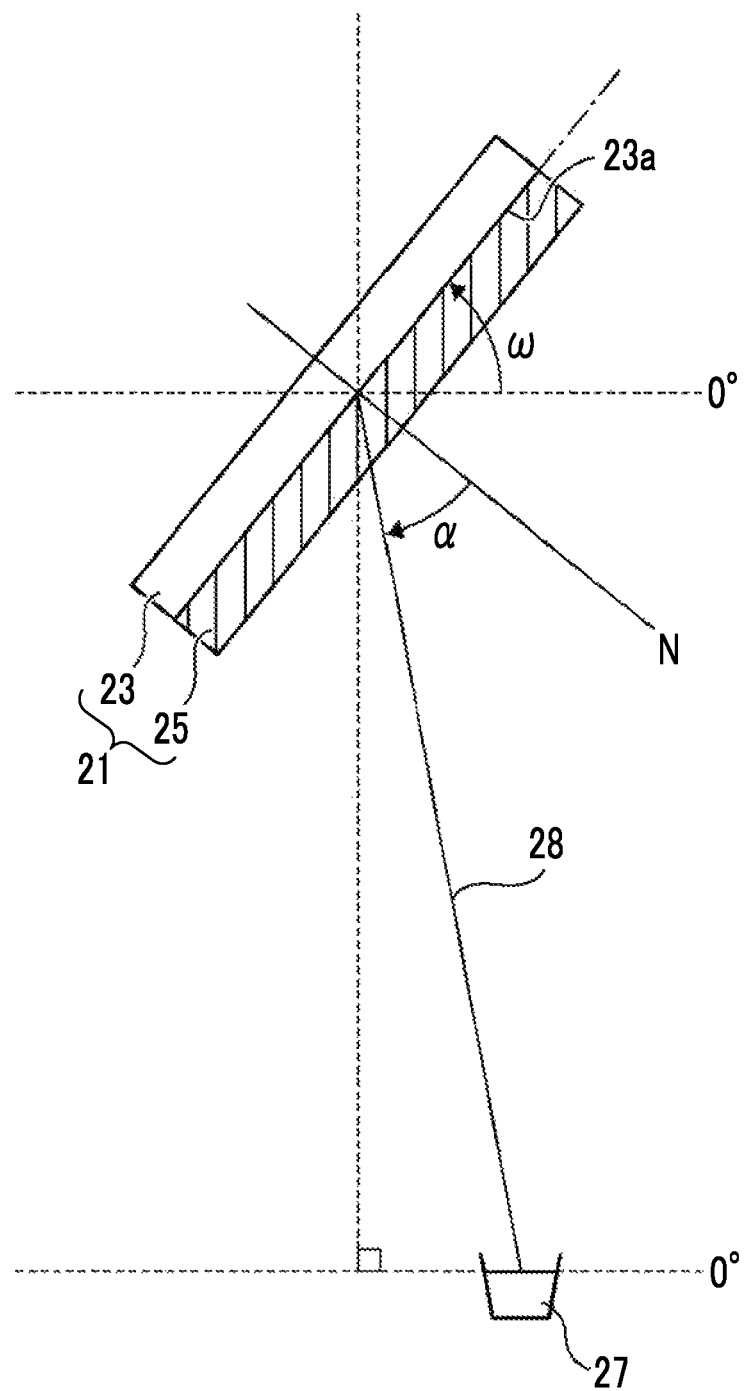
FIG. 4 is an explanatory diagram of a method for vapor-depositing an oblique film.

The oblique film 25 is produced by vapor-depositing an inorganic material such as $Ta_2O_5$ on the substrate 23 from an oblique direction by a so-called oblique vapor deposition method. Specifically, as shown in FIG. 4, while the substrate 23 is held in a posture in which the film formation surface 23a of the substrate 23 is inclined with respect to a vapor deposition source 27, a vapor deposition material from the vapor deposition source 27 is obliquely incident on the film formation surface 23a of the substrate 23 to perform a vapor deposition. By obliquely vapor-depositing the vapor deposition material on the film formation surface 23a of the substrate 23, the columnar structure body 24 inclined in accordance with an incidence direction (hereinafter, referred to as a vapor deposition direction) 28 of the vapor deposition material with respect to the film formation surface 23a grows, and the oblique film 25 having a structure in which the columnar structure bodies 24 stand is formed. In this case, an angle formed by the vapor deposition direction 28 and the normal line N of the film formation surface 23a is referred to as a vapor deposition angle α. In addition, in a case where the vapor deposition source 27 is disposed on a horizontal floor surface, an angle formed by a horizontal plane (plane parallel to a horizontal floor surface) indicated by a dotted line in FIG. 4 and the film formation surface 23a is referred to as an installation angle ω of the substrate 23. That is, the installation angle ω in a case where the substrate 23 is installed horizontally is 0°, and the installation angle ω in a case where the substrate 23 is installed perpendicular to the horizontal is 90°.

As shown in FIG. 3, a longitudinal direction 29 which is the growth direction of the columnar structure body 24 of the oblique film 25 generally does not coincide with the vapor deposition direction 28 (see also FIG. 4), but a growth angle φ formed between the columnar structure body 24 and the normal line N of the film formation surface 23a of the substrate 23 has a positive correlation with the vapor deposition angle α. That is, as the vapor deposition angle α increases, the growth angle φ of the columnar structure body increases, and as the vapor deposition angle α decreases, the growth angle φ of the columnar structure body also decreases. In reality, the growth direction 29 of the columnar structure body 24 tends to be a direction rising from the film formation surface 23a rather than the vapor deposition direction 28, and the growth angle φ is smaller than the vapor deposition angle α (φ<α). Due to the columnar structure in which the columnar structure bodies 24 stand, the phase difference film 25 exhibits refractivity anisotropy as an optical characteristic and functions as an O-plate. The growth direction 29 of the columnar structure body 24 is the longitudinal direction of the columnar structure body 24. Hereinafter, the growth direction 29 is referred to as a longitudinal direction 29.

Figure 5:
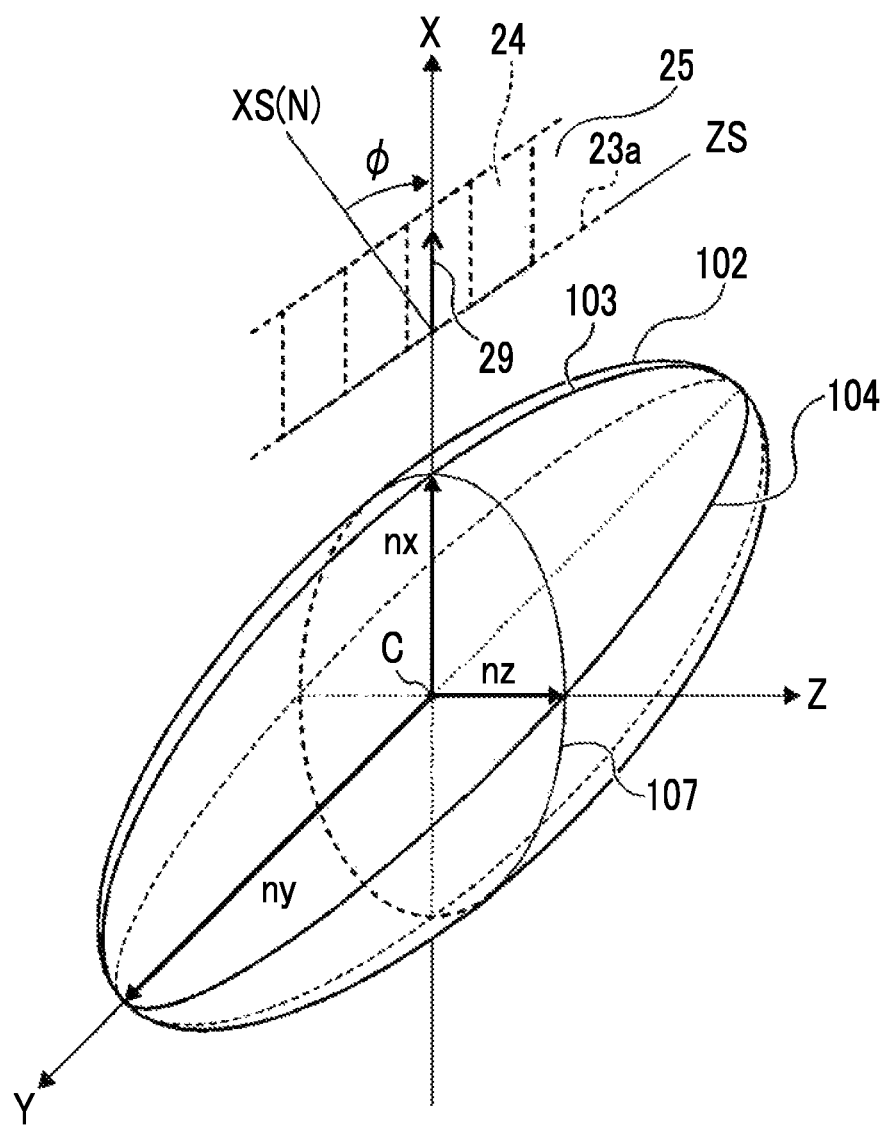
FIG. 5 is an explanatory diagram of a refractive index ellipsoid showing optical properties of the oblique film.
Figure 6A:
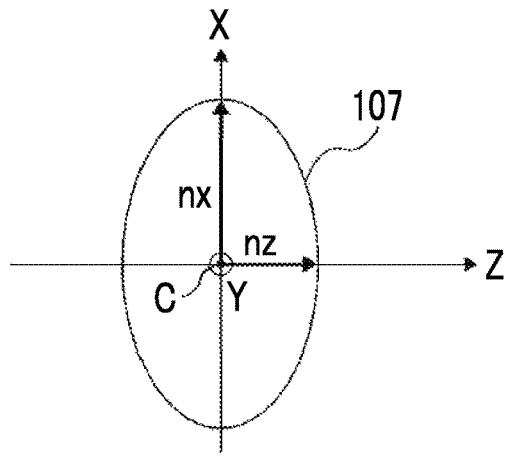
FIGS. 6A to 6C are trihedral views of the refractive index ellipsoid shown in FIG. 5.
Figure 6B:
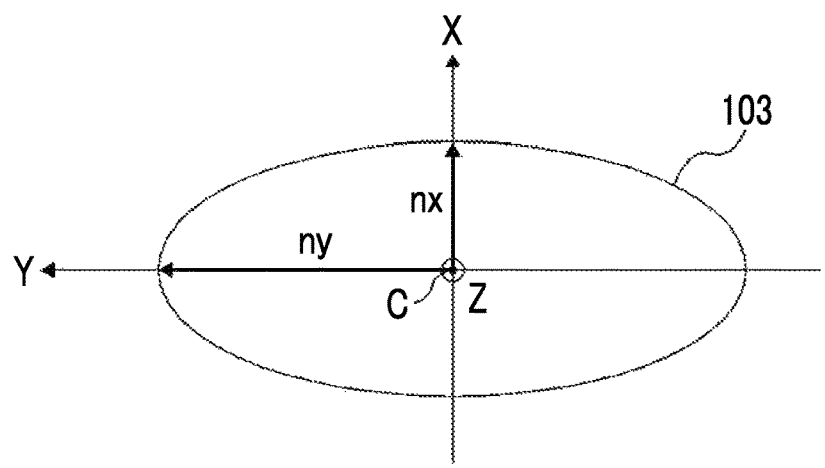
Figure 6C:
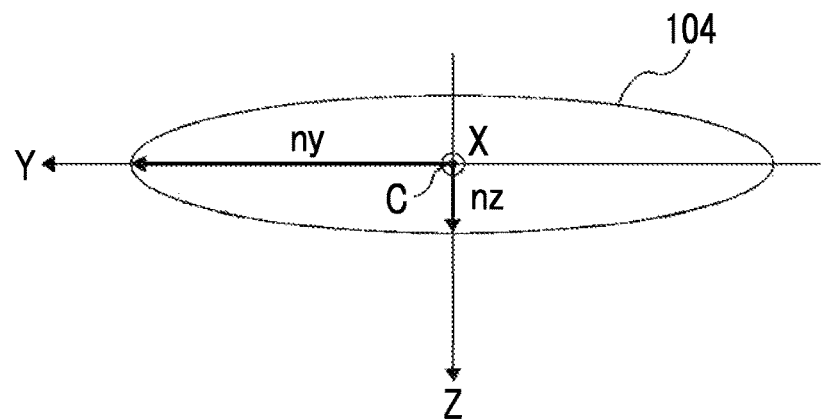

As shown in FIG. 5, the refractivity anisotropy of the oblique film 25 is conceptually represented by a refractive index ellipsoid 102 having three principal refractive indices of nx, ny, and nz as axes. FIG. 6A is a view of the refractive index ellipsoid 102 viewed from a Y-axis direction in FIG. 5, FIG. 6B is a view of the refractive index ellipsoid 102 viewed from a Z-axis direction in FIG. 5, and FIG. 6C is a view of the refractive index ellipsoid 102 viewed from an X-axis direction in FIG. 5. In the refractive index ellipsoid having biaxial birefringence, the principal refractive index means a refractive index of the major axis of the refractive index ellipsoid, a refractive index in a direction of a first minor axis perpendicular to a major axis of an ellipse obtained by cutting the refractive index ellipsoid along the major axis, and a refractive index in a direction of a second minor axis perpendicular to the major axis and the first minor axis.

As shown in FIGS. 5 and 6A to 6C, one of the three principal refractive indices nx, ny, and nz of the refractive index ellipsoid 102 forms an axis which coincides with the longitudinal direction 29 of the columnar structure body 24. An axis corresponding to the longitudinal direction 29 of the columnar structure body 24 is defined as an X-axis, and a principal refractive index along the X-axis is defined as nx. In addition, a major-axis direction of the ellipse 104 passing through a center C of the refractive index ellipsoid 102 and perpendicular to the X-axis is defined as a Y-axis, and the minor-axis direction is defined as a Z-axis. The principal refractive index in the Y-axis direction is defined as ny, and the principal refractive index in the Z-axis direction is defined as nz. In this case, the three principal refractive indices nx, ny, and ny satisfy Conditional Expression (1).

$$ny > nx > nz \qquad (1)$$

Figure 7A:
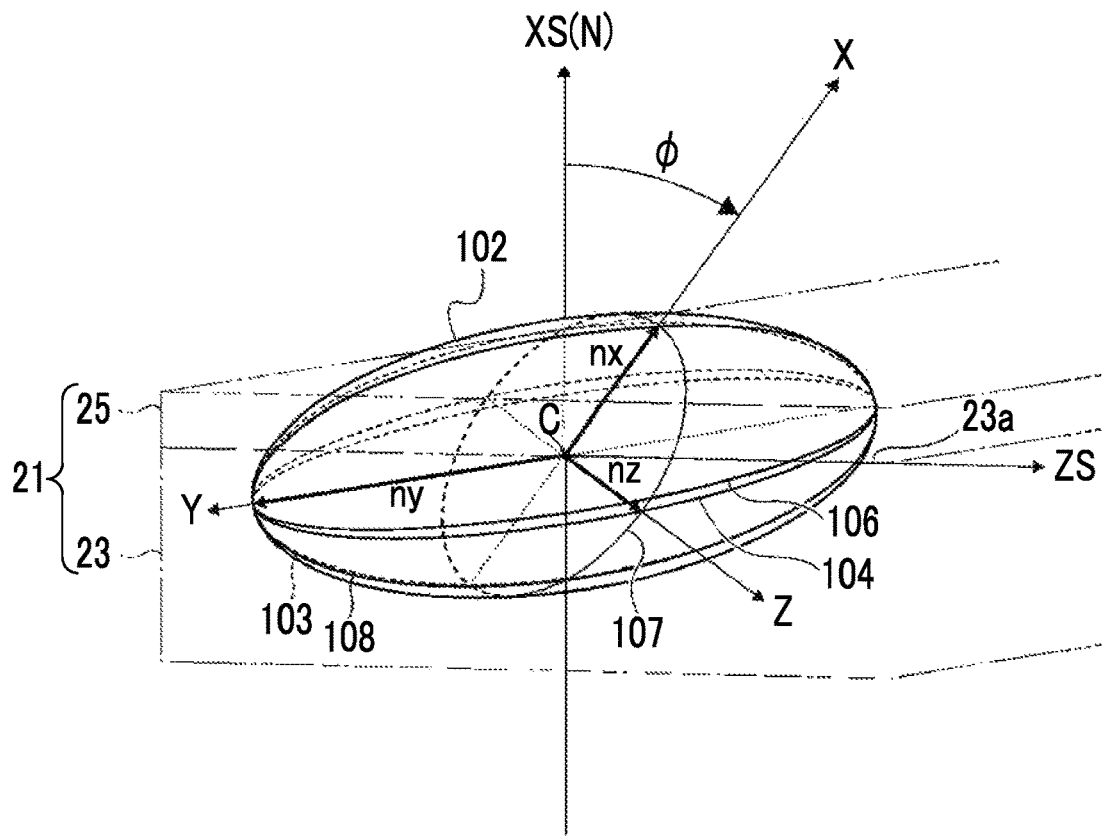
FIGS. 7A and 7B are explanatory diagrams of an inclination of the refractive index ellipsoid with respect to the phase difference plate.

FIG. 7A shows a relationship between the axes of the refractive index ellipsoid 102 with respect to the film surface of the phase difference plate 21 perpendicular to the incidence direction of light and the incidence direction of light with respect to the phase difference plate 21. Here, in the phase difference plate 21, the normal line N of the film formation surface 23a of the substrate 23 is defined as an XS-axis, and a YS-axis and a ZS-axis are taken on the film formation surface 23a perpendicular to the XS-axis. An axis obtained by projecting the Y-axis of the refractive index ellipsoid 102 onto the film formation surface 23a is defined as the YS-axis, and a direction orthogonal to the YS-axis is defined as the ZS-axis. In this case, the X-axis of the refractive index ellipsoid 102 is in an XS-ZS plane and is inclined by φ from the XS-axis. The ZS-axis coincides with an axis obtained by projecting the X-axis onto the film formation surface 23a.

Figure 7B:
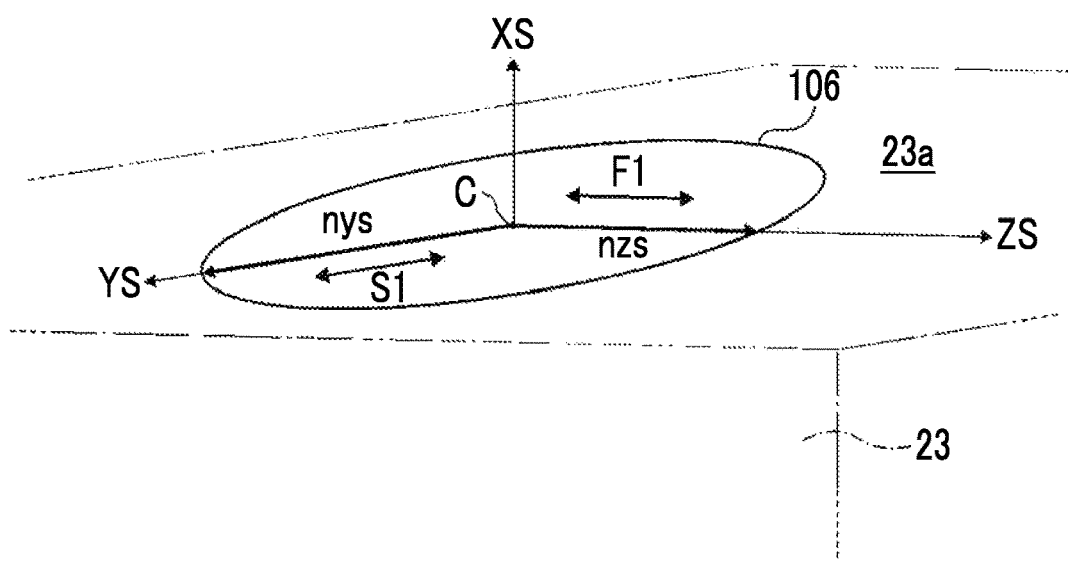

In a case of cutting the refractive index ellipsoid 102 with a plane passing through the center C of the refractive index ellipsoid 102 and parallel to the film formation surface 23a, as shown in FIG. 7B, a cross section thereof is an ellipse 106 which has a refractive index nys corresponding to a major axis radius in the YS-axis direction and a refractive index nzs corresponding to a minor axis radius in the ZS-axis direction. Therefore, the oblique film 25 exhibits birefringence having the refractive index nys in the YS-axis direction and the refractive index nzs in the ZS-axis direction with respect to light incident along the XS-axis. The refractive index nys is larger than the refractive index nzs. That is, the phase difference film 25 has a slow axis S1 in the YS-axis direction, which is the maximum refractive index with respect to light incident from the XS-axis direction. In addition, the phase difference film 25 has a fast axis F1 in the ZS-axis direction, which is the minimum refractive index with respect to light incident from the XS-axis direction. The slow axis S1 is orthogonal to an axis (ZS-axis) obtained by projecting the X-axis which coincides with the growth direction 29 onto the film formation surface 23a. That is, in a case where the YS-axis, which is obtained by projecting the Y-axis corresponding to the maximum principal refractive index ny in the three principal refractive indices nx, ny, and nz onto the film formation surface 23a and in which a phase of the incidence light is most delayed corresponding to the principal refractive index ny, is defined as the slow axis, and an axis obtained by projecting the X-axis onto the film formation surface 23a is defined as the ZS-axis, the slow axis S1 is orthogonal to the ZS-axis.

Figure 8A:
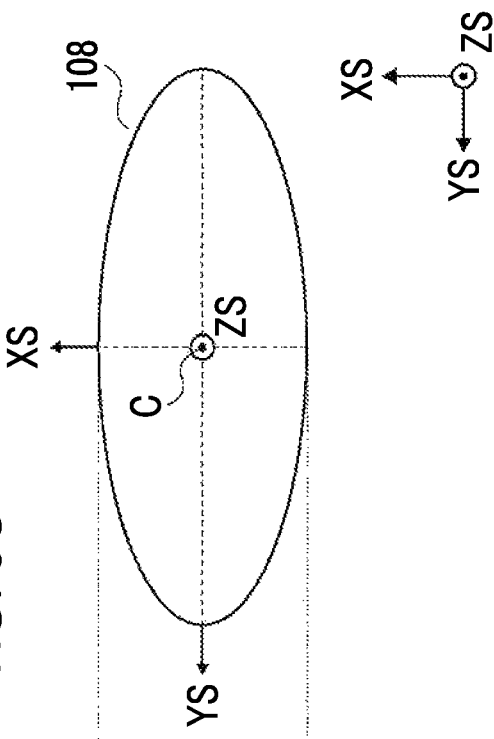
FIGS. 8A, 8B and 8C are explanatory diagrams of a cross-sectional view of the refractive index ellipsoid viewed from each axial direction in the phase difference plate.
Figure 8B:
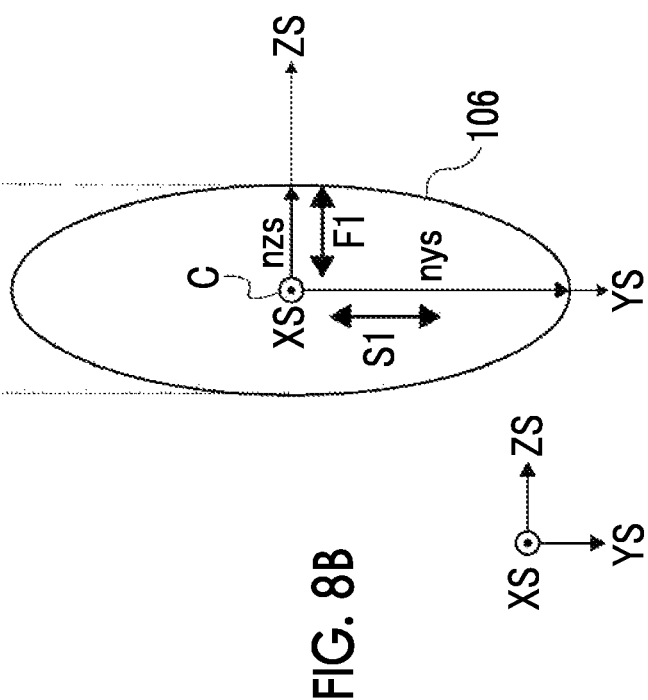
Figure 8C:
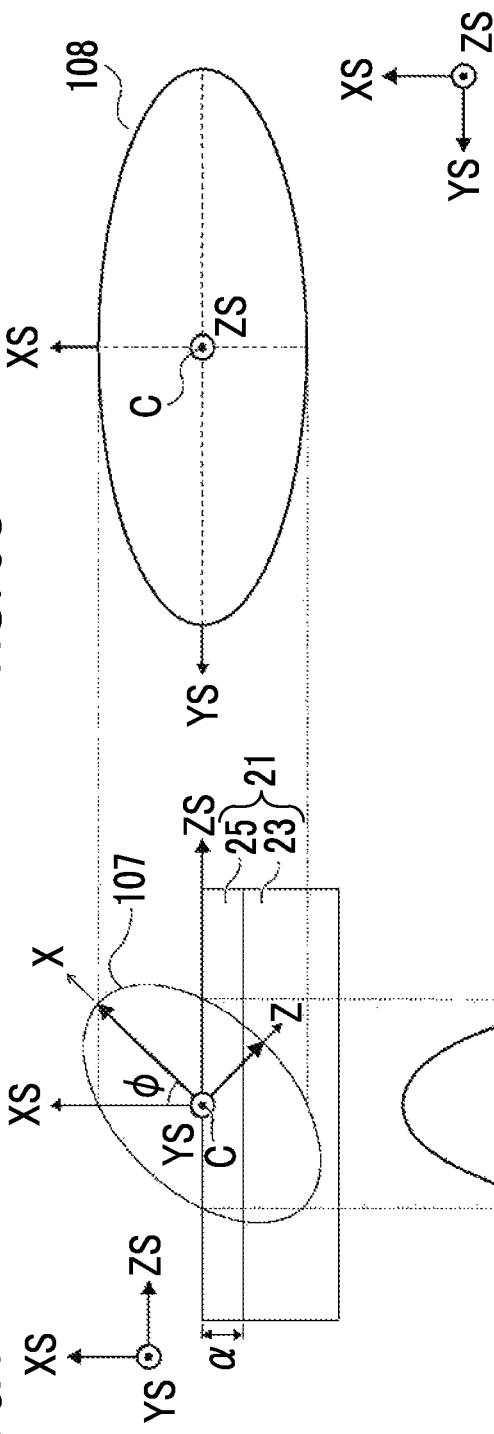

In the refractive index ellipsoid 102, FIG. 8A is a view of an ellipse 107 having cross section cut along the XS-ZS plane passing through the center C and viewed from the YS-axis direction. In addition, in the refractive index ellipsoid 102, FIG. 8B is a view of an ellipse 106 having cross section cut along the YS-ZS plane passing through the center C and viewed from the XS-axis direction. Further, in the refractive index ellipsoid 102, FIG. 8C is a view of an ellipse 108 having cross section cut along the XS-YS plane passing through the center C and viewed from the ZS-axis direction.

As described above, the X-axis and the Z-axis of the refractive index ellipsoid 102 exhibiting the refractivity anisotropy of the phase difference film 25 are rotated by φ about the YS-axis with respect to the XS-axis and the ZS-axis of the phase difference plate.

In such a refractive index ellipsoid 102, the phase difference generated in the incidence light changes depending on the inclination of the light incident on the refractive index ellipsoid 102. The phase difference which occurs in the refractive index ellipsoid 102 is a cross section perpendicular to the incidence light, and depends on a difference between the major axis and the minor axis of the ellipse formed in the cross section which passes through the center C of the refractive index ellipsoid 102. In a case where the refractive index of the ellipse in the major-axis direction is defined as n1, the refractive index of the ellipse in the minor-axis direction is defined as n2, and an optical path length of light incident perpendicular to the ellipse in the oblique film 25 is defined as d, a phase difference Re is represented by (n1−n2)d. All of n1, n2, and d change depending on the incidence direction of light on the refractive index ellipsoid.

In a case where the incidence angle of light on the oblique film 25 changes, the incidence direction of light on the refractive index ellipsoid changes. Therefore, the phase difference which occurs in the oblique film 25 changes depending on the incidence angle θ of the light.

Figure 9:
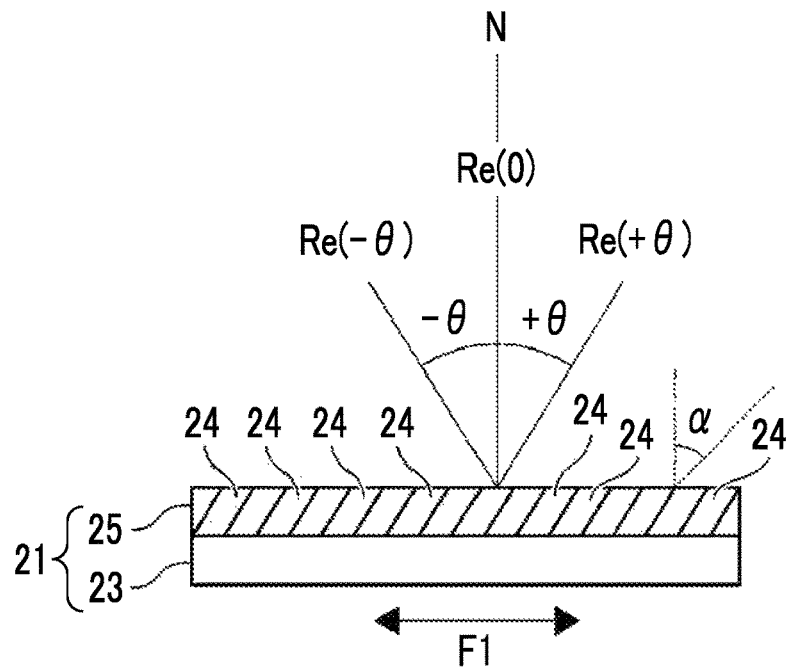
FIG. 9 is a diagram showing a relationship between an incidence angle of light and the phase difference film in measuring a phase difference Re(θ).

Here, as shown in FIG. 9, an incidence angle in a direction in which the columnar structure body 24 is inclined toward the growth direction 29 side with respect to the XS-axis which is the normal line N of the oblique film 25 is regarded as positive (+θ), and an incidence angle in a direction opposite to the growth direction of the columnar structure body 24 is regarded as negative (−θ). In this case, a phase difference Re(0) with respect to light incident on the oblique film 25 along the XS-axis, that is, light incident at an incidence angle of 0° is referred to as a front phase difference. In a case where light is incident on the oblique film 25 from the XS-axis, the phase difference Re(0) is determined by a difference between the refractive index nys in the direction of the YS-axis, which is the major axis of the ellipse of the refractive index ellipsoid (see FIG. 8B), in the plane perpendicular to the XS-axis, that is, the YS-ZS plane and the refractive index nzs in the ZS-axis direction which is the minor axis and a film thickness d. That is, Re(0)=(nys−nzs)d.

In the oblique film 25 of the present embodiment, a Re(30) ratio which is a phase difference ratio of a phase difference Re(+30) of incidence light with a negative incidence angle of +30° to a phase difference Re(−30) of incidence light with a positive incidence angle of −30° satisfies Conditional Expression (2).

$$Re(30) \text{ ratio}=Re(30)/Re(-30)=1.1 \text{ to } 4.0 \quad (2)$$

In the liquid crystal display element 10, the phase difference plate 21 provided with the oblique film 25 as described above is disposed so that the slow axis S1 of the oblique film 25 and the tilt orientation of the liquid crystal molecules 75 are parallel to each other, that is, so as to be parallel to the fast axis F due to the pre-tilt of the liquid crystal molecules 75. In a case where the phase difference plate 21 is used as the phase difference compensation element 20, the slow axis S1 of the oblique film 25 corresponds to the slow axis S in the phase difference compensation element 20. As a result, as described above, the phase difference caused by the pre-tilt of the liquid crystal molecules 75 and the phase difference caused by the phase difference plate 21 have opposite polarities, so that the phase difference can be compensated. However, in an actual liquid crystal display element, the pre-tilted liquid crystal molecules 75 are not the only cause of the phase difference, and the phase difference occurs due to various factors such as diffraction of light due to a fine structure of the liquid crystal cell and generation of a phase difference due to the polarizer 15 and the analyzer 19. Therefore, in the phase difference plate 21, the arrangement in which the slow axis S1 and the fast axis F of the liquid crystal molecules coincide may be not necessarily the best. Therefore, in order to adjust the direction of the slow axis S of the phase difference plate 21 with respect to the fast axis F of the liquid crystal molecules 75 due to the pre-tilt, while observing the contrast of the projected image, the phase difference plate 21 is rotationally adjusted around the XS-axis so that the azimuthal angle provides a high contrast.

In the oblique film in the related art, light is scattered in the oblique vapor deposition film due to relaxation of the columnar structure, and quality as a phase difference plate may deteriorate. The scattering of light in the film is evaluated by a haze, and as the haze is larger, the scattering of light in the film is larger. In a case where a phase difference plate having a large haze is applied to the liquid crystal display element 10 as the phase difference compensation element 20, the contrast of the liquid crystal display element 10 is decreased. The decrease in contrast occurs because a polarization component of the scattered light generated in the oblique film which is not aligned with the absorption axis of the analyzer 19 passes through the analyzer 19 and causes deterioration of a black level. Therefore, in order to improve the contrast, it is desirable to suppress the haze to be small.

Figure 10:
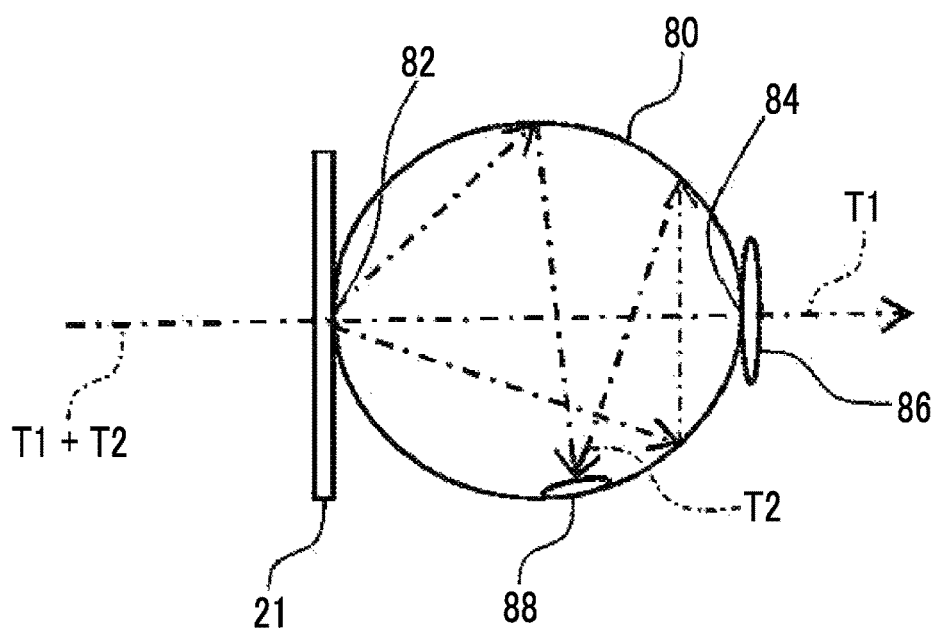
FIG. 10 is a diagram illustrating a method for measuring a haze.

A haze of the oblique film 25 can be measured using an integrating sphere. As shown in FIG. 10, an integrating sphere 80 includes an incidence opening 82 and an emission opening 84 which faces the incidence opening 82 and is provided at a position rotated by 180° from the incidence opening 82. In addition, photodetectors 86 and 88 are provided at the emission opening 84 of the integrating sphere 80 and inside the integrating sphere 80. The photodetector 86 provided at the emission opening 84 receives light which incident along a diameter of the integrating sphere 80 from the incidence opening 82 and has passed through the integrating sphere in a straight line. The photodetector 88 disposed inside the integrating sphere 80 receives the incidence light which does not travel straight but is scattered and reflected within the integrating sphere 80. The phase difference plate 21 is disposed at the incidence opening 82 so that the film surface is perpendicular to the light incident along the diameter. An incidence light L is incident perpendicularly to the film surface of the phase difference plate 21, passes through the phase difference plate 21, travels straight through the phase difference plate 21 without being scattered by the phase difference plate 21, and reaches the emission opening, and the photodetector 86 detects an amount of vertically transmitted light T1. In addition, the photodetector 88 disposed inside the integrating sphere detects an amount of scattered light T2 of the incidence light L, which is scattered by the phase difference plate 21 and is repeatedly reflected in the integrating sphere 80 without traveling straight. In this case, the haze [%] of the phase difference plate 21 is calculated based on the following expression.

$$\text{Haze } [\%] = (T2/(T1+T2)) \times 100 \qquad (5)$$

The haze of the oblique film 25 is obtained by measuring a haze in a case of only the substrate 23 by the above-described method and subtracting the haze in a case of only the substrate from the haze of the phase difference plate 21. In a case where the substrate 23 is a glass substrate, the haze is almost 0.

Figure 11:
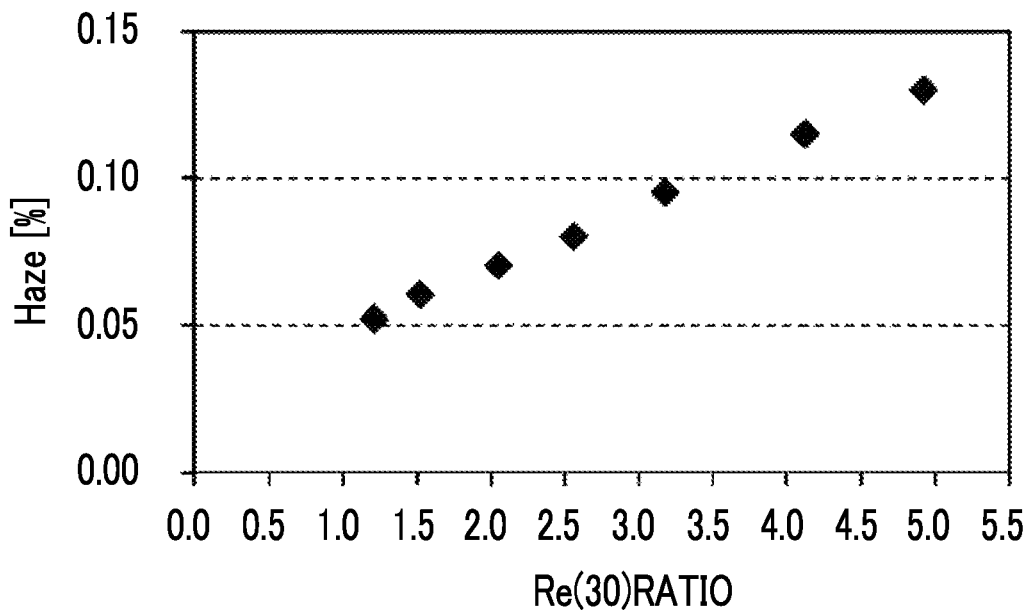
FIG. 11 is a diagram showing a relationship between a Re(30) ratio and the haze.

In the oblique film 25 having the refractivity anisotropy represented by the refractive index ellipsoid 102 in which the principal refractive indices nx, ny, and nz satisfy the above-described expression (1), the present inventors have found that there is a correlation between the Re(30) ratio and the haze as shown in FIG. 11. In a case where Re(+30), Re(−30), and the Re(30) ratio satisfy the above (2), the haze of the oblique film 25 can be suppressed to 0.1% or less. In a case where the Re(30) ratio is 4.0 or less, that is, in a case where the haze is suppressed to 0.1% or less, as compared with a case where the Re(30) ratio exceeds 4.0, the contrast can be improved in a case of being applied to the liquid crystal display element as the phase difference compensation element 20.

Figure 12:
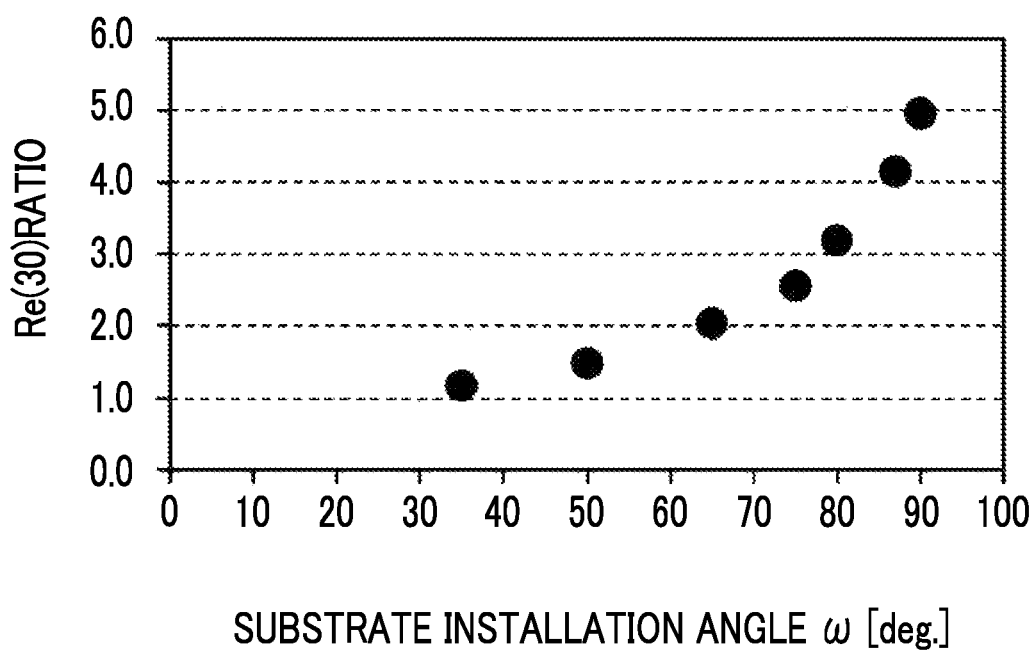
FIG. 12 is a diagram showing a relationship between a substrate installation angle ω and the Re(30) ratio.

The oblique film 25 satisfying the above-described expressions (1) and (2) can be produced by adjusting the substrate installation angle ω during the oblique vapor deposition. As an example, in the vapor deposition method shown in FIG. 4, in a case where a plurality of oblique films is produced by changing the substrate installation angle ω with the vapor deposition source 27 arranged directly under the center of the substrate 23 and the Re(30) ratio is measured, a relationship shown in FIG. 12 is obtained. In this example, tantalum pentoxide ($Ta_2O_5$) is used as a material of the oblique film 25. As shown in FIG. 12, the Re(30) ratio increases as the substrate installation angle ω increases. In a case of this example, the Re(30) ratio of 4.0 or less can be obtained by setting the substrate installation angle ω to be approximately 85 degrees or less. The relationship between the substrate installation angle ω and the Re(30) ratio depends on a configuration of the vapor deposition apparatus, and the relationship between the Re(30) ratio and the substrate installation angle ω shown in FIG. 12 changes depending on the vapor deposition apparatus. However, the tendency that the Re(30) ratio increases as the substrate installation angle ω increases is common regardless of the configuration of the vapor deposition apparatus. Therefore, by measuring the relationship between the two in advance, the oblique film 25 having a desired Re(30) ratio can be obtained.

It is preferable that the Re(30) ratio satisfies Conditional Expression (2-1).

$$\text{Re}(30) \text{ ratio} = \text{Re}(30)/\text{Re}(-30) = 1.2 \text{ to } 4.0 \qquad (2\text{-}1)$$

By satisfying Conditional Expression (2-1), an effect of improving the black display unevenness can be obtained in a phase difference plate 31 (see FIG. 16) provided with two layers of the oblique film 25, which will be described later.

It is more preferable that the Re(30) ratio satisfies Conditional Expression (2-2).

$$\text{Re}(30) \text{ ratio} = \text{Re}(30)/\text{Re}(-30) = 1.4 \text{ to } 3.0 \qquad (2\text{-}2)$$

By satisfying Conditional Expression (2-2), an effect of improving the black display unevenness can be obtained in a phase difference plate 31 (see FIG. 16) provided with two layers of the oblique film 25, which will be described later, and the contrast can be improved.

It is particularly preferable that the Re(30) ratio satisfies Conditional Expression (2-3).

$$\text{Re}(30) \text{ ratio} = \text{Re}(30)/\text{Re}(-30) = 1.5 \text{ to } 2.5 \qquad (2\text{-}3)$$

By satisfying Conditional Expression (2-3), the black display unevenness and the contrast can be further improved in a phase difference plate 31 (see FIG. 16) provided with two layers of the oblique film 25, which will be described later.

As a material of the oblique film 25, an oxide containing at least one of Si, Nb, Zr, Ti, La, Al, Hf, or Ta can be used. That is, the oblique film 25 can include an oxide containing at least one of Si, Nb, Zr, Ti, La, Al, Hf, or Ta. By using these materials, an oblique film composed of a good columnar structure body can be obtained.

The aspect of forming the oblique film 25 by the oblique vapor deposition method has been described, but the method for forming the oblique film 25 is not limited to the above-described method. Any forming method may be used as long as the columnar structure body 24 can be grown on the film formation surface 23a of the substrate 23 in a direction inclined from the normal line N to obtain the oblique film 25. The vapor deposition method is not limited to the vacuum vapor deposition, and electron beam vapor deposition, ion plating, or the like can be used. In addition, chemical vapor deposition (CVD) may be used. Furthermore, a sputtering method, a reactive sputtering method, or the like can also be used.

The results of investigating the relationship between the three principal refractive indices nx, ny, and nz of the refractive index ellipsoid 102 exhibiting the refractivity anisotropy of the oblique film 25 having an Re(30) ratio of 3, which is produced by the above-described method, will be described.

Figure 13:
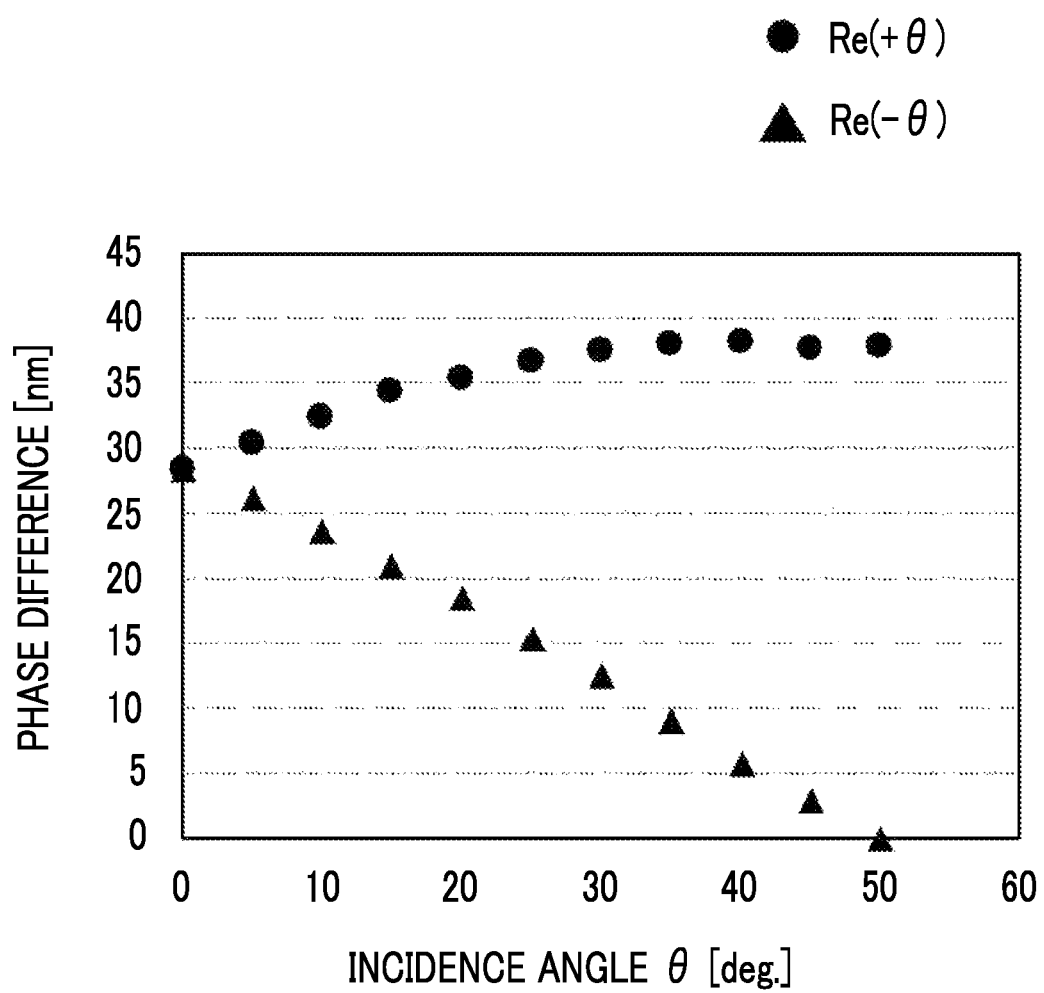
FIG. 13 is a diagram showing an incidence angle dependence of a phase difference in the oblique film.

In the phase difference plate 21 provided with the oblique film 25 having an Re(30) ratio of 3, the incidence angle dependence of the phase difference is as shown in FIG. 13. In measuring the phase difference of FIG. 13, first, a plane of the refractive index ellipsoid 102, which is orthogonal to the incidence light, is considered. For example, in a case shown in FIG. 14A, for light incident from the XS-axis direction, the YS-ZS plane is a plane of the refractive index ellipsoid 102 perpendicular to the incidence light. In addition, the ZY-plane is orthogonal to a light LX incident from the X-axis direction. In a case where the incidence light is inclined from the XS-axis to the YS-axis, the plane orthogonal to the incidence light is inclined about the YS-axis. Therefore, even in a case where the incidence direction is inclined from the XS-axis, a radius in the YS-axis direction on the plane orthogonal to the incidence light is constant, and the refractive index nys (=ny) represented by the radius in the YS-axis direction is constant. On the other hand, since a radius in an axial direction orthogonal to the YS-axis changes depending on the incidence angle, a refractive index n(θ) in the axial direction changes depending on the incidence angle θ. The phase difference with respect to the incidence light passes through the center C of the refractive index ellipsoid 102 and is proportional to a difference between a major axis radius and a minor axis radius of the ellipse of the refractive index ellipsoid 102 on the plane perpendicular to the incidence light. In this example, with the refractive index nys as a reference, the phase difference is measured by subtracting the refractive index n(θ) which changes depending on the incidence angle from the reference refractive index nys.

As shown in FIG. 13, in the oblique film 25, the phase difference increases as the incidence angle θ increases in the positive direction, and the phase difference is substantially constant in a case where the incidence angle θ is 30° or more. On the other hand, the phase difference decreases as the incidence angle θ increases in the negative direction, and the phase difference is 0 in a case where the incidence angle θ is 50°.

Figure 14A:
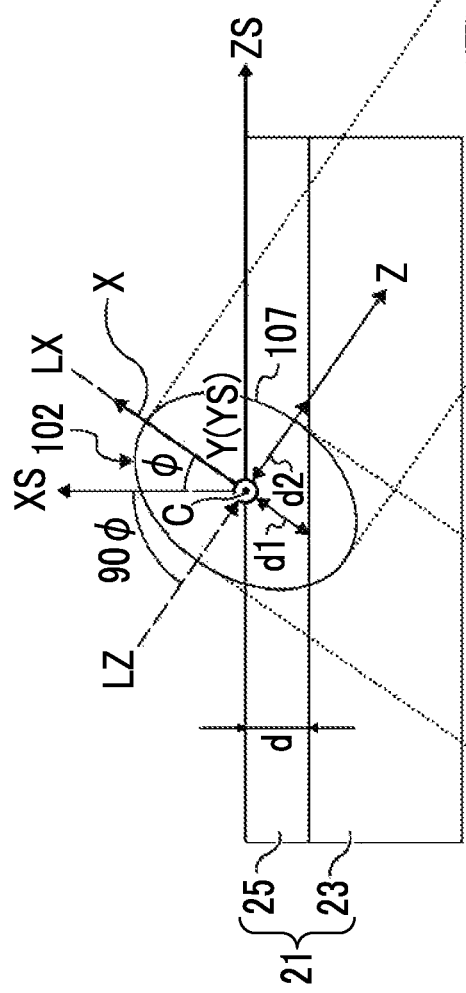
FIGS. 14A, 14B and 14C are diagrams for explaining a phase difference with respect to light incident from a growth direction and a direction orthogonal to the growth direction.
Figure 14C:
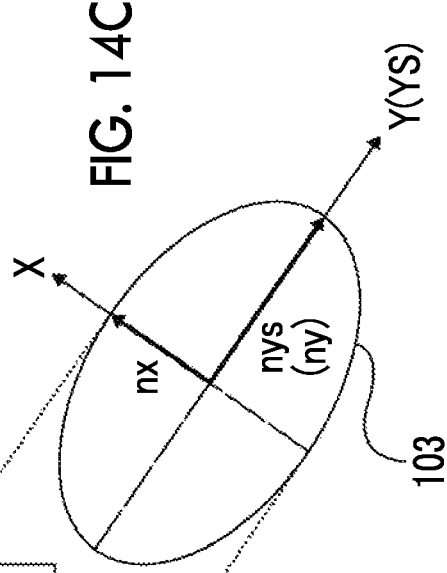
Figure 14B:

As described with reference to FIG. 5, the X-axis of the principal refractive index nx of the refractive index ellipsoid 102 coincides with the growth direction 29 (see FIG. 3) of the columnar structure body 24. Therefore, as shown in FIG. 14A, in a case where a light LX is incident on the oblique film 25 along the X-axis direction, the light LX is incident perpendicularly to the Y-Z plane of the refractive index ellipsoid 102. Therefore, the light LX incident on the oblique film 25 along the X-axis direction is affected by the refractive index represented by the ellipse 104 shown in FIG. 14B. In this case, from a relationship between the principal refractive indices ny and nz in the refractive index ellipsoid 102 and an optical path length d1 in the oblique film 25, a phase difference generated in the light LX incident on the oblique film 25 is represented by Re(φ)=(ny−nz)d1. d1 is d/cos φ.

In addition, in a case where a light LZ is incident on the oblique film 25 along the Z-axis and perpendicular to the X-axis, the light LZ is incident perpendicularly to the X-Y plane of the refractive index ellipsoid 102. Therefore, the light LZ incident on the oblique film 25 along the Z-axis direction is affected by the refractive index represented by an ellipse 103 shown in FIG. 14C. In this case, from a relationship between the principal refractive indices ny and nx in the refractive index ellipsoid 102 and an optical path length d2 in the oblique film 25, a phase difference generated in the light LZ incident on the oblique film 25 is represented by Re(φ−90)=(ny−nx)d2. d2 is d/cos(φ−90).

In a case where the phase difference plate 21 is observed with a transmission electron microscope, the growth angle φ (see FIG. 3) of the columnar structure body 24 of the oblique film 25 is 45°. That is, in FIG. 13, a phase difference Re(+45) at the positive incidence angle θ=45° is a phase difference Re(+45) resulting from the difference between the principal refractive indices ny and nz in the refractive index ellipsoid 102. In addition, in FIG. 13, a phase difference Re(−45) at the negative incidence angle θ=45° is a phase difference resulting from the difference between the principal refractive indices ny and nx in the refractive index ellipsoid 102.

From the relationship of Re(+45)>Re(−45) in FIG. 13, (ny−nz)d1>(ny−nz)d2. Here, in a case of φ=45°, since d1=d2, ny−nz>ny−nz. In addition, since (ny−nz)d1>0 and (ny−nx)d2>0, the oblique film 25 of the example shown in FIG. 13 satisfies ny>nx>nz.

Here, the function of the phase difference plate 21 will be described with reference to Test Example 1.

Test Example 1

An oblique film having a front phase difference Re(0) of 23 nm is formed on a glass substrate by an oblique vapor deposition. $Ta_2O_5$ is used as a material of the oblique film. A vapor deposition angle is changed by changing the substrate installation angle ω, and phase difference plate samples 1-1 to 1-11 provided with oblique films having various Re(30) ratios are produced.

An optical engine of a commercially available liquid crystal projector is diverted, and as shown in FIG. 1, the liquid crystal display element 10 is configured of the polarizer 15, the liquid crystal layer 17, the phase difference plate of each sample as the phase difference compensation element 20, and the analyzer 19 in this order. A screen is disposed at a position where light passing through the analyzer 19 is projected, white display and black display are performed on the screen, and the contrast and the black display unevenness are each evaluated according to the following standard. In this case, the slow axis of the oblique film is made to coincide with the fast axis F caused by the pre-tilt component of the liquid crystal layer 17. The fast axis caused by the pre-tilt component of the liquid crystal layer 17 in this example is 45° orientation, and the slow axis S of the oblique film in the phase difference plate is made to coincide with the 45° orientation.

With regard to the contrast, a value of illuminance during white display in a case where illuminance of the black display is set to 1 is measured, and the measured value is evaluated as follows.

A: 2000 or more
B: 1500 or more and less than 2000
C: 1000 or more and less than 1500
D: less than 1000

In this configuration, in a case where the phase difference compensation element 20 is not provided, black display:white display is 800:1.

Figure 15:
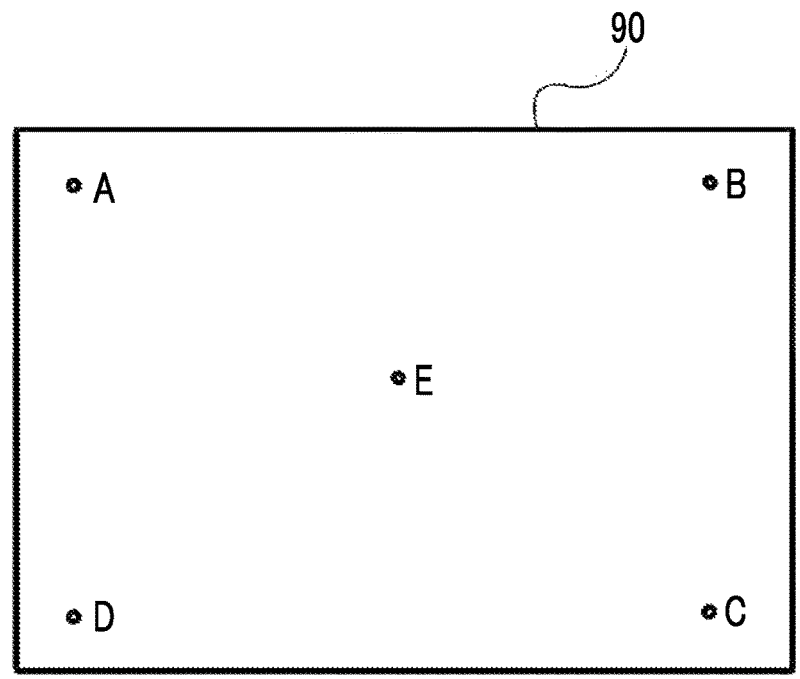
FIG. 15 is an explanatory diagram of a method for evaluating a black display unevenness.

With regard to the black display unevenness, as shown in FIG. 15, illuminance of the black display is measured at points A, B, C, and D at four corners of a screen 90 and a point E at the center of the screen 90, respectively, and the black display unevenness is calculated as ((A+D)−(B+C))/E. The calculated value of the black display unevenness is evaluated as follows.

A: 2 or less
B: more than 2 and 4 or less
C: more than 4 and 6 or less
D: more than 6

Further, with regard to the evaluation results of the contrast and the black unevenness, in a case where the evaluation A is counted as 7 points, the evaluation B is counted as 5 points, the evaluation C is counted as 3 points, and the evaluation D is counted as 0 point, for each example, the total score is obtained by adding the score for contrast and the score for black display unevenness. As the total score is higher, the quality as the phase difference plate is better. The results are shown in Table 1.

TABLE 1

| Sample | Re(30) ratio | Contrast | Black display unevenness | Total score |
|---|---|---|---|---|
| 1-1 | 1 | D | B | 5 |
| 1-2 | 1.1 | C | B | 8 |
| 1-3 | 1.5 | C | B | 8 |
| 1-4 | 2 | C | B | 8 |
| 1-5 | 2.5 | C | C | 6 |
| 1-6 | 3 | C | C | 6 |
| 1-7 | 3.5 | C | C | 6 |
| 1-8 | 4 | C | C | 6 |
| 1-9 | 4.5 | D | C | 3 |
| 1-10 | 5 | D | C | 3 |
| 1-11 | 5.5 | D | D | 0 |

The samples 1-2 to 1-8 shown in Table 1, in which Re(30) is 1.1 to 1.4, correspond to Examples of the phase difference plate according to the present disclosure. The sample 1-1 in which Re(30) is 1 has a uniaxial refractivity anisotropy in which ny=nz and is one of Comparative Examples. The samples 1-2 to 1-8 have a high evaluation of the contrast as compared with other samples, and improvement in high contrast has been achieved. In addition, the total score of the contrast and the black display unevenness is high, and an effect of suppressing the black display unevenness while improving the contrast is obtained. In the samples in which Re(30) is 1.1 to 2.0, the effects of further improving the contrast and suppressing the black display unevenness are obtained.

Phase Difference Plate According to Second Embodiment

The phase difference plate used as the phase difference compensation element 20 is not limited to the configuration in which only one oblique film 25 is provided as in the phase difference plate 21, and two or more layers of the oblique film 25 may be laminated. As a phase difference plate according to a second embodiment, a phase difference plate 31 including two layers of the oblique film will be described.

Figure 16:
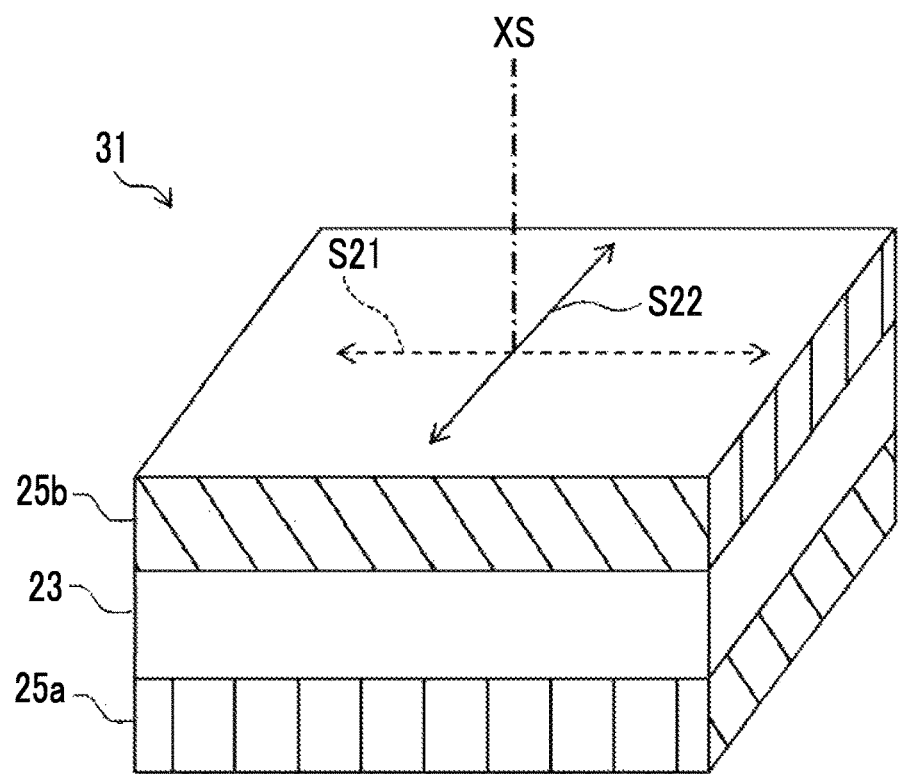
FIG. 16 is a perspective view showing a schematic configuration of a phase difference plate according to a second embodiment.

As shown in FIG. 16, in the phase difference plate 31 according to the present embodiment, a first oblique film 25a is provided on one surface of a substrate 23, and a second oblique film 25b is formed on the other surface. That is, in the phase difference plate 31, the oblique film is formed on both surfaces of the substrate layer by layer.

The first oblique film 25a and the second oblique film 25b in the present embodiment are produced in the same manner as the above-described oblique film 25, and optical properties and the like are thereof also the same. That is, same as the oblique film 25, the first oblique film 25a and the second oblique film 25b have the refractivity anisotropy represented by the refractive index ellipsoid 102 in which the principal refractive indices nx, ny, and nz satisfy the above-described expression (1). In addition, Re(+30), Re(−30), and the Re(30) ratio satisfy the above-described expression (2).

Since the first oblique film 25a and the second oblique film 25b satisfy the above-described expressions (1) and (2), the haze can be suppressed to 0.1% or less. Since the haze is integrated in a case where the two-layer oblique films 25a and 25b are laminated, the haze as the phase difference plate 31 is increased. However, since the oblique films 25a and 25b satisfy the above-described expressions (1) and (2), the haze in a case of being laminated can also be suppressed and the haze in a case of being laminated can be reduced to 0.3% or less (see FIG. 28 described later). In a case where two or more layers of the oblique films 25a and 25b are provided and the phase difference plate has a haze of 0.3% or less, as compared with a case where the Re(30) ratio exceeds 4, the contrast can be improved in a case of being applied to the liquid crystal display element as the phase difference compensation element 20, and the black display unevenness can be suppressed.

In the phase difference plate 31, the first oblique film 25a and the second oblique film 25b are arranged such that a slow axis S21 of the first oblique film 25a and a slow axis S22 of the second oblique film 25b are substantially orthogonal to each other and intersect at an intersecting angle of 90°±3°.

As described above, in the phase difference plate 21 having the oblique film 25 as a single layer, the slow axis S1 of the oblique film 25 and the fast axis F of the liquid crystal layer 17 are arranged in parallel in the liquid crystal display element 10. In the case of the phase difference plate 31 having two-layer oblique films 25a and 25b, the oblique film 25a and the oblique film 25b are arranged such that a synthetic slow axis S2 formed by synthesizing the slow axis S21 of the first oblique film 25a and the slow axis S22 of the second oblique film 25b is parallel to the fast axis F of the liquid crystal layer 17. As a result, the phase difference caused by the pre-tilt of the liquid crystal molecules 75 and the phase difference caused by the phase difference plate 31 have opposite polarities, so that the phase difference caused by the pre-tilt can be compensated.

Figure 17A:
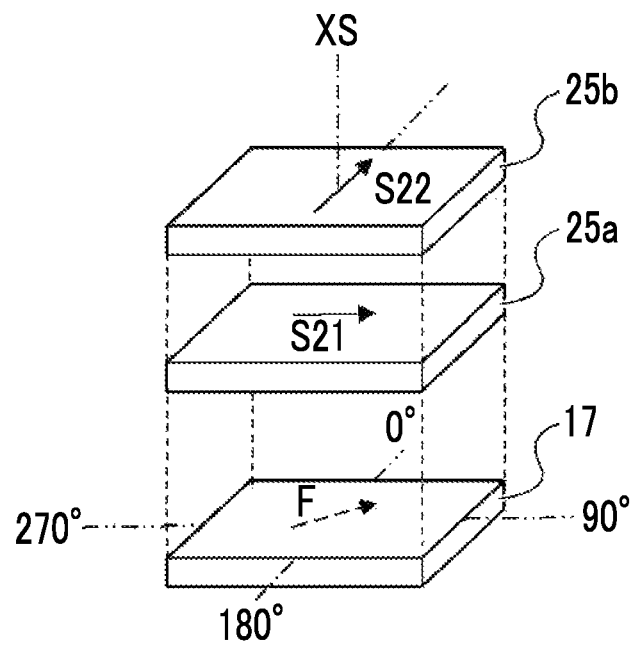
FIGS. 17A and 17B are explanatory diagrams of a synthetic slow axis in a case where a two-layer oblique film is provided.

For example, as shown in FIG. 17A, in a case where the fast axis F of the tilt component of the liquid crystal layer 17 in the liquid crystal display element 10 is in a 45° orientation, the slow axis S21 of the first oblique film 25a is aligned with a 90° orientation, and the slow axis S22 of the second oblique film 25b is aligned with a 0° orientation. With this arrangement, the synthetic slow axis S2, which is a combination of the slow axis S21 and the slow axis S22, has a 45° orientation and coincides with the fast axis F.

Here, the intersecting angle of the slow axes of the first oblique film 25a and the second oblique film 25b will be examined. According to studies by the present inventors, it is preferable that the intersecting angle deviates slightly from 90°. It is preferable that the deviation is in a range of ±5° with respect to 90°, and it is more preferable that the deviation is in a range of ±3°. The reason will be described below.

Figure 18A:
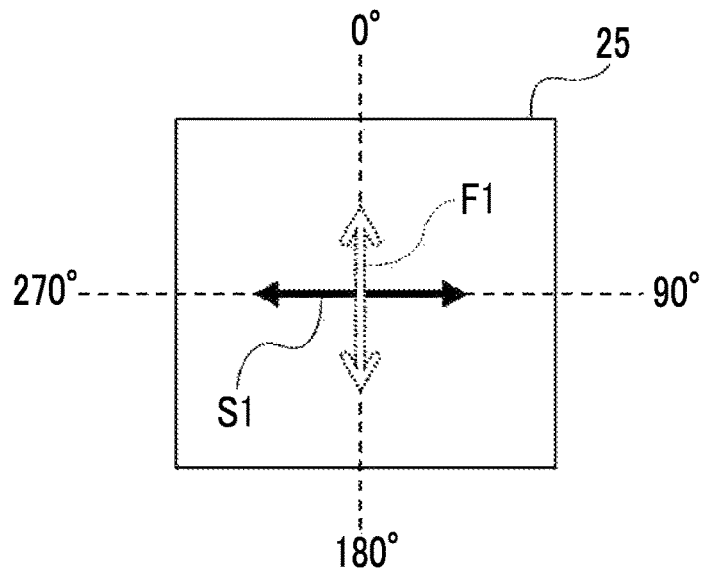
FIGS. 18A to 18C are explanatory diagrams of in-substrate plane optical anisotropy of the oblique film.
Figure 18B:
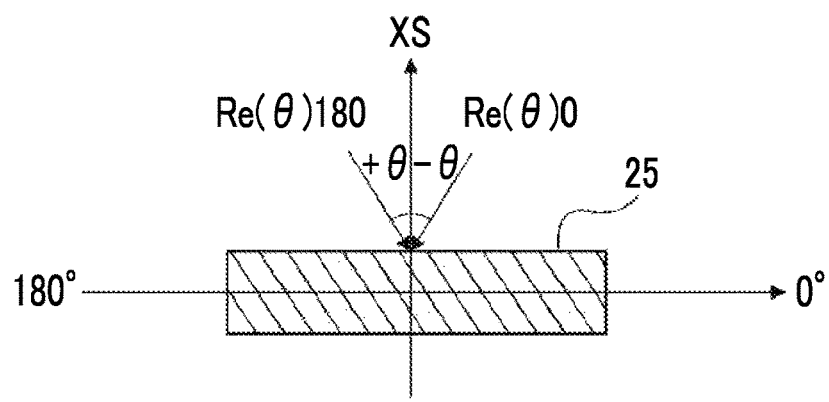
Figure 18C:
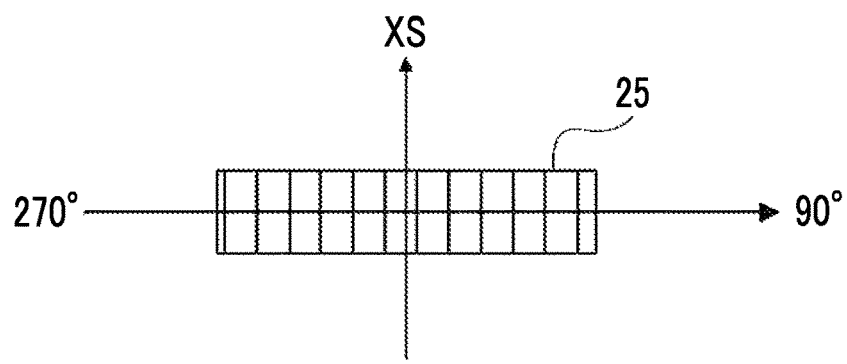

First, in-plane optical anisotropy of the oblique film 25 will be described with reference to FIGS. 18A to 18C. As shown in FIG. 18A, in the plane of the oblique film 25, an axis in which the vapor deposition direction 28 (see FIGS. 3 and 4) is projected onto the film formation surface 23a (see FIG. 3) is orthogonal to the slow axis S1. The axis in which the vapor deposition direction 28 is projected onto the film formation surface 23a and the axis in which the growth direction 29 is projected onto the film formation surface 23a coincide with each other. The fast axis F1 orthogonal to the slow axis S1 is defined as an orientation of 0° to 180°. FIG. 18B is a cross section along the fast axis F1 of the oblique film 25 shown in FIG. 18A, and FIG. 18C is a cross section along the slow axis S1 of the oblique film 25 shown in FIG. 18A. The columnar structure body 24 is inclined in a cross section along the fast axis F1. Therefore, even in a case where the incidence angles θ are the same but the incidence orientations are different from each other, the phase difference that light receives in a case of passing through the columnar structure body 24 is different. In the following, the phase difference between the incidence angle θ and an azimuthal angle η may be referred to as Re(θ)η. For example, the phase difference at an incidence angle of 15° and an azimuthal angle of 90° is Re(15)90°. As described with reference to FIG. 9, according to this notation, a phase difference Re(θ) with respect to incidence light with an incidence angle θ inclined from the normal line to the growth direction is Re(θ)180, and a phase difference Re(−θ) with respect to incidence light with an incidence angle θ inclined from the normal line to an opposite side of the growth direction is Re(θ)0.

Figure 17B:
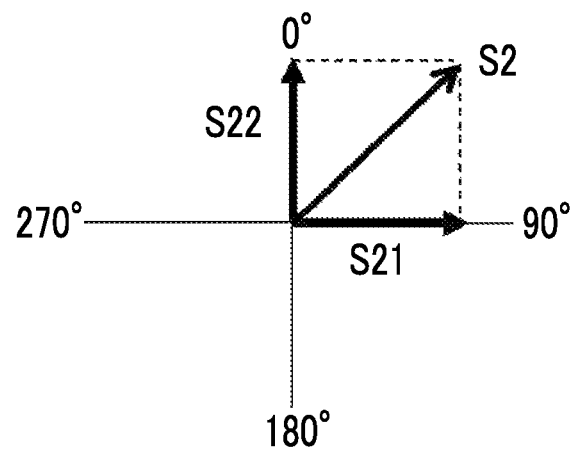

As for the orientation of the liquid crystal display element 10 in this example, as shown in FIG. 17, the fast axis due to the pre-tilt of the liquid crystal molecules 75 of the liquid crystal layer 17 is determined as the 45° orientation, which is different from the orientation described above for the single-layer oblique film. In the following, the orientation of the phase difference plate 31 follows the orientation of the liquid crystal display element 10.

As described above, in the liquid crystal display element 10, the phase difference plate 31 is installed so that the synthetic slow axis S2 of the slow axes S21 and S22 of the first oblique film 25a and the second oblique film 25b is at the 45° orientation.

The phase difference Re(θ) of the first oblique film 25a and the second oblique film 25b each has the azimuthal angle dependence. The phase difference Re(θ) of the phase difference plate 31 in which both are laminated is obtained by adding the phase difference between the first oblique film 25a and the second oblique film 25b.

Figure 19:
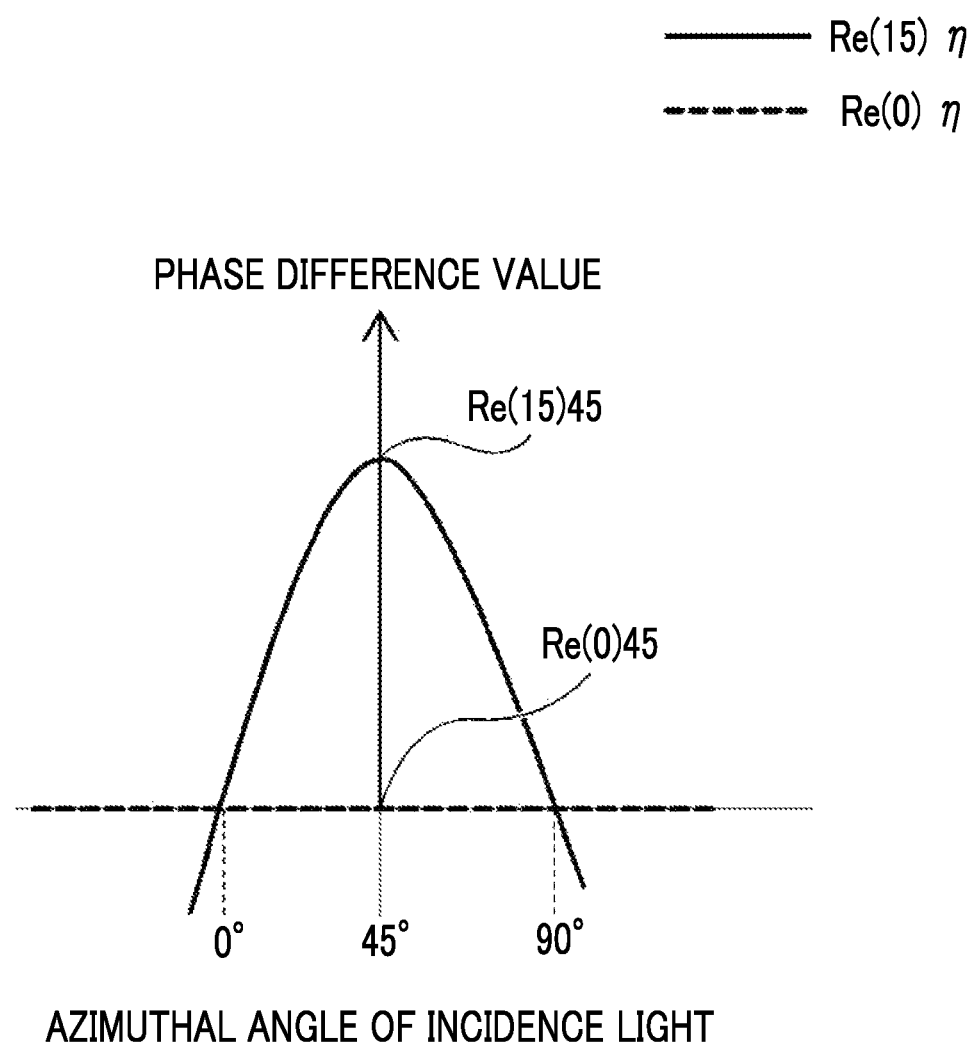
FIG. 19 is a diagram showing an azimuthal angle dependence of the phase difference in a case where a slow-axis intersecting angle of the two-layer oblique film is 90°.

In a case where the first oblique film 25a and the second oblique film 25b are arranged such that the slow axes thereof intersect each other at an intersecting angle of 90°, FIG. 19 schematically shows the azimuthal angle dependence of the phase differences Re(0) and Re(15) in the 45° orientation±45° range, that is, 0° to 90° orientations in the phase difference plate 31. In this case, as shown in FIG. 19, the front phase difference Re(0) of the phase difference plate 31 is canceled by the first oblique film 25a and the second oblique film 25b arranged orthogonally, and the phase difference is 0 in the 0° to 90° orientation.

The liquid crystal layer 17 has a front phase difference due to the pre-tilt component in the 45° orientation, has a peak in the 45° orientation, and exhibits a substantially symmetric azimuthal angle dependence in a range of ±45°. However, in a case where the two-layer oblique films 25a and 25b are arranged at an intersecting angle of 90° between their slow axes, since Re(0)45 of the phase difference plate 31 is 0, the front phase difference of the liquid crystal layer 17 cannot be compensated.

Figure 20:
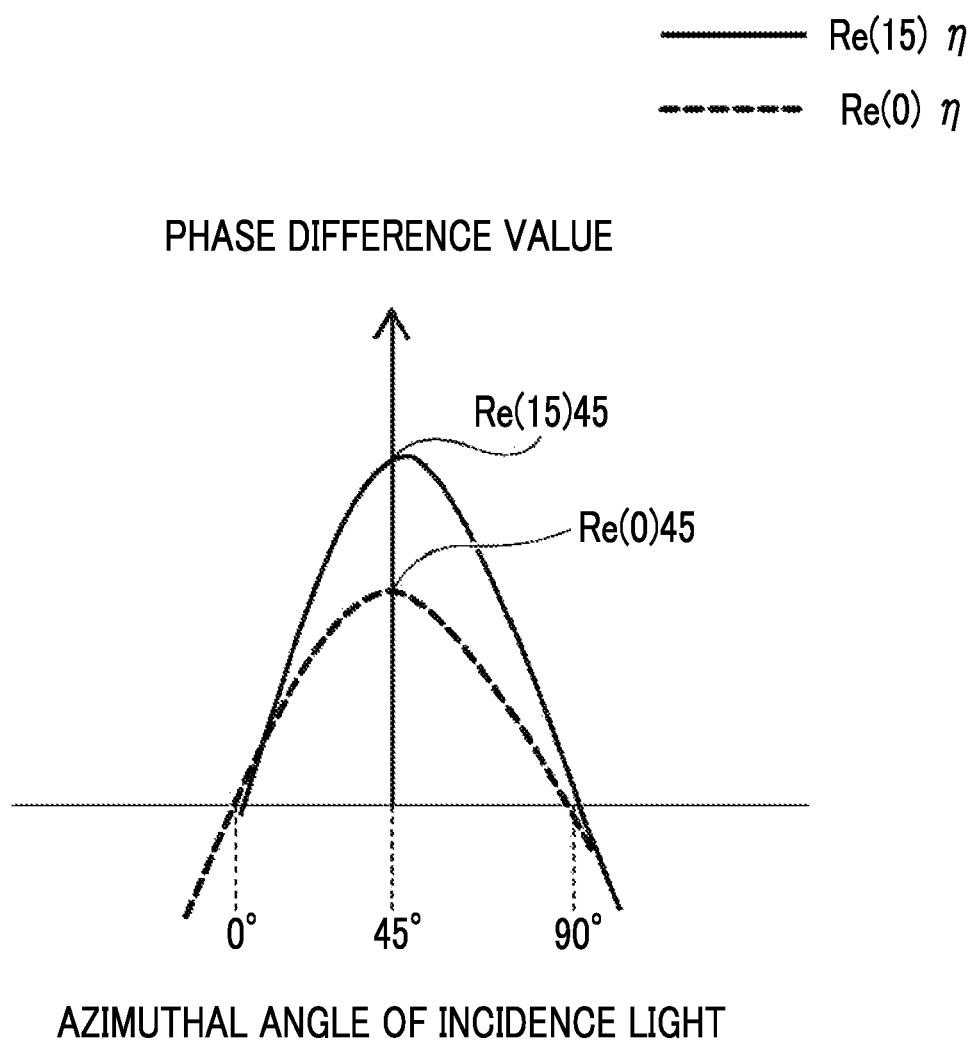
FIG. 20 is a diagram showing an azimuthal angle dependence of the phase difference in a case where a slow-axis intersecting angle of the two-layer oblique film is deviated from 90°.

On the other hand, in a case where the slow axes of the first oblique film 25a and the second oblique film 25b are slightly shifted from 90°, FIG. 20 schematically shows the azimuthal angle dependence of the phase differences Re(0) and Re(15) in the 45° orientation±45° range, that is, 0° to 90° orientations in the phase difference plate 31. In this case, as shown in FIG. 20, the front phase difference Re(0) of the phase difference plate 31 exhibits the azimuthal angle dependence with a peak at the 45° orientation. In the phase difference plate 31, by generating a front phase difference Re(0) of approximately 0.1 nm to 5 nm in the 45° orientation, it is possible to obtain a phase difference of the same degree as the front phase difference of the fast-axis orientation of the liquid crystal layer 17, and it is possible to satisfactorily compensate for the front phase difference of the liquid crystal layer at the 45° orientation. That is, for the phase difference plate 31, it is preferable that the front phase difference Re(0) in the slow-axis orientation is 0.1 nm to 5 nm.

Figure 21:
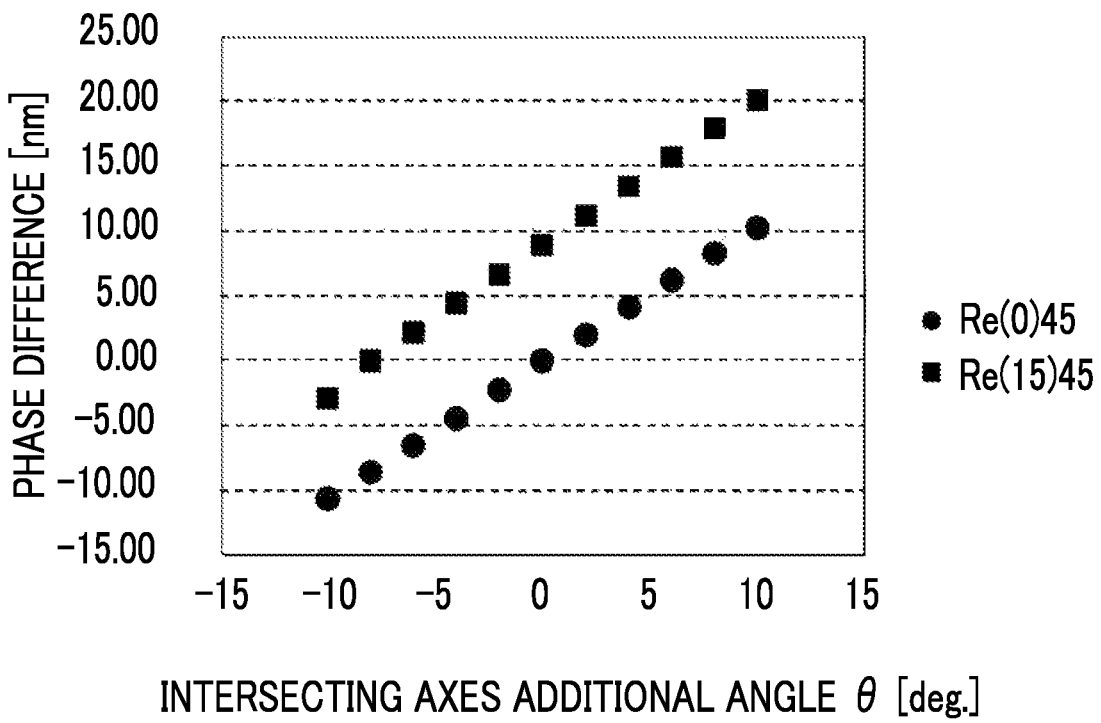
FIG. 21 is a diagram showing a relationship between the slow-axis intersecting angle of the two-layer oblique film and the phase difference of the phase difference plate.

As an example, with regard to the phase difference plate 31 laminated with the first and second two-layer oblique films 25a and 25b, a relationship between an intersecting angle of the slow axes of the two-layer oblique films 25a and 25b, and Re(0)45 and Re(15)45 of the phase difference plate at the 45° orientation is as shown in FIG. 21. In FIG. 21, a case where the slow axes are orthogonal to each other is regarded as 0°, a case where the intersecting angle is larger than 90° is regarded as positive, and a case where the intersecting angle is smaller than 90° is regarded as negative. Here, as the single-layer oblique film, an oblique film having Re(0)=32 nm and Re(30) ratio=2.5 is used. The Re(0) and Re(30) ratio of the single-layer oblique film follow the definitions described with reference to FIG. 9.

As shown in FIG. 21, by changing the slow axis by ±10° from the orthogonal state, the front phase difference Re(0) of the phase difference plate 31 can be changed in a range of 0 to ±10 nm. Similarly, the phase difference Re(15) of the phase difference plate 31 is also changed in a range of ±10 nm from the value (9 nm) in the orthogonal state. In the liquid crystal display element 10 applied, it is sufficient that the intersecting angle of the slow axes of the two-layer oblique films 25a and 25b to be laminated is set in accordance with the front phase difference Re(0) of the liquid crystal layer 17 in the 45° orientation.

According to studies by the present inventors, it is preferable that the deviation from 90° of the intersecting angle of the slow axes of the first oblique film 25a and the second oblique film 25b is within approximately ±5°, and it is more preferable to be within approximately ±3°.

As described above, the liquid crystal layer 17 has a front phase difference due to the pre-tilt component in the 45° orientation, has a peak in the 45° orientation, and exhibits a substantially symmetric azimuthal angle dependence in a range of ±45°. In the liquid crystal layer 17, the phase difference Re(θ) in a case of being incident at another incidence angle θ also has a peak in the 45° orientation, and exhibits a substantially symmetric azimuthal angle dependence in a range of ±45°. In order to effectively compensate for the phase difference generated in the liquid crystal layer 17, it is preferable to have a phase difference opposite to the phase difference of the liquid crystal layer in a range of 45° orientation±45°. That is, it is preferable that the phase difference Re(θ) of the phase difference plate 31 is substantially symmetric with respect to the orientation 45° in the range of 45° orientation±45°. A difference between the phase difference Re(15)90 at the 90° orientation which is the 45° orientation+45° and the phase difference Re(15)0 at the 0° orientation which is the 45° orientation−45° is an indicator of symmetry, and as the difference is smaller, the symmetry with respect to the orientation 45° is higher. Specifically, in the phase difference plate 31, it is preferable that the phase difference between the phase difference Re(15)90 and the phase difference Re(15)0 is within ±6 nm.

Normally, the phase difference Re(θ) of the phase difference plate 31 indicates the maximum positive peak in one orientation of the synthetic slow axis S2. In order to efficiently compensate for the phase difference in the liquid crystal layer 17, the orientation of the synthetic slow axis showing the maximum peak is disposed to coincide with the fast axis F of the liquid crystal layer 17. Here, in the phase difference plate 31, among azimuthal angles from 0° to 360°, an azimuthal angle at which the phase difference Re(15) generated with respect to incidence light with an incidence angle of +15° to the normal line is maximum is defined as a reference azimuthal angle ηa. In a case where the fast axis of the liquid crystal layer 17 has a 45° orientation, the phase difference plate 31 is disposed such that the reference azimuthal angle ηa is 45°. That is, in the phase difference plate 31, it is preferable that the absolute value of a difference between a first phase difference Re(15)ηa+45 of the incidence light in a case where an azimuthal angle is +45° with respect to the reference azimuthal angle ηa and a second phase difference Re(15)ηa−45 of the incidence light in a case where an azimuthal angle is −45° with respect to the reference azimuthal angle ηa is 6 nm or less.

The fact that the difference between the phase difference Re(15)ηa+45 at the ηa+45° orientation and the phase difference IRe(15)ηa−45 at the ηa−45° orientation around the azimuthal angle ηa at which the phase difference Re(15) is maximum is within ±6 nm means that the phase difference plate 31 has high symmetry in the azimuthal angle range of ηa+45° centered on the azimuthal angle ηa. In a case where the phase difference plate 31 has high symmetry in the azimuthal angle range of ηa+45° centered on the azimuthal angle ηa, it is possible to realize a phase difference plate having an opposite phase difference over a range of ±45° around the orientation of the fast axis of the liquid crystal layer having the azimuthal angle dependence. In the liquid crystal layer 17, since the phase difference is the largest in the pre-tilt orientation range of ±45°, in a case where the phase difference plate 31 exhibits the opposite phase difference over this range, the phase difference of the liquid crystal layer 17 can be effectively compensated. Therefore, in a case where such a phase difference plate 31 is applied as the phase difference compensation element 20 of the liquid crystal display element 10, the contrast can be effectively improved and the black display unevenness can be suppressed.

In the above description, the two-layer oblique films 25a and 25b are described as having the same refractivity anisotropy, but the refractivity anisotropy thereof may not be completely the same. However, it is preferable that the difference ΔRe(0) of the front phase difference Re(0) between the first oblique film 25a and the second oblique film 25b is 3 nm or less.

Figure 22:
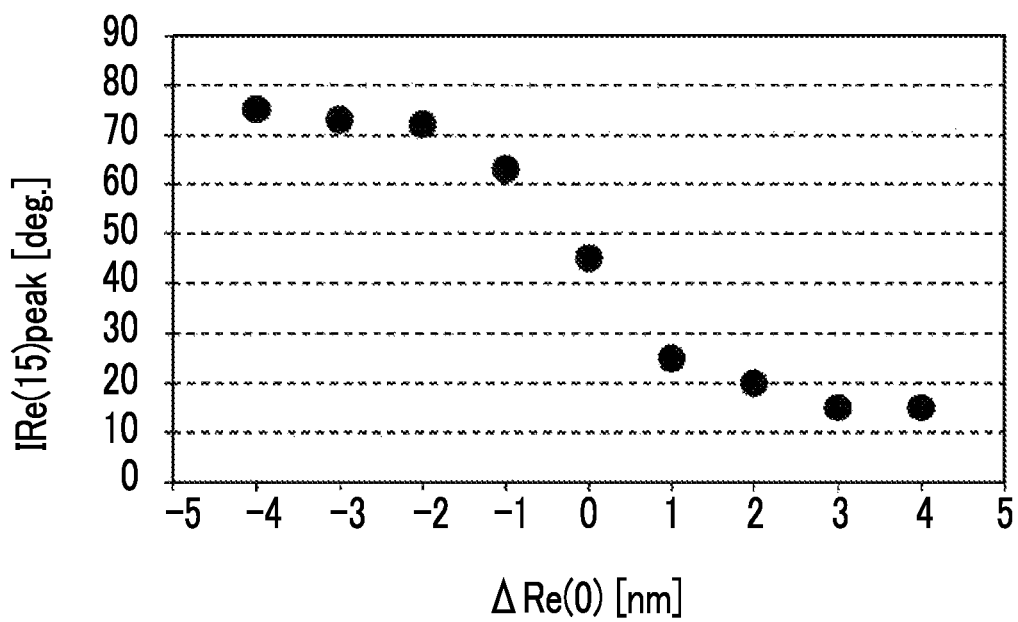
FIG. 22 is a diagram showing a relationship between a difference ΔRe(0) in a front phase difference of the two-layer oblique film and a peak orientation of a phase difference IRe(15) of the phase difference plate.

In the phase difference plate 31 in which the two-layer oblique films 25a and 25b are laminated, as an example, the difference ΔRe(0) between the front phase difference Re(0) of the first oblique film 25a and the second oblique film 25b and an orientation (peak orientation) in which IRe(15) of the phase difference plate 31 is maximum has a relationship as shown in FIG. 22. Here, "I" is the phase difference of the phase difference plate 31, and is provided to distinguish the phase difference from each of the oblique films 25a and 25b.

FIG. 22 shows results of investigating the relationship between ΔRe(0) and the IRe(15) peak orientation. As shown in FIG. 22, in a case where ΔRe(0) is 0, the IRe(15) peak orientation coincides with the 45° orientation which is the fast-axis orientation due to the pre-tilt component of the liquid crystal layer 17. On the other hand, in a case where ΔRe(0) is smaller than 0, the IRe(15) peak orientation is large, and in a case where ΔRe(0) is larger than 0, the IRe(15) peak orientation is small. By shifting the IRe(15) peak orientation from the 45° orientation, there is a risk that the efficiency of phase difference compensation is reduced.

Figure 23:
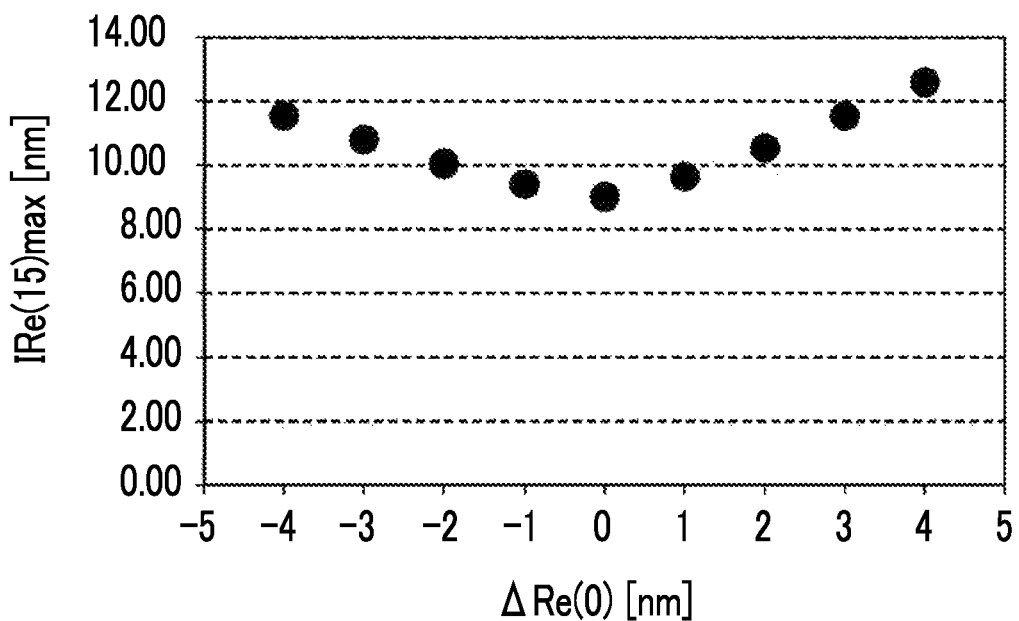
FIG. 23 is a diagram showing a relationship between a difference ΔRe(0) in a front phase difference of the two-layer oblique film and a peak value IRe(15)max of the phase difference IRe(15) of the phase difference plate.

In addition, ΔRe(0) and a peak value IRe(15)max of the phase difference IRe(15) of the phase difference plate 31 in the 0° to 360° orientation has a relationship as shown in FIG. 23. As shown in FIG. 23, in a case where ΔRe(0) is 0, IRe(15)max is the smallest at approximately 9 nm. On the other hand, as the absolute value of ΔRe(0) increases, IRe(15)max increases. In this case, overcompensation of the phase difference occurs, and there is a risk that the efficiency of phase difference compensation is reduced.

Figure 24:
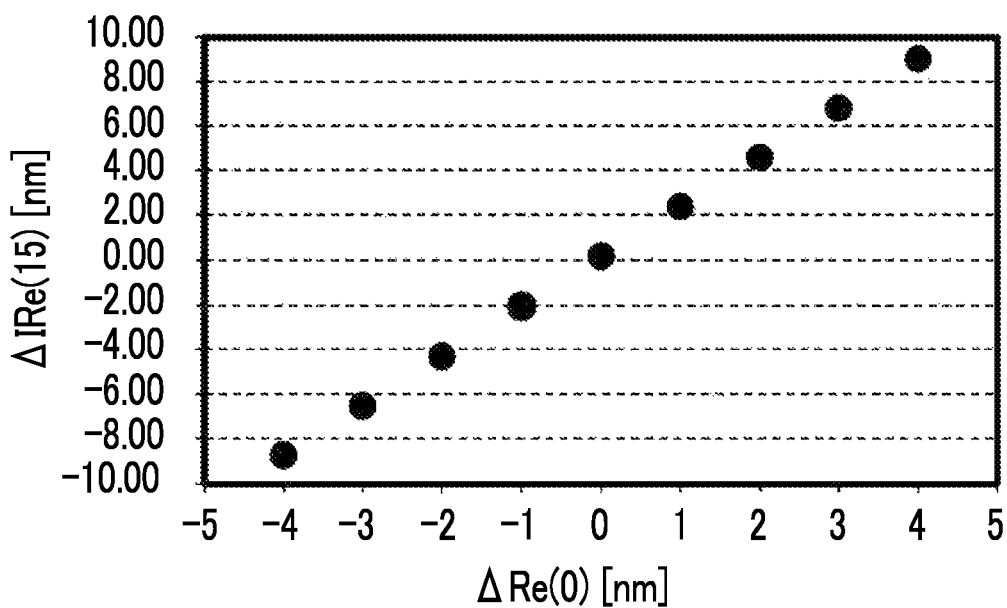
FIG. 24 is a diagram showing a relationship between a difference ΔRe(0) in a front phase difference of the two-layer oblique film and ΔRe(15) which is Re(15)90−Re(15)0 in the phase difference plate.

Furthermore, ΔRe(0) and ΔIRe(15) which is a difference of IRe(15) at the orientation±45° of the synthetic slow axis S2 in the phase difference plate 31, that is, a difference of IRe(15)90−IRe(15)0 has a relationship as shown in FIG. 24. The fact that ΔIRe(15) is close to 0 means that symmetry in the range of ±45° centered on the orientation of the synthetic slow axis S2 is high. In the liquid crystal layer 17, a large phase difference occurs in the range of ±45° in the orientation of the fast axis F due to the pre-tilt component. In addition, the phase difference generated in the liquid crystal layer 17 is symmetrical in the range of ±45° centered on the orientation of the fast axis F. Therefore, it is considered that, in the phase difference plate 31, as the symmetry in the range of ±45° centered on the orientation of the synthetic slow axis S2 is higher, the efficiency of phase difference compensation is higher.

That is, in order to compensate for the phase difference of the liquid crystal layer 17 having the pre-tilt component in the 45° orientation, it is preferable that the IRe(15) peak orientation is in a vicinity of the 45° orientation and that the symmetry is high in a range of the 45° orientation±45°.

Therefore, it is preferable that the difference ΔRe(0) of the phase difference of the two-layer oblique films 25a and 25b is within ±3 nm, it is preferable to be within ±1 nm, and it is most preferable that the difference of the front phase difference is 0.

Example of Design Modification

An example of design modification of the phase difference plate provided with the two-layer oblique film will be described with reference to FIGS. 25 to 32. In addition, in FIG. 16 and FIGS. 25 to 32, the same elements are designated by the same reference numerals.

Figure 25:
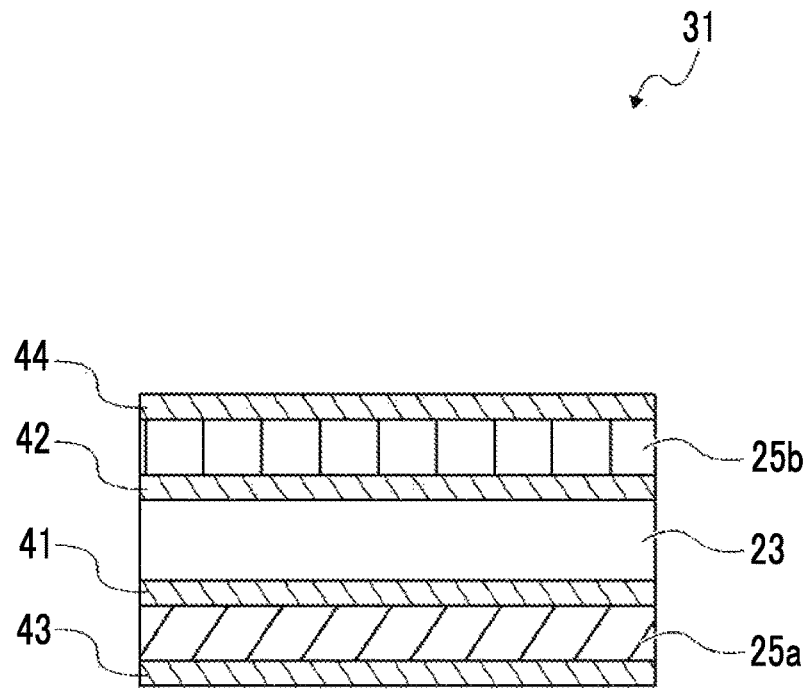
FIG. 25 is a diagram showing a phase difference plate which is provided with an oblique film of one layer on both surfaces one by one and is provided with an antireflection film.
Figure 26:
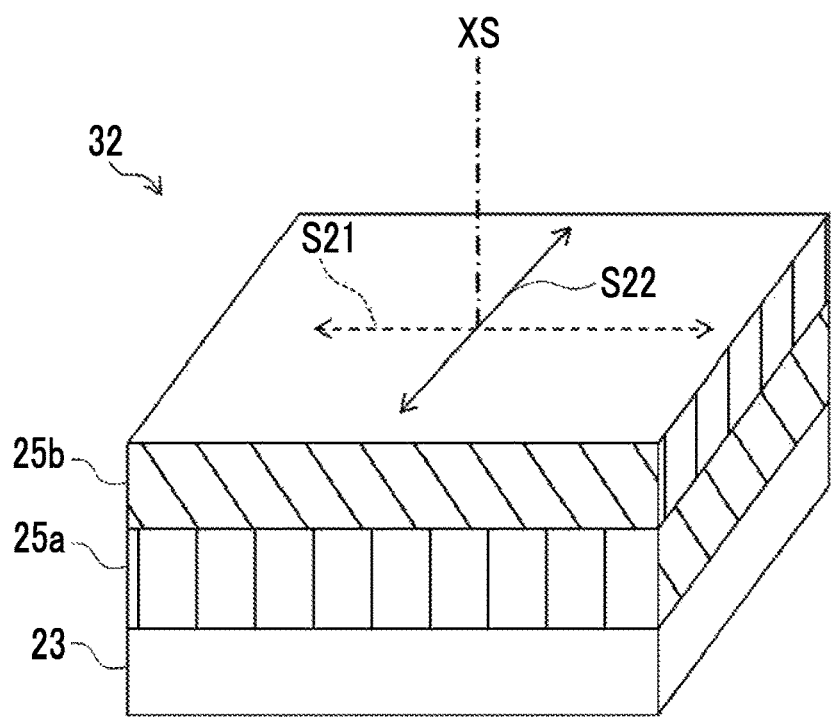
FIG. 26 is a diagram showing a phase difference plate provided with a two-layer oblique film on one surface.

In the above-described phase difference plate 31 according to the second embodiment, as shown in FIG. 25, it is preferable that antireflection films 41 and 42 are provided on both surfaces of the substrate 23 and antireflection films 43 and 44 are provided on one surface of the first oblique film 25a and on one surface of the second oblique film 25b, the surfaces being the outermost surfaces of the phase difference plate 31, respectively. By providing the antireflection films 41, 42, 43, and 44, it is possible to suppress reflection of the incidence light at each interface, increase the transmittance, and further enhance the haze suppression effect.

In the phase difference plate 31 according to the second embodiment, the first oblique film 25a is provided on one surface of the substrate 23, and the second oblique film 25b is provided on the other surface. As an aspect in which two or more layers of the oblique film 25 are laminated, as a phase difference plate 32 shown in FIG. 26, the two-layer oblique films 25a and 25b may be formed on one surface of the substrate 23. However, as shown in FIG. 16, from the viewpoint that it is possible to suppress scattering at the interface which occurs in a case where the oblique films 25a and 25b are directly laminated, and as a result, it is possible to suppress haze, it is preferable to provide one layer of the oblique films 25a and 25b on each surface of the substrate 23.

Even in a case where the two-layer oblique films 25a and 25b are laminated on one surface of the substrate 23, as shown in FIG. 19, it is preferable that both surfaces of the substrate 23 and one surface of the second oblique film 25b, which is the outermost surface of the phase difference plate 32, are provided with antireflection films 45, 46, and 47, respectively. By providing the antireflection films 45, 46, and 47, it is possible to suppress reflection of the incidence light at the interface, increase the transmittance, and further enhance the haze suppression effect.

Here, the haze in the phase difference plate in which two layers of the oblique film 25 is laminated will be described.

Among the data shown in FIG. 12, a phase difference plate provided with two layers of the oblique film is produced under the same conditions as the oblique film produced as the substrate installation angle ω of 35°, 50°, 75°, and 90°. Here, the phase difference plate 31 (see FIG. 16) in which one oblique film is formed on both surfaces of the substrate layer by layer, and the phase difference plate 32 (see FIG. 26) in which two-layer oblique film is laminated on one surface of the substrate are produced, and each haze is measured. FIG. 28 shows a relationship between the haze and the substrate installation angle ω. In each of the phase difference plates 31 and 32, after the first oblique film 25a is vapor-deposited, the second oblique film 25b is formed in a state in which the substrate rotated by approximately 90°, and the slow axes S21 and S22 of the first oblique film and the second oblique film are substantially orthogonal to each other (see FIGS. 16 and 26). In addition, any of the antireflection films 41 to 47 is provided on both surfaces of the substrate and on the outermost surface of the phase difference plate (see FIGS. 25 and 27).

In FIG. 28, a numerical value shown in parentheses is the Re(30) ratio for the monolithic oblique film 25. As shown in FIG. 28, in a case where the Re(30) ratio is 4 or less, the haze can be suppressed to approximately 0.3% or less. In addition, from FIG. 28, as compared with the phase difference plate 32 having two layers laminated on one surface, the phase difference plate 31 formed by distributing the oblique films 25a and 25b on both surfaces of the substrate has a lower haze regardless of the Re(30) ratio. In the phase difference plate 31 formed by distributing the two-layer oblique films 25a and 25b on both surfaces of the substrate, in a case where the Re(30) ratio is 4 or less, the haze can be suppressed to approximately 0.2% or less. As described above, in a case where the oblique films 25a and 25b are formed on both surfaces of the substrate layer by layer, it is considered that it shows the effect of suppressing the scattering which occurs at the interface between the two-layer oblique films 25a and 25b in a case where the two-layer oblique films 25a and 25b are laminated in direct contact with each other.

Figure 29:
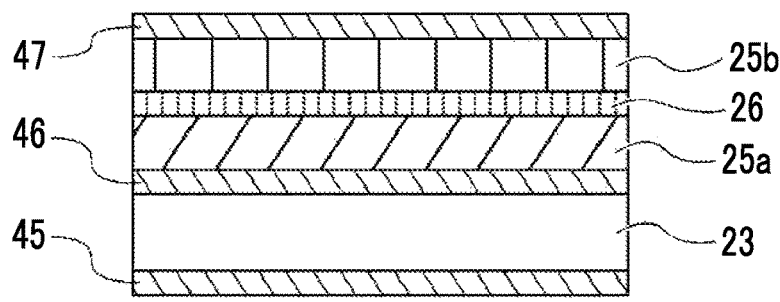
FIG. 29 is a cross-sectional view showing a schematic configuration of a phase difference plate provided with a planarizing layer between two-layer oblique films.

With regard to the phase difference plate 32 having the two-layer oblique films 25a and 25b laminated on one surface, as shown in FIG. 29, it is preferable that a planarizing layer 26 is provided between the first oblique film 25a and the second oblique film 25b.

The planarizing layer 26 is an example of an interlayer. The planarizing layer 26 has a function of planarizing fine irregularities generated on the surface of the first oblique film 25a formed above. As the planarizing layer 26, not only a silicon oxide film ($SiO_2$), but also a metal oxide such as tantalum pentoxide ($Ta_2O_5$) and magnesium fluoride ($MgF_2$) can be used. The planarizing layer 26 is formed, for example, by disposing a vapor deposition source directly below the substrate and performing a front vapor deposition, instead of the oblique vapor deposition.

By providing the planarizing layer 26 between the first oblique film 25a and the second oblique film 25b, the fine irregularities of the surface of the first oblique film 25a are planarized, and the second oblique film 25b can be formed in a flat planar shape. In this way, by providing the planarizing layer 26 on the surface of the first oblique film 25a, the scattering at the interface can be suppressed by reducing the surface roughness of the film formation surface of the second oblique film 25b, so that the haze in the phase difference plate 32 can be suppressed. In addition, as compared with a case where the second oblique film 25b is directly formed on the first oblique film 25a, the effect of improving black display unevenness and contrast is high.

Figure 30:
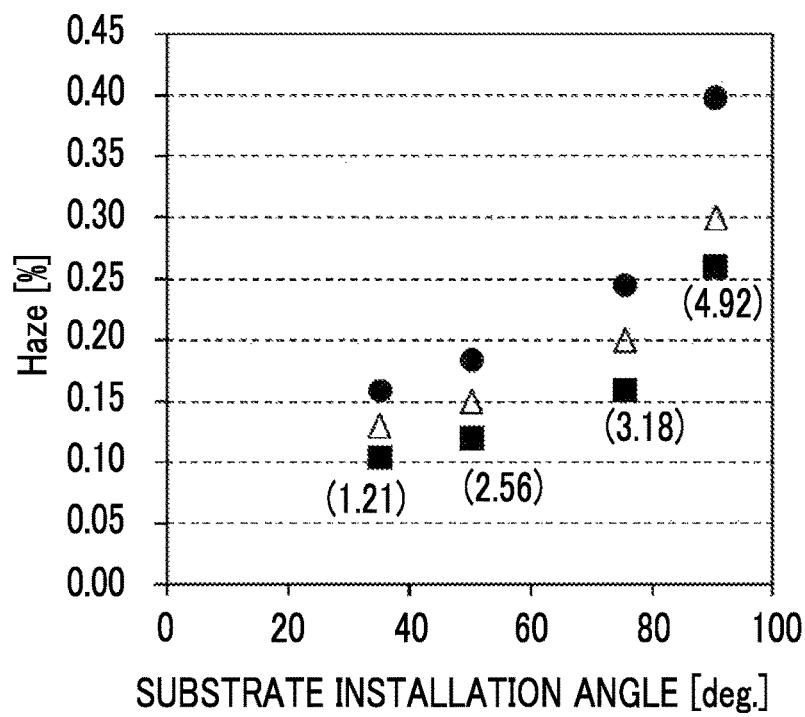
FIG. 30 is a diagram showing a relationship between the substrate installation angle and the haze for the phase difference plate provided with the planarizing layer between the two-layer oblique films.

FIG. 30 shows a relationship between the haze and the substrate installation angle ω for the phase difference plate 32 (see FIG. 29) provided with the planarizing layer 26 of a 15 nm silicon oxide film between the oblique films 25a and 25b. In FIG. 30, data about the phase difference plate 32 provided with the planarizing layer 26 is indicated by a black triangular marker. In addition, FIG. 30 simultaneously shows the data shown in FIG. 28 for comparison. As shown in FIG. 30, in a case where the oblique films 25a and 25b are laminated on one surface of the substrate, the phase difference plate 31 provided with the planarizing layer 26 between the oblique films 25a and 25b can significantly reduce the haze compared to the phase difference plate 32 in which the oblique films 25a and 25b are laminated in contact with each other. In a case where the Re(30) ratio is 4 or less, the haze can be suppressed to approximately 0.25% or less.

A suitable film thickness of the planarizing layer 26 is examined as follows. In the phase difference plate 32 having the layer configuration shown in FIG. 29, $SiO_2$, $Ta_2O_3$, or $MgF_2$ is used as the planarizing layer 26, and samples are produced with the film thickness varied from 5 nm to 30 nm. In this case, an oblique film having a Re(30) ratio of 2.0 is used. The haze is measured for these samples and evaluated as follows in comparison with a haze $H_0$ in a phase difference plate provided with an equivalent oblique film on both surfaces of the substrate.

A: less than 1.2 times the haze $H_0$
B: 1.2 times or more and 1.5 times or less the haze $H_0$
C: more than 1.5 times the haze $H_0$
The evaluation results are shown in Table 2.

TABLE 2

| Planarizing layer | Refractive index n | Physical film thickness d [nm] | | | | | |
|---|---|---|---|---|---|---|---|
| | | 5 | 10 | 15 | 20 | 25 | 30 |
| $Ta_2O_5$ | 2.08 | B | A | A | B | C | C |
| $SiO_2$ | 1.45 | B | A | A | A | B | C |
| $MgF_2$ | 1.38 | B | A | A | A | A | C |

In Table 2, the refractive index is a value with respect to a wavelength of 400 nm. As shown in Table 2, the thickness of the planarizing layer 26 is preferably such that the optical path length is approximately 40 nm, that is, approximately 1/10 or less with respect to the wavelength of 400 nm. In addition, by setting the physical film thickness to 10 nm or more, the effect of planarizing the film surface of the oblique film and suppressing the scattering can be enhanced.

Figure 31:
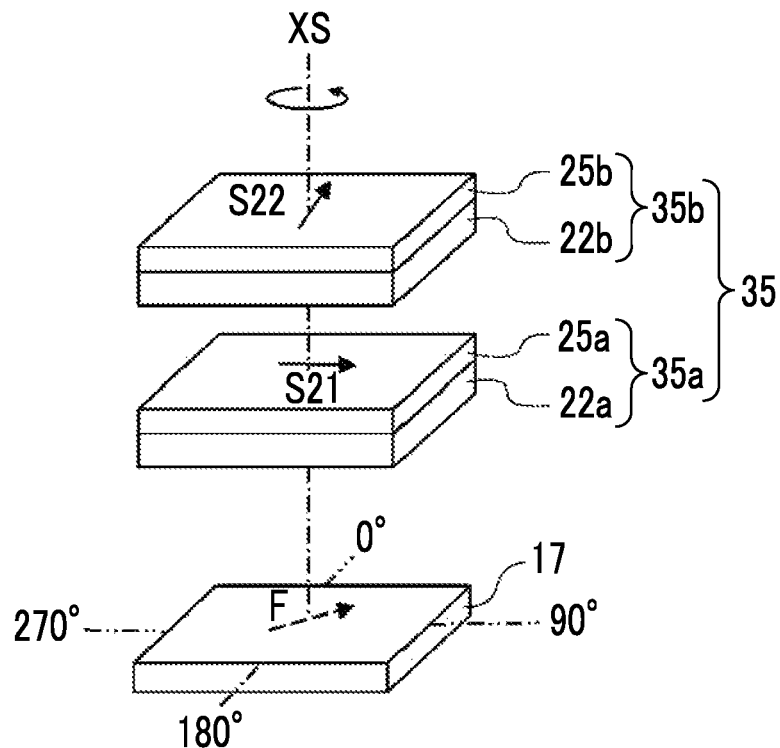
FIG. 31 is an explanatory diagram of a phase difference plate in which oblique films are provided on separate substrates.

In the above-described embodiments and examples of design modification, an aspect in which one layer is formed on each surface of one substrate 23 or two layers are formed on one surface as a phase difference plate having two layers of the oblique films 25a and 25b laminated has been described. As the phase difference plate provided by laminating two layers of the oblique films 25a and 25b, a phase plate having two substrates on which the two oblique films are formed may be used. For example, as shown in FIG. 31, a phase difference plate 35 in which a first phase difference plate 35a having the first oblique film 25a formed on a first substrate 22a and a second phase difference plate 35b having the second oblique film 25b formed on a second substrate 22b are superimposed on each other may be used. In the present specification, the aspect in which two or more oblique films are laminated and provided includes not only the aspect in which a plurality of the oblique films 25a and 25b are laminated on one substrate 23 as described above, but also an aspect in which the oblique films 25a and 25b formed on different substrates 22a and 22b are superimposed on the optical path.

As shown in FIG. 31, in a case of the phase difference plate 35 provided with the first phase difference plate 35a having the first oblique film 25a formed on the first substrate 22a and the second phase difference plate 35b having the second oblique film 25b formed on the second substrate 22b, depending on the liquid crystal display element 10 to be applied, by rotating one of them with respect to the other around the XS-axis at the time of assembly, rotation angles of the fast axes S31 and S32 can be changed. In the liquid crystal display element 10, for the phase differences Re(0) and Re(15) of the liquid crystal layer 17 with manufacturing variations, it is possible to individually respond so that the phase difference compensation can be performed most efficiently, that is, the contrast performance can be maximized.

As described above, in the liquid crystal display element 10 provided with the liquid crystal layer 17 and the phase difference compensation element 20, among the plurality of substrates 22a and 22b on which at least one layer of the phase difference film is formed, the contrast of the liquid crystal display element 10 can be adjusted by rotating at least one substrate 22b relative to the other substrates 22a about the XS-axis perpendicular to the film formation surface.

Figure 32:
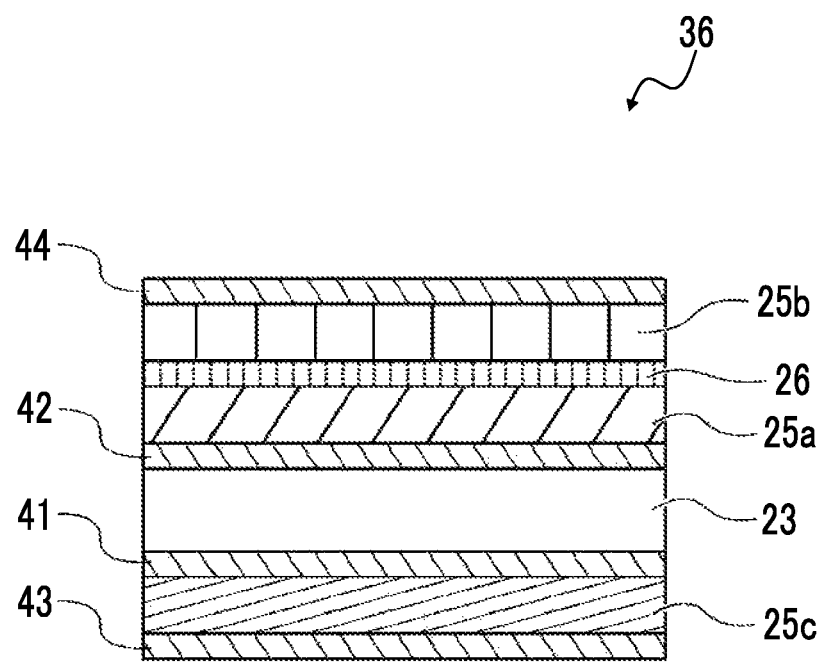
FIG. 32 is a diagram showing a layer configuration of an example of a phase difference plate provided with a three-layer oblique film.

In the above description, the phase difference plates 31, 32, and 36 in which two layers of the oblique film 25 are laminated have been described, but in the phase difference plate according to the present disclosure, the oblique film 25 may be laminated in three or more layers. For example, as shown in FIG. 32, a phase difference plate 36 having oblique films 25a and 25b on one surface of the substrate 23 and an oblique film 25c on the other surface can be used as the phase difference compensation element 20. The phase difference plate 36 is provided with antireflection film 41, 42, 43, and 44 on both surfaces of the substrate 23 and the outermost surface of the phase difference plate 36, respectively.

In a case of the phase difference plate 36 having three layers of the oblique film 25, the oblique film 25a to 25c are arranged such that a slow axis S3 formed by synthesizing the slow axis S21 of the first oblique film 25a, the slow axis S22 of the second oblique film 25b, and a slow axis S23 of the third oblique film 25c is parallel to the fast axis F of the liquid crystal layer 17. As a result, the phase difference caused by the pre-tilt of the liquid crystal molecules 75 and the phase difference caused by the phase difference plate 36 have opposite polarities, so that the phase difference caused by the pre-tilt can be compensated.

Figure 33A:
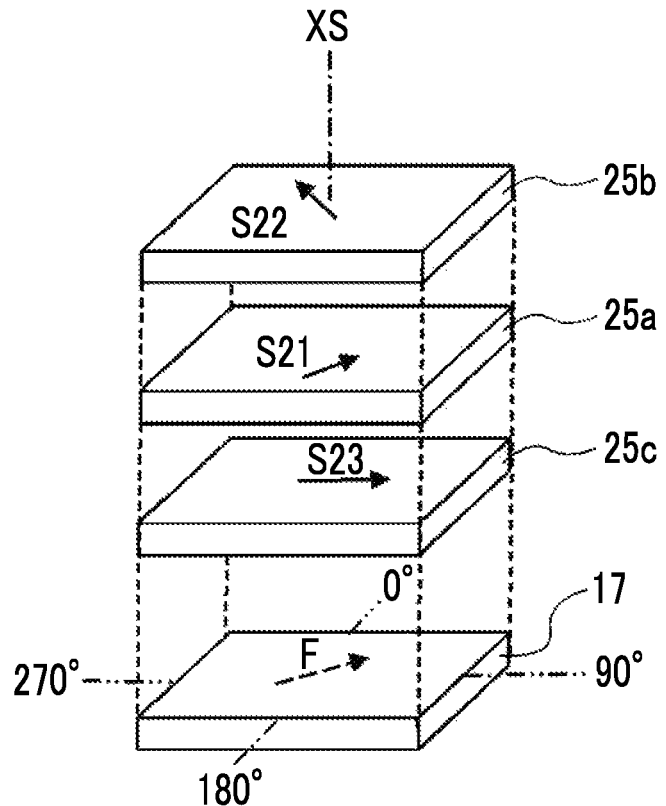
FIGS. 33A and 33B are explanatory diagrams of a synthetic slow axis in a case where the three-layer oblique film is provided.
Figure 33B:
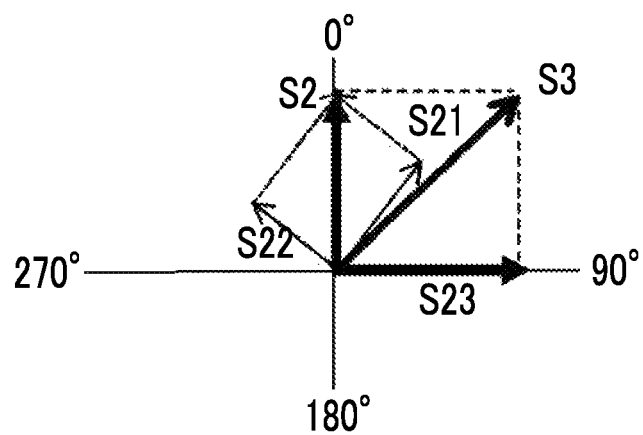

For example, as shown in FIGS. 33A and 33B, in a case where the fast axis F of the tilt component of the liquid crystal layer 17 is in a 45° orientation, the first oblique film 25a and the second oblique film 25b are arranged so that the synthetic slow axis S2 of the slow axis S21 of the first oblique film 25a and the slow axis S22 of the second oblique film 25b is oriented at 0°. In addition, the third oblique film 25c is disposed such that the slow axis S23 thereof is oriented at 90°. Accordingly, the synthetic slow axis S3 obtained by further synthesizing the synthetic slow axis S2 and the slow axis S23 can be matched with the orientation of the fast axis F of the tilt component of the liquid crystal layer 17. As described above, even in a case where two or more layers of oblique films 25a, 25b, and 25c are provided, the same phase difference compensation as in the case where the two-layer oblique films 25a and 25b are provided can be obtained.

On the other hand, in a case where three or more layers of the oblique film are laminated, in the azimuthal angle dependence of the phase difference as the phase difference plate, the symmetry with respect to the 45° orientation±45° centered on the 45° orientation tends to be lower than that of the phase difference plate having two layers of the oblique film. As described above, since the azimuthal angle dependence of the phase difference due to the pre-tilt component of the liquid crystal layer is symmetric about the 45° orientation in the range of the 45° orientation±45°, as the symmetry is lowered, the effect of phase difference compensation is lowered. Therefore, in order to obtain high symmetry, it is preferable that the oblique film has two layers. Even in a case where there are three or more layers, in a case where the phase difference between the phase difference Re(15)90 and the phase difference Re(15)0 in the phase difference plate 36 has a symmetry within ±6 nm, a sufficient phase difference compensation effect can be obtained, and in a case of being applied to a liquid crystal display element, the contrast can be enhanced and the black display unevenness can be suppressed.

Here, the function of the phase difference plates 31, 32, and 33 will be described with reference to Test Examples 2 to 4.

Test Example 2

Samples 2-1 to 2-13 of the phase difference plate having the layer configuration shown in FIG. 25 are produced. An oblique film having a front phase difference Re(0) of 23 nm is formed by the oblique vapor deposition on both surfaces of a glass substrate provided with antireflection films on both surfaces. In this case, the slow axis of the two-layer oblique film is set to have an intersecting angle of 93°. In addition, an antireflection film is formed on the surface of the oblique film. $Ta_2O_5$ is used as a material of the oblique film. A vapor deposition angle is changed by changing the substrate installation angle ω, and phase difference plate samples 2-1 to 2-13 provided with oblique films having different Re(30) ratios are produced. The oblique films laminated in one sample have the same Re(30) ratio.

The contrast and the black display unevenness of the samples 2-1 to 2-13 are evaluated and scored by the same method as in Test Example 1. The results are shown in Table 3.

TABLE 3

| Sample | Re(30) ratio | Contrast | Black display unevenness | Total score |
|---|---|---|---|---|
| 2-1 | 1 | D | A | 7 |
| 2-2 | 1.2 | D | A | 7 |
| 2-3 | 1.4 | C | A | 10 |
| 2-4 | 1.5 | B | A | 12 |
| 2-5 | 1.6 | B | A | 12 |
| 2-6 | 2 | B | A | 12 |
| 2-7 | 2.3 | B | A | 12 |
| 2-8 | 2.5 | B | A | 12 |
| 2-9 | 3 | C | A | 10 |
| 2-10 | 3.5 | C | B | 8 |
| 2-11 | 4 | C | B | 8 |
| 2-12 | 4.5 | D | D | 0 |
| 2-13 | 5 | D | D | 0 |

The samples 2-2 to 2-11 shown in Table 3 correspond to Examples of the phase difference plate according to the present disclosure. In the samples of Examples in which Re(30) is 1.2 to 4, the evaluation of the contrast is high as compared with samples having Re(30) of more than 4, and improvement in high contrast has been achieved. In addition, samples having Re(30) of 1.4 to 3.0 have higher contrast and black display unevenness suppressing effects, and samples having Re(30) of 1.5 to 2.5 have even higher effects.

Test Example 3

Figure 27:
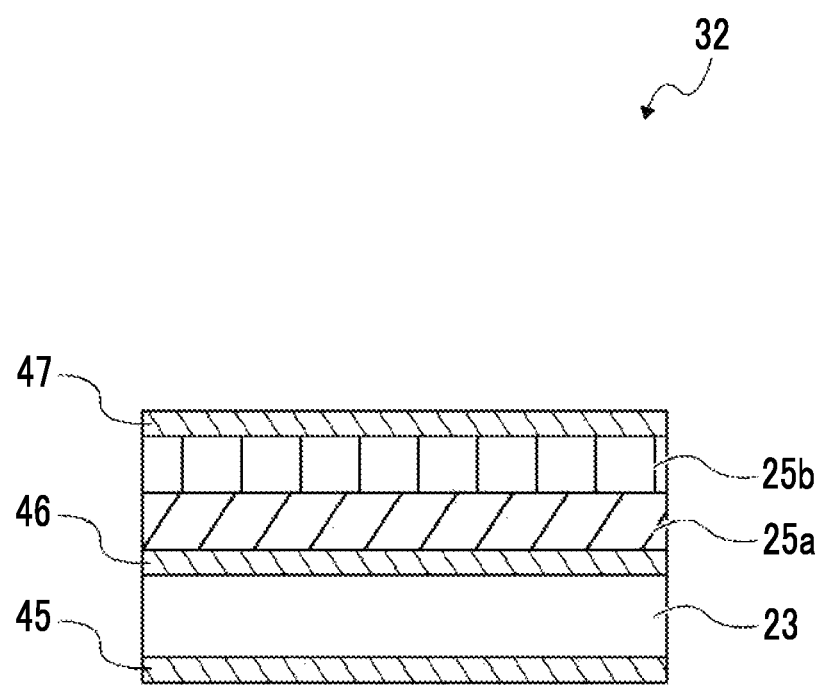
FIG. 27 is a diagram showing a phase difference plate which is provided with two-layer oblique film on one surface and is provided with an antireflection film.
Figure 28:
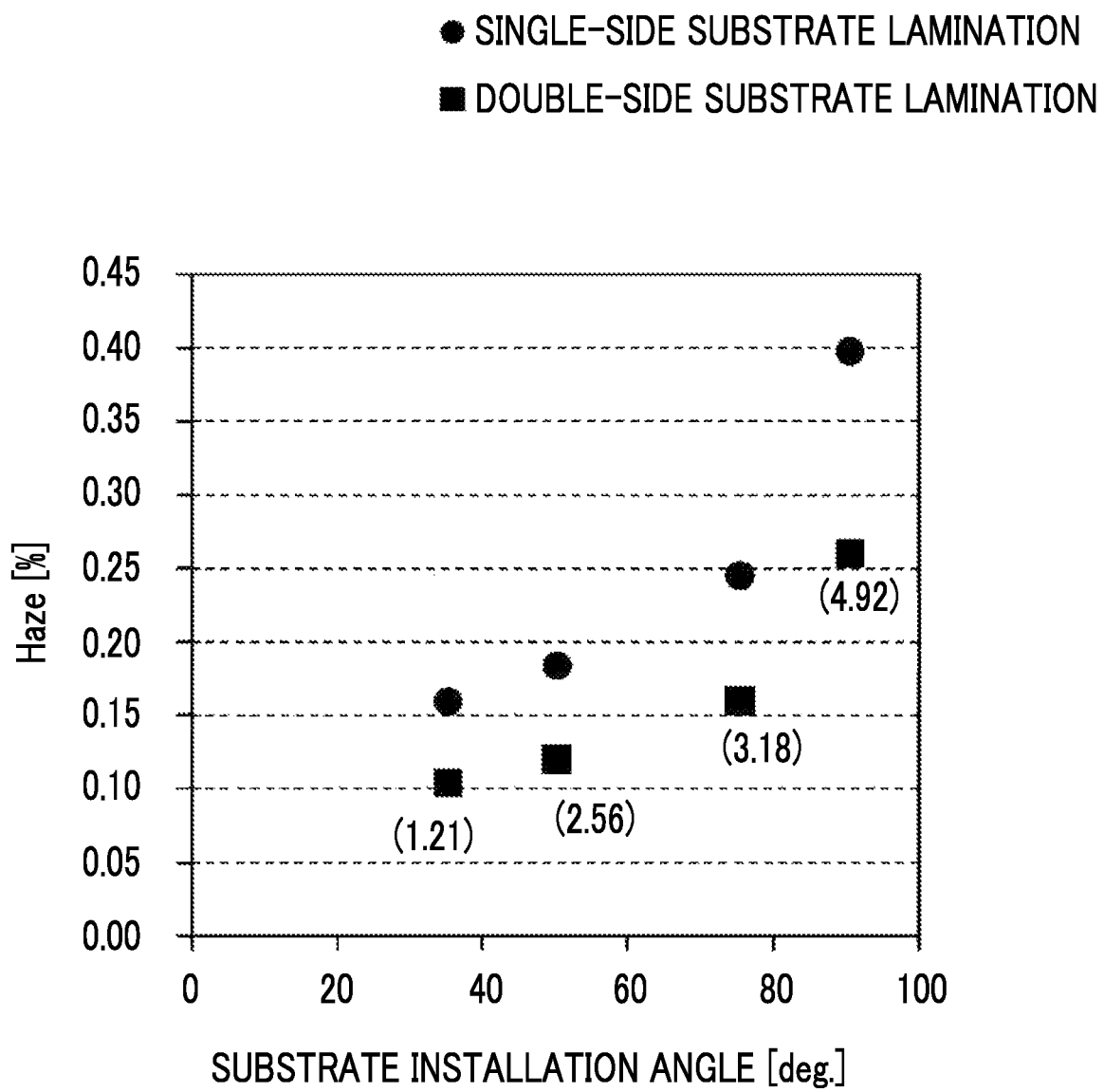
FIG. 28 is a diagram showing a relationship between the substrate installation angle and the haze for the phase difference plate provided with the two-layer oblique film.

Samples 3-1 to 3-13 of the phase difference plate having the layer configuration shown in FIG. 27 are produced. An oblique film having a front phase difference Re(0) of 23 nm is laminated on one surface of a glass substrate having antireflection films on both surfaces by the oblique vapor deposition. In addition, an antireflection film is formed on the surface on the second layer of the oblique film. $Ta_2O_5$ is used as a material of the oblique film. A vapor deposition angle is changed by changing the substrate installation angle ω, and phase difference plate samples 3-1 to 3-13 provided with oblique films having different Re(30) ratios are produced. The oblique films laminated in one sample have the same Re(30) ratio.

The contrast and the black display unevenness of the samples 3-1 to 3-13 are evaluated and scored by the same method as in Test Example 1. The results are shown in Table 4.

TABLE 4

| Sample | Re(30) ratio | Contrast | Black display unevenness | Total score |
|---|---|---|---|---|
| 3-1 | 1 | D | B | 5 |
| 3-2 | 1.2 | D | B | 5 |
| 3-3 | 1.4 | C | B | 8 |
| 3-4 | 1.5 | B | B | 10 |
| 3-5 | 1.6 | B | B | 10 |
| 3-6 | 2 | B | B | 10 |
| 3-7 | 2.3 | B | B | 10 |
| 3-8 | 2.5 | B | C | 8 |
| 3-9 | 3 | C | C | 6 |
| 3-10 | 3.5 | C | C | 6 |
| 3-11 | 4 | C | C | 6 |
| 3-12 | 4.5 | D | D | 0 |
| 3-13 | 5 | D | D | 0 |

The samples 3-2 to 3-11 shown in Table 4, in which Re(30) is 1.2 to 4, correspond to Examples of the phase difference plate according to the present disclosure. In the samples of Examples, a high total score is obtained as compared with the sample having Re(30) of more than 4. In addition, a sample having Re(30) of 1.4 to 4 has a higher contrast than a sample having a Re(30) ratio of more than 4. Higher overall evaluations are obtained in the samples having Re(30) of 1.4 to 2.5, and in the samples having Re(30) of 1.5 to 2.3, a higher effect of improving contrast and black display unevenness is obtained.

Test Example 4

Samples 4-1 to 4-13 of the phase difference plate having the layer configuration shown in FIG. 29 are produced. A silicon oxide film having a thickness of 15 nm is formed between the oblique films in the same manner as in the sample of Test Example 3. A vapor deposition angle of the oblique film is changed by changing the substrate installation angle ω, and phase difference plate samples 4-1 to 4-13 provided with oblique films having different Re(30) ratios are produced. The oblique films laminated in one sample have the same Re(30) ratio.

The contrast and the black display unevenness of the samples 4-1 to 4-13 are evaluated and scored by the same method as in Test Example 1. The results are shown in Table 5.

TABLE 5

| Sample | Re(30) ratio | Contrast | Black display unevenness | Total score |
|---|---|---|---|---|
| 4-1 | 1 | D | A | 7 |
| 4-2 | 1.2 | D | A | 7 |
| 4-3 | 1.4 | C | A | 10 |
| 4-4 | 1.5 | B | A | 12 |
| 4-5 | 1.6 | B | A | 12 |
| 4-6 | 2 | B | A | 12 |
| 4-7 | 2.3 | B | A | 12 |
| 4-8 | 2.5 | B | A | 12 |
| 4-9 | 3 | C | A | 10 |
| 4-10 | 3.5 | C | B | 8 |
| 4-11 | 4 | C | B | 8 |
| 4-12 | 4.5 | D | D | 0 |
| 4-13 | 5 | D | D | 0 |

The samples 4-2 to 4-11 shown in Table 5, in which Re(30) is 1.2 to 4, correspond to Examples of the phase difference plate according to the present disclosure. In the samples of Examples, a high total score is obtained as compared with the sample having Re(30) of more than 4. In addition, in the samples having Re(30) of 1.4 to 3, a higher total score is obtained. Furthermore, in the samples having Re(30) of 1.5 to 2.5, a higher effect of improving contrast and black display unevenness is obtained.

Here, with reference to Test Example 5, in the phase difference plate, a function in which the difference between the phase difference $IRe(15)\eta a+45$ at the $\eta a+45°$ orientation and the phase difference $IRe(15)\eta a-45$ at the $\eta a-45°$ orientation around the azimuthal angle ε at which the phase difference $IRe(15)$ is maximum is within ±6 nm will be described.

Test Example 5

In a phase difference plate in which two-layer oblique films having Re(0)=32 nm are laminated, samples in which $\Delta Re(15)\eta a$ is 1 nm to 7 nm are produced by changing the intersecting angle of the slow axes of the two-layer oblique films.

In addition, in a phase difference plate in which three-layer oblique films having Re(0)=21 nm, Re(0)=14 nm, Re(0)=17 nm are laminated, samples in which $\Delta Re(15)\eta a$ is 1 nm to 7 nm are produced by changing the intersecting angle of the slow axes of the three-layer oblique films.

For each sample, the contrast is measured in the same manner as in the case of Test Example 1. A contrast in a case where the phase difference plate is not provided is defined as a reference contrast, and the contrast of each sample is evaluated as follows.

A: 3 times or more the reference contrast
B: 2 times or more and less than 3 times the reference contrast
C: 1.5 times or more and less than 2 times the reference contrast
D: less than 1.5 times the reference contrast The evaluation results are shown in Table 6.

TABLE 6

| Layer configuration | $\Delta Re(15)\eta a$ | | | | | | |
|---|---|---|---|---|---|---|---|
| | 1 nm | 2 nm | 3 nm | 4 nm | 5 nm | 6 nm | 7 nm |
| Two-layer oblique film | B | B | A | A | B | C | D |
| Three-layer oblique film | B | B | A | A | B | C | D |

As shown in Table 6, both the case where the oblique film is laminated in two layers and the case where the oblique film is laminated in three layers, a contrast improvement rate of 1.5 times or more is obtained in a case where $\Delta Re(15)\eta a$ is 6 nm or less. The contrast improvement rate is 2 times or more in a case where $\Delta \text{Re}(15)\eta a$ is 1 nm to 5 nm, and the improvement rate is 3 times or more in a case of being 3 nm to 4 nm.

Phase Difference Plate According to Third Embodiment

In the above description, a phase difference plate having one or two or more layers of the oblique film laminated has been described, but the phase difference plate may include not only the oblique film but also a C-plate. An example of a phase difference plate 37 including a C-plate as the phase difference plate of the third embodiment will be described.

Figure 34:
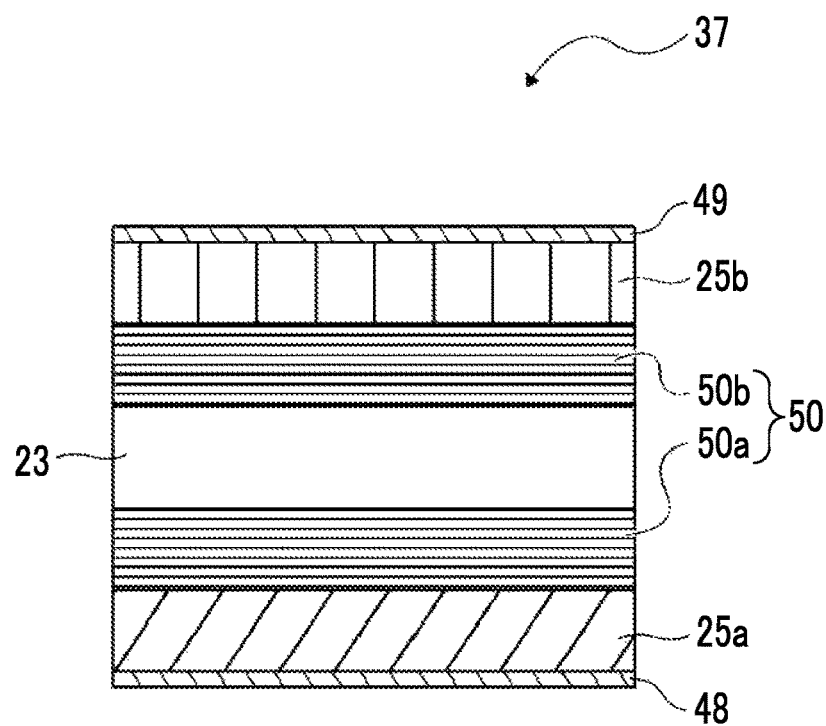
FIG. 34 is an explanatory diagram of a phase difference plate provided with a C-plate.

As shown in FIG. 34, the phase difference plate 37 according to the present embodiment includes a substrate 23, a C-plate 50, oblique films 25a and 25b, and antireflection films 48 and 49. The C-plate 50 includes a first portion C-plate 50a provided on both surfaces of the substrate 23 and a second portion C-plate 50b. The first oblique film 25a is provided on the first portion C-plate 50a, and the antireflection film 48 is provided on the first oblique film 25a. In addition, the second oblique film 25b is provided on the second portion C-plate 50b, and the antireflection film 49 is provided on the second oblique film 25b.

Figure 35:
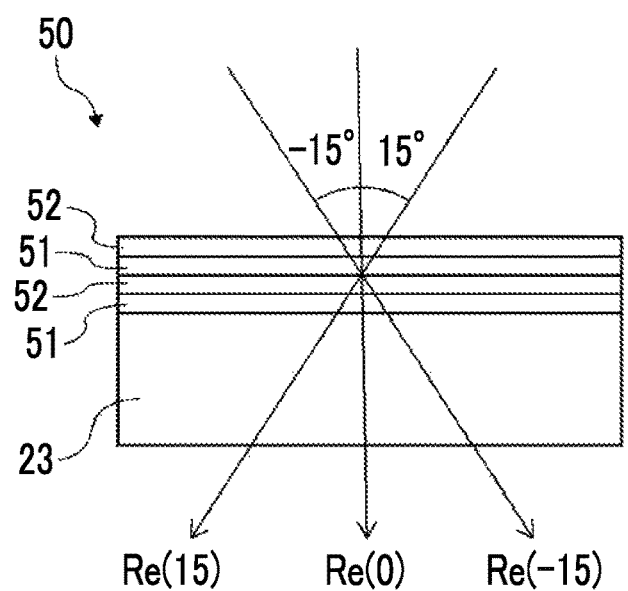
FIG. 35 is an explanatory diagram of the C-plate.

As shown in FIG. 35, the C-plate 50 is composed of a multilayer film in which a layer 51 of high refractive index, having a relatively high refractive index, and a layer 52 of low refractive index, having a relatively low refractive index, are alternately laminated. The C-plate 50 exhibits no phase difference with respect to light which is perpendicularly incident in the plane, that is, light which is incident at an incidence angle of 0°, but has refractivity anisotropy which generates a phase difference with respect to light obliquely incident at an incidence angle of other than 0°.

Figure 36:
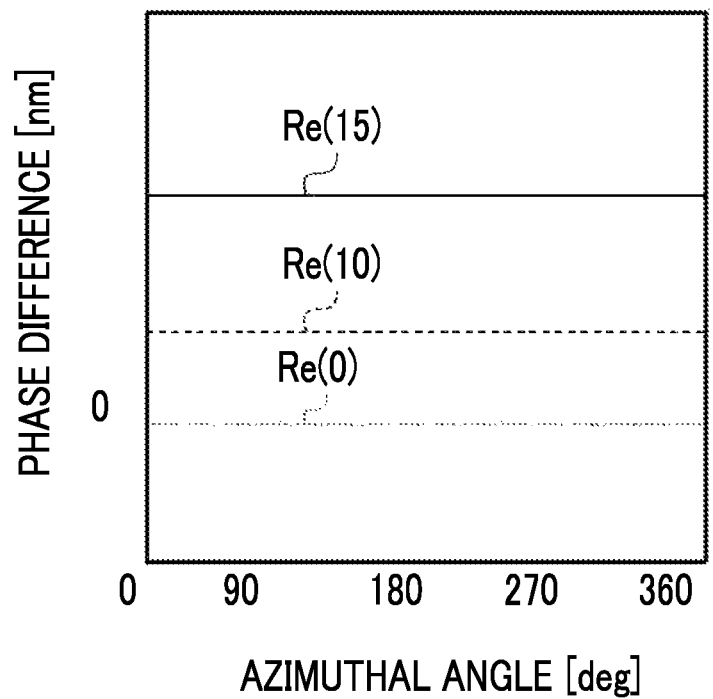
FIG. 36 is an explanatory diagram showing an azimuthal angle dependence of a phase difference of the C-plate.

FIG. 35 shows phase difference characteristics with respect to light incident on the C-plate 50 at incidence angles of 0°, 10°, and 15°. As shown in FIG. 36, the phase difference Re(0) with respect to the light incident at an incidence angle of 0° is 0 nm. The phase difference Re increases as the incidence angle increases. On the other hand, the phase difference Re(θ) does not have azimuthal angle dependence and is constant at an azimuthal angle of 0° to 360°. The value of the phase difference Re(15) is determined by the difference in refractive index between the layer of high refractive index and the layer of low refractive index, which constitute the C-plate, and by the number of layers. A haze of the C-plate is preferably 0.4% or less. Since the C-plate is used in an overlapping manner with the oblique film, the haze of the phase difference plate is the sum of the haze of the oblique film and the haze of the C-plate. By setting the haze of the C-plate to 0.4% or less, it is possible to suppress the haze of the phase difference plate, and in a case of being applied as a phase difference compensation plate for the liquid crystal display element, it is possible to improve contrast and suppress black display unevenness.

A haze of the phase difference plate 37 is preferably 1% or less. By laminating the C-plate in addition to the multiple-layer oblique film 25, the haze is increased as a whole, but in a case where the haze of the phase difference plate 37 is suppressed to 1% or less, it is possible to sufficiently obtain the effect of improving the contrast and suppressing the black display unevenness.

As described above, in the phase difference plate 31 provided with the two-layer oblique films 25a and 25b, the two-layer oblique films 25a and 25b are arranged such that the synthetic slow axis S2 coincides with the fast axis F of the liquid crystal layer 17. In this case, since phases of both are opposite to each other, the phase difference generated in the liquid crystal layer 17 can be compensated by the phase difference plate 31. Furthermore, in a case where the absolute value of the phase difference in the fast-axis orientation of the liquid crystal layer 17 and the phase difference in the slow-axis orientation of the phase difference plate 31 are the same, it is possible to satisfactorily compensate for the phase difference in the fast-axis orientation of the liquid crystal layer. Specifically, in a case where the pre-tilt orientation of the liquid crystal layer 17 is the 45° orientation, the phase difference of the liquid crystal layer 17 in the 45° orientation and the phase difference of the phase difference plate 31 in the 45° orientation are opposite, and in a case where the absolute values of the phase differences match, the phase difference at the 45° orientation can be more preferably compensated.

On the other hand, in order to compensate for the front phase difference, it has already been described that the two-layer oblique films 25a and 25b are preferably arranged with their slow axes S21 and S22 slightly shifted from being perpendicular to each other. By shifting the slow axes S21 and S22 from being perpendicular to each other, the symmetry of the azimuthal angle dependence of the phase difference in the phase difference plate 31 about the 45° orientation shifts. Therefore, in a case where the phase value of the phase difference Re(15) due to the pre-tilt component of the liquid crystal layer 17 and Re(15) of the phase difference plate 31 in the 45° orientation are matched with each other, some orientations may be overcompensated in other orientations.

In a case where a phase difference of the liquid crystal layer at a 15° incidence angle and a 45° orientation is defined as A, a phase difference of the phase difference plate 31 at a 15° incidence angle and a 45° orientation is defined as B, and A>B, it is preferable to compensate for the difference B−A with a phase difference C (=B−A) of the C-plate.

In order to satisfy C=B−A, it is necessary to decrease C in a case where A is increased and to increase C in a case where A is decreased. The phase difference A in the synthetic slow-axis orientation in a case where the oblique films are laminated depends on the Re(30) ratio of the oblique films and increases as the Re(30) ratio increases. As described above, the haze tends to increase as the Re(30) ratio of the oblique film increases. The phase difference of the C-plate depends on the film thickness, and in order to increase the phase difference, it is necessary to increase the number of laminated multilayer films and increase the film thickness as a whole. As the film thickness of the C-plate increases, the haze tends to increase, and manufacturing cost increases and manufacturing suitability decreases. Here, in a case where the Re(30) ratio is set to 1.1 to 4.0 and combined with the C-plate, both the effect of suppressing haze and the manufacturing suitability of the C-plate can be achieved.

Figure 37:
FIG. 37 is an explanatory diagram of a C-plate formed on only one surface of the substrate.

In a case where the C-plate 50 is provided, the first portion C-plate 50a may be provided on one surface of the substrate 23 and the second portion C-plate 50b may be provided on the other surface as in the phase difference plate 37 in FIG. 34, and the C-plate 50 may be formed on one surface of the substrate 23 as shown in FIG. 37. In addition, it is preferable that the C-plate 50 has an antireflection function. The antireflection function can be incorporated into each of the multilayer films constituting the first portion C-plate 50a, the second portion C-plate 50b, and the C-plate 50. It is not necessary to separately provide an antireflection film between the substrate 23 and the C-plate 50 and between the C-plate 50 and the oblique film 25, and the phase difference plate 37 can be made thinner.

In the phase difference plate 37, the relationship between the haze and the phase difference Re(30) of the C-plate has been investigated in a case where the C-plates 50 are distributed on both surfaces of the substrate 23 as shown in FIG. 34 (hereinafter, referred to as a double-side type) and the case where the C-plate 50 is formed on one surface of the substrate 23 as shown in FIG. 37 (hereinafter, referred to as a single-side type). Samples are produced for each of the double-side type C-plate and the single-side type C-plate having a layer configuration in which Re(30) is 0 to 35 nm. The C-plate is an alternating multilayer film in which the layer of high refractive index is an $Nb_2O_5$ layer and the layer of low refractive index is a $SiO_2$ layer. Both the double-side type and the single-side type are configured to have an antireflection function by adjusting the film thickness of each layer in the multilayer film constituting the C-plate and the overall layer configuration.

Figure 38:
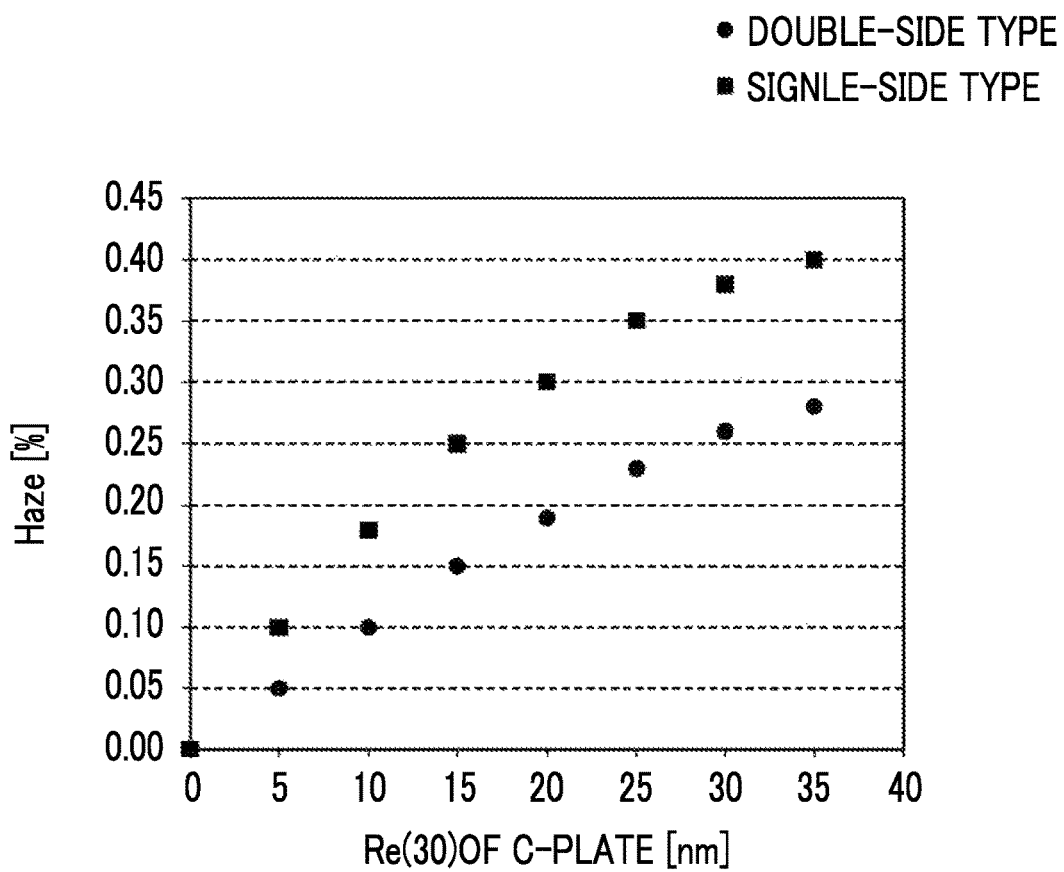
FIG. 38 is a diagram showing a relationship between Re(30) and the haze for double-side type and single-side type C-plates.

The results of measuring the haze for each sample is shown in FIG. 38.

As shown in FIG. 38, in any of the Re(30) in the double-side type, the haze can be kept lower. That is, from the viewpoint of suppressing the haze, in a case where the phase difference plate includes the C-plate, it is preferable to distribute and form the C-plate on both surfaces of the substrate.

Tables 7 and 8 show the layer configurations of the C-plate produced in this example, which is a C-plate having Re(30)=26 nm and includes an antireflection function. In Tables 7 and 8, Nb means a niobium oxide ($Nb_2O_5$) and Si means a silicon oxide ($SiO_2$).

Table 7 shows the layer configurations of the double-side type C-plate. In order to obtain Re(30)=26 nm, the layer of 39 shown in Table 7 and a multilayer film having a total film thickness of 931 nm are laminated on both surfaces of the substrate. As shown in FIG. 38, the haze of the double-side type C-plate provided with a total of two layers of the multilayer film in Table 7 is 0.2%.

TABLE 7

| Double-side type | | |
|---|---|---|
| Layer No. | Sample | Film thickness (nm) |
| Oblique film side | | |
| 1 | Nb | 7 |
| 2 | Si | 29 |
| 3 | Nb | 17 |
| 4 | Si | 23 |
| 5 | Nb | 21 |
| 6 | Si | 21 |
| 7 | Nb | 35 |
| 8 | Si | 21 |
| 9 | Nb | 29 |
| 10 | Si | 23 |
| 11 | Nb | 23 |
| 12 | Si | 26 |
| 13 | Nb | 22 |
| 14 | Si | 23 |
| 15 | Nb | 23 |
| 16 | Si | 22 |
| 17 | Nb | 20 |
| 18 | Si | 22 |
| 19 | Nb | 21 |
| 20 | Si | 27 |
| 21 | Nb | 22 |
| 22 | Si | 23 |
| 23 | Nb | 24 |
| 24 | Si | 21 |
| 25 | Nb | 22 |
| 26 | Si | 21 |

TABLE 7-continued

| Double-side type | | |
|---|---|---|
| Layer No. | Sample | Film thickness (nm) |
| 27 | Nb | 22 |
| 28 | Si | 24 |
| 29 | Nb | 24 |
| 30 | Si | 24 |
| 31 | Nb | 37 |
| 32 | Si | 20 |
| 33 | Nb | 43 |
| 34 | Si | 25 |
| 35 | Nb | 21 |
| 36 | Si | 28 |
| 37 | Nb | 11 |
| 38 | Si | 56 |
| 39 | Nb | 5 |
| Substrate side | | |

Table 8 shows the layer configuration of the single-side type C-plate. In order to obtain Re(30)=26 nm, the layer of 82 shown in Table 8 and a multilayer film having a total film thickness of 1743 nm are laminated on one surface of the substrate. As shown in FIG. 38, the haze of the single-side type C-plate provided with the multilayer film in Table 8 is 0.35%.

TABLE 8

| Single-side type | | |
|---|---|---|
| Layer No. | Sample | Film thickness (nm) |
| Air side | | |
| 1 | Si | 76 |
| 2 | Nb | 79 |
| 3 | Si | 5 |
| 4 | Nb | 24 |
| 5 | Si | 20 |
| 6 | Nb | 21 |
| 7 | Si | 21 |
| 8 | Nb | 20 |
| 9 | Si | 20 |
| 10 | Nb | 20 |
| 11 | Si | 20 |
| 12 | Nb | 20 |
| 13 | Si | 20 |
| 14 | Nb | 20 |
| 15 | Si | 20 |
| 16 | Nb | 21 |
| 17 | Si | 20 |
| 18 | Nb | 21 |
| 19 | Si | 20 |
| 20 | Nb | 20 |
| 21 | Si | 20 |
| 22 | Nb | 20 |
| 23 | Si | 20 |
| 24 | Nb | 20 |
| 25 | Si | 20 |
| 26 | Nb | 20 |
| 27 | Si | 20 |
| 28 | Nb | 20 |
| 29 | Si | 20 |
| 30 | Nb | 21 |
| 31 | Si | 20 |
| 32 | Nb | 20 |
| 33 | Si | 20 |
| 34 | Nb | 21 |
| 35 | Si | 20 |
| 36 | Nb | 20 |
| 37 | Si | 20 |
| 38 | Nb | 20 |
| 39 | Si | 20 |
| 40 | Nb | 20 |
| 41 | Si | 20 |
| 42 | Nb | 20 |

TABLE 8-continued

Single-side type

| Layer No. | Sample | Film thickness (nm) |
|---|---|---|
| 43 | Si | 20 |
| 44 | Nb | 20 |
| 45 | Si | 20 |
| 46 | Nb | 20 |
| 47 | Si | 21 |
| 48 | Nb | 21 |
| 49 | Si | 20 |
| 50 | Nb | 20 |
| 51 | Si | 20 |
| 52 | Nb | 20 |
| 53 | Si | 20 |
| 54 | Nb | 20 |
| 55 | Si | 20 |
| 56 | Nb | 20 |
| 57 | Si | 20 |
| 58 | Nb | 20 |
| 59 | Si | 23 |
| 60 | Nb | 20 |
| 61 | Si | 20 |
| 62 | Nb | 20 |
| 63 | Si | 20 |
| 64 | Nb | 23 |
| 65 | Si | 20 |
| 66 | Nb | 20 |
| 67 | Si | 20 |
| 68 | Nb | 20 |
| 69 | Si | 20 |
| 70 | Nb | 21 |
| 71 | Si | 20 |
| 72 | Nb | 20 |
| 73 | Si | 20 |
| 74 | Nb | 21 |
| 75 | Si | 20 |
| 76 | Nb | 22 |
| 77 | Si | 20 |
| 78 | Nb | 20 |
| 79 | Si | 29 |
| 80 | Nb | 5 |
| 81 | Si | 16 |
| 82 | Nb | 6 |
| Substrate side | | |

Here, the function of the phase difference plate 37 will be described with reference to Test Example 6.

Test Example 6

Two layers of an oblique film in which a front phase difference Re(0) is 23 nm are laminated, and their slow axes are crossed at an intersecting angle of 93°. The oblique film is formed on a glass substrate by an oblique vapor deposition. $Ta_2O_5$ is used as a material of the oblique film. Based on the results of Test Example 1, samples having a Re(30) ratio of 1 to 5 are produced by changing the substrate installation angle ω. As the C-plate, in each sample, with a relationship between a value A of the phase difference Re(15) in the synthetic slow-axis orientation of the oblique film and a value C of the phase difference Re(15) of the C-plate, and a phase difference B of Re(15) in the pre-tilt orientation of the liquid crystal layer, C is set according to B so that A+C=B. In this way, samples 6-1 to 6-13 are produced.

The contrast and the black display unevenness of the samples 6-1 to 6-13 are evaluated by the same method as in Test Example 1. Furthermore, in this example, the manufacturing suitability of the C-plate is also evaluated. The manufacturing suitability of the C-plate is evaluated as follows.

A: number of layers is 90 or less and reflectivity is 0.3% or less.

B: number of layers is 91 or more and 110 or less and reflectivity is 0.3% or less, or the number of layers is 80 or less and reflectivity is 0.5% or less and more than 0.3%.

C: number of layers is 111 or more and 130 or less and reflectivity is 0.3% or less, or the number of layers is 79 or less and reflectivity is more than 0.5%.

D: number of layers is 131 or more and reflectivity is 0.3% or less.

Evaluation results of manufacturing suitability of the C-plate are also counted in the same manner as the contrast and black display unevenness, an overall score is calculated for the contrast, the black display unevenness and the manufacturing suitability of the C-plate. The results are shown in Table 9.

TABLE 9

| Sample | Re(30) ratio | Contrast | Black display unevenness | Manufacturing suitability of C-plate | Total score |
|---|---|---|---|---|---|
| 6-1 | 1 | D | A | D | 7 |
| 6-2 | 1.2 | C | A | C | 13 |
| 6-3 | 1.4 | B | A | B | 17 |
| 6-4 | 1.5 | A | A | A | 21 |
| 6-5 | 1.6 | A | A | A | 21 |
| 6-6 | 2 | A | A | A | 21 |
| 6-7 | 2.3 | A | B | A | 19 |
| 6-8 | 2.5 | A | B | A | 19 |
| 6-9 | 3 | A | B | A | 19 |
| 6-10 | 3.5 | B | C | A | 15 |
| 6-11 | 4 | B | C | B | 13 |
| 6-12 | 4.5 | C | D | B | 8 |
| 6-13 | 5 | D | D | C | 3 |

The samples 6-2 to 6-11 shown in Table 9 correspond to Examples of the phase difference plate according to the present disclosure. In the samples of Examples, in which Re(30) is 1.2 to 4, the evaluation of the contrast is high as compared with samples having Re(30) of more than 4, and improvement in high contrast has been achieved. In addition, in the samples in which Re(30) is 1.5 to 2.5, very high contrast and the effect of suppressing black display unevenness can be obtained, and the manufacturing suitability of the C-plate is excellent.

A difference of 3 nm or less in front phase difference shows a good effect.

Here, with reference to Test Example 7, in the phase difference plate provided with the two-layer oblique film, a function in which the difference ΔRe(0) of the front phase difference of the two-layer oblique film is ±3 nm or less will be described.

Test Example 7

One of the oblique films is set to Re(0)=32 nm and Re(30) ratio=2.0, and Re(0) of the other oblique film is varied from −28 nm to 36 nm, and a sample of a phase difference plate having a two-layer oblique film with a front phase difference λRe(0) of −4 nm to +4 nm is produced.

In addition, a sample of a phase difference plate provided with a C-plate in the same combination of oblique films as described above is produced.

The contrast is measured in the same manner as in Test Example 1 and evaluated according to the same standard as in Test Example 1. The evaluation results are shown in Table 10.

TABLE 10

| ΔRe(0) [nm] | −4 | −3 | −2 | −1 | 0 | 1 | 2 | 3 | 4 |
|---|---|---|---|---|---|---|---|---|---|
| Two-layer oblique film | D | C | C | B | B | B | C | C | D |
| Two-layer oblique film + C-plate | D | C | B | A | A | A | B | C | D |

As shown in Table 6, regardless of the presence or absence of the C-plate, by setting the difference in front phase difference of the two-layer oblique film to ±3 nm, an effect of improving the contrast can be obtained as compared with a case of exceeding ±3 nm. In the sample not provided with the C-plate, the effect of improving the contrast can be obtained in a range in which ΔRe(0) is ±1 nm. In addition, in the sample provided with the C-plate, the effect of improving the contrast can be obtained in a range in which ΔRe(0) is ±2 nm, and the effect of improving the contrast can be further obtained in a range in which ΔRe(0) is ±1 nm.

In the above description, for the phase difference plate 31 in which two or more layers of the oblique film 25 satisfying Conditional Expressions (1) and (2) described above are laminated, it has been described that it is preferable that the absolute value of a difference between a first phase difference Re(15)ηa+45 of the incidence light in a case where an azimuthal angle is +45° with respect to the reference azimuthal angle ηa and a second phase difference Re(15)ηa−45 of the incidence light in a case where an azimuthal angle is −45° with respect to the reference azimuthal angle ηa is 6 nm or less.

However, even in a case where the phase difference film composed of an oblique film which does not satisfy Conditional Expressions (1) and (2), in the phase difference plate in which two or more layers of the phase difference film are laminated, it is preferable that the absolute value of a difference between a first phase difference Re(15)ηa+45 of the incidence light in a case where an azimuthal angle is +45° with respect to the reference azimuthal angle ηa and a second phase difference Re(15)ηa−45 of the incidence light in a case where an azimuthal angle is −45° with respect to the reference azimuthal angle ηa is 6 nm or less. In such a phase difference plate, by matching the reference orientation with the pre-tilt orientation of the liquid crystal layer, it is possible to accurately compensate for the phase difference generated in the liquid crystal layer.

As described above, the phase difference plates 21, 31, 32, 35, 36, and 27 according the embodiments described above can be applied to the liquid crystal display element 10 as the phase difference compensation element 20. Hereinafter, a liquid crystal projector 110 including the liquid crystal display element will be described.

"Liquid Crystal Projector"

Figure 39:
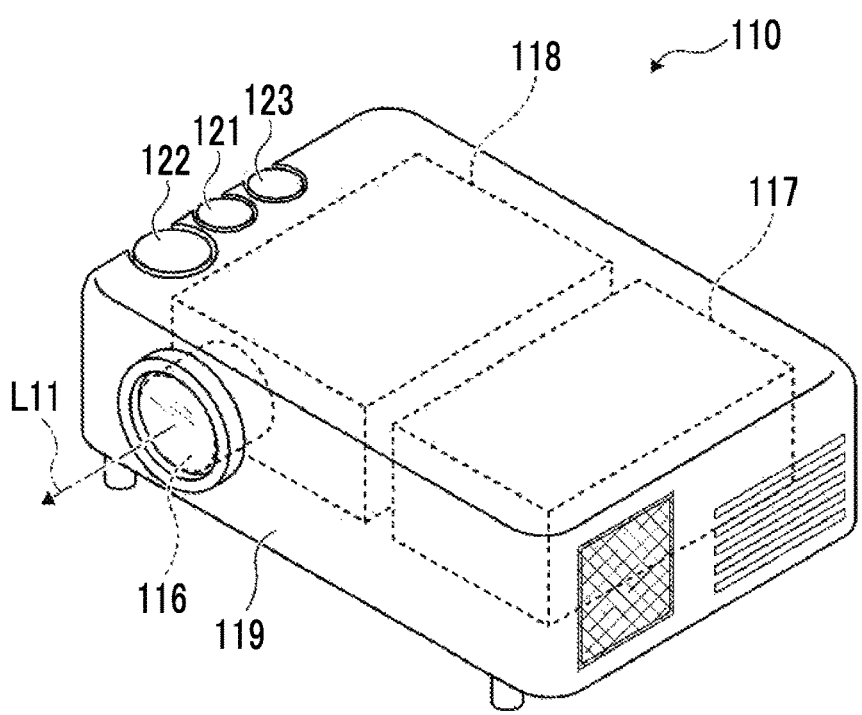
FIG. 39 is a perspective view showing an appearance of a liquid crystal projector.

As shown in FIG. 39, the liquid crystal projector 110 according to the present disclosure includes a projection lens 116, a projector driving unit 117, and a display optical system 118.

In addition, the projector 110 includes a zoom dial 121, a focus dial 122, a light quantity adjustment dial 123, and the like on an upper surface of a housing 119. Furthermore, a connection terminal (not shown) for connecting an external apparatus such as a computer is provided on a back surface of the housing 119.

Figure 40:
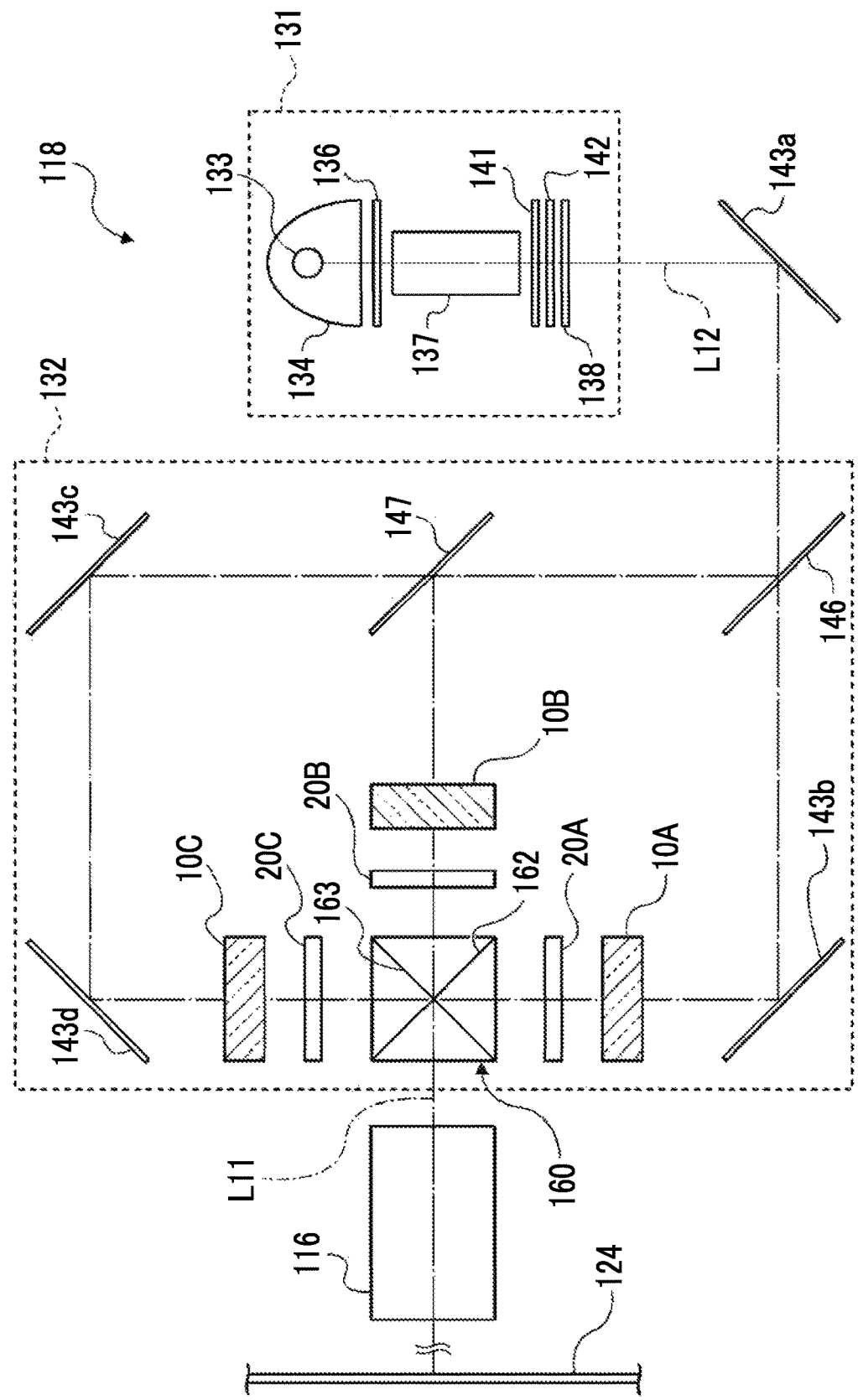
FIG. 40 is a block diagram showing an optical configuration of the liquid crystal projector.

The projection lens 116 magnifies projection light incident from the display optical system 118 and projects the light on a screen 124 (see FIG. 40). The projection lens 116 is composed of, for example, a zoom lens, a focus lens, a stop, and the like. The zoom lens and the focus lens are movably provided along a projection light axis L11. The zoom lens moves in response to an operation of the zoom dial 121 to adjust a display magnification of a projected image. In addition, the focus lens moves in response to movement of the zoom lens or an operation of the focus dial 122 to adjust a focus of the projected image. Furthermore, the stop adjusts a brightness of the projected image by changing an area of a stop opening according to an operation of the light quantity adjustment dial 123.

The projector driving unit 117 controls an electrical operation of each unit of the projector 110. For example, the projector driving unit 117 receives image data or the like from a computer or the like connected to the projector 110 and displays the image data on a liquid crystal display element described below.

In addition, the projector driving unit 117 includes motors which drive each unit of the projection lens 116, and drives each of these motors in response to operations such as the zoom dial 121, the focus dial 122, and the light quantity adjustment dial 123.

The display optical system 118 decomposes light emitted from a light source into red light, green light, and blue light, and transmits the light to liquid crystal display elements 10A, 10B, and 10C (see FIG. 2) displaying information of each color, respectively, and generates information light of each color. These information lights are combined to be the projection light, which is projected onto the screen 124 through the projection lens 116.

As shown in FIG. 40, the display optical system 118 is composed of a light source unit 131, an information light generation unit 132 which generates the information light from light emitted by the light source unit 131, and the like.

The light source unit 131 is composed of a lamp 133, a reflecting mirror 134, an ultraviolet ray cut filter 136, an integrator 137, a polarizing plate 138, a relay lens 141, a collimating lens 142, and the like.

The lamp 133 is a high-luminance light source such as a xenon lamp and emits natural white light which does not have a specific polarization direction. The white light emitted from the lamp 133 passes through the ultraviolet ray cut filter 136 and is incident on the integrator 137.

The ultraviolet ray cut filter 136 removes ultraviolet rays from the white light emitted from the lamp 133, and the white light prevents deterioration of brown color or the like in various filters (not shown) made of a polymer of an organic polymer or the like.

The reflecting mirror 134 is, for example, a mirror having an elliptical curved surface, and the lamp 133 is provided in a vicinity of one focal point of the elliptical curved surface. Furthermore, one end of the integrator 137 is provided in a vicinity of the other focal point. As a result, the white light emitted from the lamp 133 is efficiently guided to the integrator 137.

The integrator 137 is composed of, for example, a glass rod and a microlens array provided on an edge surface of the glass rod, and collects the white light emitted from the lamp 133 and guides it to the collimating lens 142 through the relay lens 141. An amount of light incident on the integrator 137 from the lamp 133 decreases as the distance from a light source optical axis L12 increases, and is unevenly distributed about the light source optical axis L12. The integrator 137 distributes the light having such a non-uniform light amount distribution substantially uniformly within a predetermined range about the light source optical axis L12. As a result, the projected image has a substantially uniform brightness over the entire surface of the screen 124.

The collimating lens 142 adjusts the light emitted from the integrator 137 to light parallel to the light source optical axis L12. The polarizing plate 138 converts unpolarized light incident from the collimating lens 142 into linearly polarized light having a polarization component (hereinafter, an S-polarization component) perpendicular to the paper surface. The light of the S-polarization component is guided to the information light generation unit 132 through a reflecting mirror 143a.

The information light generation unit 132 is composed of dichroic mirrors 146 and 147, liquid crystal display elements 10A, 10B, and 10C, phase difference compensation elements 20A, 20B, and 20C, a dichroic prism 61, and the like.

The dichroic mirror 146 is provided such that an angle between a normal direction of the surface thereof and an optical axis of incidence light is 45°. In addition, the dichroic mirror 146 transmits a red light component of the S-polarized white light incident from the light source unit 131 and guides the white light to a reflecting mirror 143b. The reflecting mirror 143b reflects the red light transmitted through the dichroic mirror 146 toward the liquid crystal display element 10A.

In addition, the dichroic mirror 146 reflects a green light component and a blue light component of the S-polarized white light incident from the light source unit 131 toward the dichroic mirror 147. The dichroic mirror 147 is provided such that an angle between a normal direction of the surface thereof and an optical axis of incidence light is 45 degrees. In addition, the dichroic mirror 147 reflects the green light component of the S-polarized light incident from the dichroic mirror 146 toward the liquid crystal display element 10B.

On the other hand, the dichroic mirror 147 transmits the blue light component of the S-polarized light incident from the dichroic mirror 146 and guides the light to a reflecting mirror 143c. The blue light component is reflected by the reflecting mirror 143c and a reflecting mirror 143d, and is incident on the liquid crystal display element 10C.

The liquid crystal display element 10A is the liquid crystal display element 10 shown in FIG. 1. The liquid crystal display element 10A is driven by the projector driving unit 117, and displays a red component in projection video data received from a computer or the like on a gray scale. By transmitting through the liquid crystal display element 10A, the red light is red information light having information on the red component of the projected image.

Similarly, the liquid crystal display element 10B is the liquid crystal display element 10 shown in FIG. 1, and displays a green component in the projection video data received from a computer or the like on a gray scale. By transmitting through the liquid crystal display element 10B, the green light is green information light having information on the green component of the projected image.

Furthermore, similarly, the liquid crystal display element 10C is the liquid crystal display element 10 shown in FIG. 1, and displays a blue component in the projection video data received from a computer or the like on a gray scale. By transmitting through the liquid crystal display element 10C, the blue light is blue information light having information on the blue component of the projected image.

The phase difference compensation element 20A compensates for the phase difference of the red information light incident on a dichroic prism 160 from the liquid crystal display element 10A. That is, the phase difference compensation element 20A compensates for the phase difference caused by the pre-tilt of the liquid crystal molecules.

Similarly, the phase difference compensation element 20B compensates for the phase difference of the green information light incident on the dichroic prism 160 from the liquid crystal display element 10B, and the phase difference compensation element 20C compensates for the phase difference of the blue information light incident on the dichroic prism 160 from the liquid crystal display element 10C.

The dichroic prism 160 is produced in a substantially cubic shape by using a transparent material such as glass, and has dichroic surfaces 162 and 163 orthogonal to each other inside the dichroic prism 160. The dichroic surface 162 reflects the red light and transmits the green light. On the other hand, the dichroic surface 163 reflects the blue light and transmits the green light.

Therefore, the dichroic prism 160 synthesizes the red, green, and blue information lights incident from liquid crystal display elements 151, 152, and 153, respectively, and outputs them as the projection light. In addition, the projection light is led to the projection lens 116 to display the projected image on the screen 124 in full color.

In the liquid crystal projector 110, by using, as the phase difference compensation elements 20A, 20B, and 20C, the phase difference plate according to the present disclosure, for example, the phase difference plate 31, 32, 33, 36, or 37 described above, it is possible to efficiently compensate for the phase difference caused by the pre-tilt of the liquid crystal molecules. As a result, it is possible to obtain a projected image in which the contrast is improved as compared with the conventional case and black display unevenness is suppressed.

The disclosure of JP2020-113612 filed on Jun. 30, 2020 is incorporated in the present specification by reference.

All documents, patent applications, and technical standards described in the present specification are incorporated herein by reference to the same extent as in a case of being specifically and individually noted that individual documents, patent applications, and technical standards are incorporated by reference.

What is claimed is:

1. A phase difference plate comprising:
    a substrate; and
    a phase difference film formed on at least one surface of the substrate,
    wherein the phase difference film is an oblique film which has a columnar structure body inclined with respect to a normal line of a film formation surface in the substrate, on which the phase difference film is formed, and exhibits a refractivity anisotropy as an optical characteristic,
    in a case where three principal refractive indices in a biaxial refractive index ellipsoid exhibiting the refractivity anisotropy are defined as nx, ny, and nz, and in these principal refractive indices, in a case where nx is a principal refractive index in an X-axis direction which is a longitudinal direction of the columnar structure body, ny is a principal refractive index in a Y-axis direction which is a major-axis direction of an ellipse perpendicular to the X-axis, and nz is a principal refractive index in a Z-axis direction which is a minor-axis direction of the ellipse, Conditional Expression (1) is satisfied, and
    in a case where an incidence angle in a direction inclined to the X-axis side with respect to the normal line is regarded as positive, a phase difference of an incidence light with an incidence angle of +30° is defined as Re(+30), a phase difference of an incidence light with an incidence angle of −30° is defined as Re(−30), and a phase difference ratio of Re(+30) to Re(−30) is defined as a Re(30) ratio, Conditional Expression (2) is satisfied, $$ny > nx > nz \quad (1)$$

$$Re(30) \text{ ratio} = Re(30)/Re(-30) = 1.1 \text{ to } 4.0 \quad (2).$$

2. The phase difference plate according to claim 1, wherein, in a case where a YS-axis, which is obtained by projecting the Y-axis corresponding to a maximum principal refractive index ny in the three principal refractive indices onto a plane parallel to the film formation surface and in which a phase of the incidence light is most delayed corresponding to the principal refractive index ny, is defined as a slow axis, and an axis obtained by projecting the X-axis onto the film formation surface is defined as a ZS-axis, the slow axis is orthogonal to the ZS-axis.

3. The phase difference plate according to claim 1, wherein the Re(30) ratio satisfies Conditional Expression (2-1), $$Re(30) \text{ ratio} = Re(30)/Re(-30) = 1.2 \text{ to } 4.0 \quad (2\text{-}1).$$

4. The phase difference plate according to claim 1, wherein the Re(30) ratio satisfies Conditional Expression (2-2), $$Re(30) \text{ ratio} = Re(30)/Re(-30) = 1.4 \text{ to } 3.0 \quad (2\text{-}2).$$

5. The phase difference plate according to claim 1, wherein the Re(30) ratio satisfies Conditional Expression (2-3), $$Re(30) \text{ ratio} = Re(30)/Re(-30) = 1.5 \text{ to } 2.5 \quad (2\text{-}3).$$

6. The phase difference plate according to claim 1, wherein the oblique film consists of an oxide containing at least one of Si, Nb, Zr, Ti, La, Al, Hf, or Ta.

7. The phase difference plate according to claim 1, wherein two or more layers of the phase difference film are laminated.

8. The phase difference plate according to claim 7, wherein, in a case where a YS-axis, which is obtained by projecting the Y-axis corresponding to a maximum principal refractive index ny in the three principal refractive indices onto a plane parallel to the film formation surface and in which a phase of the incidence light is most delayed corresponding to the principal refractive index ny, is defined as a slow axis, a direction of the slow axis in a case where the substrate is rotated about the normal line is defined as an azimuthal angle of the substrate, and an azimuthal angle at which a phase difference generated with respect to the incidence light at an incidence angle of +15° with respect to the normal line is maximum is defined as a reference azimuthal angle, in azimuthal angles from 0° to 360°, an absolute value of a difference between a first phase difference of the incidence light in a case where an azimuthal angle is +45° with respect to the reference azimuthal angle and a second phase difference of the incidence light in a case where an azimuthal angle is −45° with respect to the reference azimuthal angle is 6 nm or less.

9. The phase difference plate according to claim 7, wherein a front phase difference is 0.1 nm to 5 nm.

10. The phase difference plate according to claim 7, wherein a haze value indicating a degree of occurrence of scattered light is 0.3% or less.

11. The phase difference plate according to claim 7, wherein the phase difference films are formed on both surfaces of the substrate layer by layer.

12. The phase difference plate according to claim 7, wherein the phase difference films are laminated in two or more layers on one surface of the substrate, and an interlayer is further provided between the adjacent phase difference films.

13. The phase difference plate according to claim 7, wherein the phase difference plate includes a plurality of the substrates on which at least one layer of the phase difference film is formed.

14. A contrast adjustment method of a liquid crystal display element including a liquid crystal layer and a phase difference compensation element for compensating for a phase difference in the liquid crystal layer, the method comprising:
using, as the phase difference compensation element, the phase difference plate according to claim 13, adjusting a contrast of the liquid crystal display element by rotating at least one of the plurality of substrates on which at least one layer of the phase difference film is formed with respect to other substrates about an axis perpendicular to the film formation surface.

15. The phase difference plate according to claim 7, wherein the phase difference film is laminated in two layers, and slow axes of each layer are arranged with an intersecting angle of 90°±3°.

16. The phase difference plate according to claim 7, wherein the phase difference film is laminated in two layers, and a difference in front phase differences of each layer is ±3 nm or less.

17. The phase difference plate according to claim 7, further comprising:
a negative C-plate in which a haze value indicating a degree of occurrence of scattered light is 0.4% or less.

18. The phase difference plate according to claim 17, wherein the C-plate has an antireflection function.

19. The phase difference plate according to claim 17, wherein a haze value indicating a degree of occurrence of scattered light is 1% or less.

20. A liquid crystal projector comprising:
a liquid crystal layer; and
a phase difference compensation element for compensating for a phase difference in the liquid crystal layer,
wherein the phase difference plate according to claim 1 is provided as the phase difference compensation element.

21. A phase difference plate comprising:
a substrate; and
a phase difference film formed on at least one surface of the substrate,
wherein the phase difference film is laminated in two or more layers, and
in a case where, in a plane parallel to a film formation surface of the substrate, on which the phase difference film is formed, an axis in which a phase of an incidence light is most delayed is defined as a slow axis, a direction of the slow axis in a case where the substrate is rotated about the normal line is defined as an azimuthal angle of the substrate, and an azimuthal angle at which a phase difference generated with respect to the incidence light at an incidence angle of +15° with respect to the normal line is maximum is defined as a reference azimuthal angle, in azimuthal angles from 0° to 360°, an absolute value of a difference between a first phase difference of the incidence light in a case where an azimuthal angle is +45° with respect to the reference azimuthal angle and a second phase difference of the incidence light in a case where an azimuthal angle is −45° with respect to the reference azimuthal angle is 6 nm or less.

22. A liquid crystal projector comprising:

a liquid crystal layer; and a phase difference compensation element for compensating for a phase difference in the liquid crystal layer, wherein the phase difference plate according to claim 19 is provided as the phase difference compensation element.

* * * * *